US012542696B2

(12) United States Patent
Lim et al.

(10) Patent No.: US 12,542,696 B2
(45) Date of Patent: *Feb. 3, 2026

(54) METHOD AND APPARATUS FOR TRANSMITTING AND RECEIVING UPLINK REFERENCE SIGNAL IN WIRELESS COMMUNICATION SYSTEM

(71) Applicant: Samsung Electronics Co., Ltd., Gyeonggi-do (KR)

(72) Inventors: Seongmok Lim, Gyeonggi-do (KR); Hyoungju Ji, Gyeonggi-do (KR); Hoondong Noh, Gyeonggi-do (KR); Jinhyun Park, Gyeonggi-do (KR); Yeongeun Lim, Gyeonggi-do (KR); Youngrok Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 8 days.

This patent is subject to a terminal disclaimer.

(21) Appl. No.: 18/353,438

(22) Filed: Jul. 17, 2023

(65) Prior Publication Data

US 2025/0047528 A1 Feb. 6, 2025

Related U.S. Application Data

(63) Continuation of application No. 17/232,613, filed on Apr. 16, 2021, now Pat. No. 11,706,055.

(30) Foreign Application Priority Data

Apr. 16, 2020 (KR) .................. 10-2020-0046265
Jul. 7, 2020 (KR) .................. 10-2020-0083629
(Continued)

(51) Int. Cl.
*H04W 72/04* (2023.01)
*H04L 5/00* (2006.01)
(Continued)

(52) U.S. Cl.
CPC ........ *H04L 25/0226* (2013.01); *H04L 5/0051* (2013.01); *H04W 72/0446* (2013.01); *H04W 72/23* (2023.01); *H04W 80/02* (2013.01)

(58) Field of Classification Search
CPC .......... H04W 72/042; H04W 72/0446; H04W 72/0413; H04W 80/02; H04W 56/001;
(Continued)

(56) References Cited

U.S. PATENT DOCUMENTS 10,841,059 B2 * 11/2020 Park .................. H04L 27/2607
2013/0159021 A1 * 6/2013 Felsher ................ G16H 10/60
705/3
(Continued)

FOREIGN PATENT DOCUMENTS

CN 109923828 6/2019
CN 110650001 1/2020
(Continued)

OTHER PUBLICATIONS

3GPP TS 38.214 V16.1.0, 3GPP, 3rd Generation Partnership Project; Technical Specification Group Radio Access Network; NR; Physical Layer Procedures for Data (Release 16), Mar. 2020, 151 pages.
(Continued)

*Primary Examiner* — Wei Zhao
(74) *Attorney, Agent, or Firm* — The Farrell Law Firm, P.C.

(57) ABSTRACT

A terminal and a method performed by the terminal are provided for use in a wireless communication system. The method includes receiving configuration information associated with a sounding reference signal (SRS) by higher layer signaling; receiving downlink control information (DCI) for triggering the SRS; and transmitting, based on the
(Continued)

configuration information and the DCI, the SRS in an available slot counting from a reference slot.

16 Claims, 41 Drawing Sheets

(30) Foreign Application Priority Data

Oct. 23, 2020 (KR) .................. 10-2020-0138418
Jan. 15, 2021 (KR) .................. 10-2021-0006282
Feb. 3, 2021 (KR) .................. 10-2021-0015256

(51) Int. Cl.
*H04L 25/02* (2006.01)
*H04W 72/0446* (2023.01)
*H04W 72/23* (2023.01)
*H04W 80/02* (2009.01)

(58) Field of Classification Search
CPC .................. H04L 27/26; H04L 25/0226; H04L 5/0051; H04L 5/0048; H04L 5/0023
See application file for complete search history.

(56) References Cited

U.S. PATENT DOCUMENTS

| | | | |
|---|---|---|---|
| 2017/0079026 A1* | 3/2017 | Li | H04W 72/1215 |
| 2019/0075524 A1 | 3/2019 | Zhou et al. | |
| 2019/0150143 A1 | 5/2019 | Yin et al. | |
| 2019/0158236 A1 | 5/2019 | Yoo et al. | |
| 2019/0174466 A1* | 6/2019 | Zhang | H04L 5/0057 |
| 2019/0190669 A1 | 6/2019 | Park et al. | |
| 2020/0059907 A1 | 2/2020 | Joseph et al. | |
| 2020/0127724 A1 | 4/2020 | Kang et al. | |
| 2021/0211254 A1 | 7/2021 | Park et al. | |
| 2022/0330300 A1 | 10/2022 | Wang et al. | |
| 2024/0215035 A1 | 6/2024 | Nishio et al. | |

FOREIGN PATENT DOCUMENTS

| | | |
|---|---|---|
| CN | 110959268 | 4/2020 |
| JP | 2019-198111 | 11/2019 |
| KR | 1020200032275 | 3/2020 |
| KR | 1020210012304 | 2/2021 |
| KR | 1020210037466 | 4/2021 |
| WO | WO 2022/205488 | 10/2022 |

OTHER PUBLICATIONS

European Search Report dated Aug. 8, 2023 issued in counterpart application No. 21789014.4-1213, 8 pages.
International Search Report dated Aug. 2, 2021 issued in counterpart application No. PCT/KR2021/004807, 9 pages.
Chinese Office Action dated Apr. 15, 2024 issued in counterpart application No. 202180042481.0, 16 pages.
Korean Office Action dated Feb. 27, 2025 issued in counterpart application No. 10-2021-0015256, 9 pages.
EP Communication Report dated Jun. 24, 2025 issued in counterpart application No. 21789014.4-1206, 287 pages.
Moderator (OPPO), "Summary#1 on UCI Enhancements for R16 URLLC" R1-2002695, 3GPP TSG RAN WG1 #100b-e, Apr. 20-30, 2020, 65 pages.
KR Notice of Allowance dated Oct. 22, 2025 issued in counterpart application No. 10-2021-0015256, 10 pages.

* cited by examiner

FIG. 6A

| | | | Oct 1 | Oct 2 | Oct 3 | ... | Oct N-M | Oct N-M+1 | ... | Oct N |
|---|---|---|---|---|---|---|---|---|---|---|
| R | R | $F_0$ 6a-30 | SRS Resource Set's Cell ID 6a-05 | C 6a-15 | Resource ID$_0$ 6a-35 | | $F_{M-1}$ 6a-30 | Resource ID$_{M-1}$ 6a-35 | | R |
| | | | SRS Resource Set's BWP ID 6a-10 | SUL 6a-20 | | | R | Resource Serving Cell ID$_0$ 6a-40 | | Resource Serving Cell ID$_{M-1}$ 6a-40 |
| | | | | SP SRS Resource Set 6a-25 | | | | Resource BWP ID$_0$ 6a-45 | | Resource BWP ID$_{M-1}$ 6a-45 |

FIG. 6B

| | | Oct 1 | Oct 2 | Oct 3 | | Oct N-M | Oct N-M+1 | | Oct N |
|---|---|---|---|---|---|---|---|---|---|
| R | R | SRS Resource Set's Cell ID 6b-05 | C 6b-15 | $F_0$ 6b-30 | | $F_{M-1}$ 6b-30 | R | | R |
| | | SRS Resource Set's BWP ID 6b-10 | SUL 6b-20 | Resource $ID_0$ 6b-35 | ... | Resource $ID_{M-1}$ 6b-35 | Resource Serving Cell $ID_0$ 6b-40 | ... | Resource Serving Cell $ID_{M-1}$ 6b-40 |
| | | | AP SRS Resource Set 6b-25 | | | | Resource BWP $ID_0$ 6b-45 | | Resource BWP $ID_{M-1}$ 6b-45 |

FIG. 31

| | | | | | | | |
|---|---|---|---|---|---|---|---|
| R | SRS Resource Set's Cell ID | | | | | | SRS Resource Set's BWP ID |
| | $T_7$ | $T_6$ | $T_5$ | $T_4$ | $T_3$ | $T_2$ | $T_1$ $T_0$ |

$T_{M-1}$ $T_{M-2}$ $T_{M-3}$ $T_{M-4}$ $T_{M-5}$ $T_{M-6}$ $T_{M-7}$ $T_{M-8}$ (31-05, 31-00, 31-10)

| Codepoint | Interpretation | |
|---|---|---|
| $T_0$ | No transmission | Cancellation — 31-20 |
| $T_0$ | Offset #1 (absolute) | Dynamic new triggering — 31-25 |
| $T_{M-1}$ | Offset #M-1 (absolute) | |
| $T_M$ | Offset #M (relative) | Adjustment — 31-30 |
| $T_{2M-2}$ | Offset #2M-2 (relative) | |
| $T_{2M-1}$ | Transmission with RRC configuration | New triggering without change — 31-35 |

| Codepoint | Interpretation | |
|---|---|---|
| $T_0$ | No transmission | Cancellation — 32-25 |
| $T_0$ | Offst #1 (absolute) | Dynamic new triggering — 32-30 |
| $T_{M-1}$ | Offst #M-1 (absolute) | |
| $T_M$ | Offst #M (relative) | Adjustment — 32-35 |
| $T_{2M-2}$ | Offst #2M-2 (relative) | |
| $T_{2M-1}$ | Transmission with RRC configuration | New triggering without change — 32-40 |

32-20

| R | SRS Resource Set's Cell ID | SRS Resource Set's BWP ID |
|---|---|---|
| $T_7$ | Flexible offset 0 | |

32-10 · 32-15 · 32-00 · 32-05

| $T_{M-1}$ | Flexible offset 2M-1 |
|---|---|

| SRS Resource Set's Cell ID | SRS Resource Set's BWP ID | | | | | | | | |
|---|---|---|---|---|---|---|---|---|---|
| | AP SRS ResourceSet ID$_0$ | | | | | | | | |
| R | R | R | R | R | R | T$_{0,0}$ | | | |
| | | | | | | T$_{0,1}$ | | | |
| | | | | | | T$_{0,2}$ | | | |
| | | | | | | T$_{0,3}$ | | | |
| | | | | | | T$_{0,4}$ | | | |
| | | | | | | T$_{0,5}$ | | | |
| | | | | | | T$_{0,6}$ | | | |
| | | | | | | T$_{0,7}$ | | | |
| | | | | | | T$_{0,L}$ | | | |
| | AP SRS ResourceSet ID$_1$ | | | | | | | | |
| R | R | R | T$_{1,0}$ | | | | | | |
| | | | T$_{1,1}$ | | | | | | |
| | | | T$_{1,2}$ | | | | | | |
| | | | T$_{1,3}$ | | | | | | |
| | | | T$_{1,4}$ | | | | | | |
| | | | T$_{1,5}$ | | | | | | |
| | | | T$_{1,6}$ | | | | | | |
| | | | T$_{1,7}$ | | | | | | |
| | | | T$_{1,L}$ | | | | | | |

METHOD AND APPARATUS FOR TRANSMITTING AND RECEIVING UPLINK REFERENCE SIGNAL IN WIRELESS COMMUNICATION SYSTEM

CROSS-REFERENCE TO RELATED APPLICATIONS

This application is a continuation of U.S. application Ser. No. 17/232,613, which was filed in the U.S. Patent and Trademark Office on Apr. 16, 2021, and claims priority under 35 U.S.C. § 119 to Korean Patent Application Nos. 10-2020-0046265, 10-2020-0083629, 10-2020-0138418, 10-2021-0006282, and 10-2021-0015256, which were filed in the Korean Intellectual Property Office on Apr. 16, 2020, Jul. 7, 2020, Oct. 23, 2020, Jan. 15, 2021, and Feb. 3, 2021, the entire disclosure of each of which is incorporated herein by reference.

BACKGROUND

1. Field

The disclosure relates generally to a method and apparatus for transmitting and receiving an uplink (UL) reference signal in a wireless communication system.

2. Description of the Related Art

In order to meet the increasing demand of wireless data traffic since the commercialization of $4^{th}$ generation (4G) communication systems, efforts have been made to develop enhanced $5^{th}$ generation (5G) communication systems or pre-5G communication systems. 5G communication systems or pre-5G communication systems may also be called 'beyond 4G network communication systems' or 'post long term evolution (LTE) systems'.

In order to increase data rate, consideration is given to implementing 5G communication systems in ultra-high frequency bands (millimeter wave (mmW)) (e.g., 60 GHz).

In order to reduce the path loss of radio waves and increase a transmission distance of radio waves in ultra-high frequency bands, for 5G communication systems, technologies such as beamforming, massive multiple-input multiple-output (MIMO), full dimensional MIMO (FD-MIMO), array antennas, analog beamforming, and large scale antennas have been discussed.

In order to improve system networks, for 5G communication systems, technologies such as evolved small cell, advanced small cell, cloud radio access network (RAN), ultra-dense network, device-to-device (D2D) communication, wireless backhaul, moving network, cooperative communication, coordinated multi-points (CoMP), and interference cancellation have been developed. For 5G communication systems, advanced coding modulation (ACM) schemes such as hybrid frequency-shift keying (FSK) and quadrature amplitude modulation (QAM) modulation (FQAM) have been developed and sliding window superposition coding (SWSC) and enhanced network access schemes such as filter-bank multi-carrier (FBMC), non-orthogonal multiple access (NOMA), and sparse code multiple access (SCMA) have also been developed.

The Internet is evolving to an Internet of things (IoT) network through which distributed elements exchange and process information. Internet of everything (IoE) technology, which is a combination of IoT technology and big data processing technology through connection with a cloud server, is also emerging.

In order to implement the IoT, technology elements such as sensing technology, wired/wireless communication and network infrastructure, service interface technology, and security technology are required, and thus technologies for inter-object connection, such as a sensor network, machine to machine (M2M) communication, or machine-type communication (MTC), have recently been studied.

In an IoT environment, intelligent Internet technology services that collect and analyze data generated by connected objects may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Various attempts have been made to apply 5G communication systems to IoT networks. For example, technologies such as sensor networks, M2M communication, and MTC are implemented by 5G communication technologies such as beamforming, MIMO, and array antenna. The application of a cloud RAN as big data processing technology may also be considered as an example of convergence between 5G technology and IoT technology.

As various services may be provided with the development of wireless communication systems, there is a demand for a method of smoothly supporting a service related to repeated transmission of UL data of a terminal.

SUMMARY

An aspect of the disclosure is to provide a method and apparatus for transmitting and receiving an UL reference signal for efficient use of an UL (UL) or a downlink (DL) for various services in a mobile communication system.

In accordance with an aspect of the disclosure, a method is provided, which is performed by a terminal in a wireless communication system. The method includes receiving configuration information associated with a sounding reference signal (SRS) by higher layer signaling; receiving downlink control information (DCI) for triggering the SRS; and transmitting, based on the configuration information and the DCI, the SRS in an available slot counting from a reference slot.

In accordance with another aspect of the disclosure, a terminal is provided for use in a wireless communication system. The terminal includes a transceiver; and at least one processor coupled with the transceiver and configured to receive configuration information associated with an SRS by higher layer signaling, receive DCI for triggering the SRS, and transmit, based on the configuration information and the DCI, the SRS in an available slot counting from a reference slot.

In accordance with another aspect of the disclosure, a method is provided, which is performed by a base station (BS), in a wireless communication system. The method includes transmitting, to a terminal, configuration information associated with an SRS by higher layer signaling; transmitting DCI for triggering the SRS; and receiving, based on the configuration information and the DCI, the SRS in an available slot counting from a reference slot.

In accordance with another aspect of the disclosure, a BS is provided for use in a wireless communication system. The BS includes a transceiver; and at least one processor coupled with the transceiver and configured to transmit, to a terminal, configuration information associated with an SRS by higher layer signaling, transmit DCI for triggering the SRS, and receive, based on the configuration information and the DCI, the SRS in an available slot counting from a reference slot.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6A illustrates a medium access control (MAC) control element (CE) configuration for activation/deactivation of a semi-persistent (SP) SRS, according to an embodiment;

FIG. 6B illustrates a MAC CE configuration for spatial relation indication of an aperiodic (AP) SRS, according to an embodiment;

FIG. 31 illustrates a MAC CE for indicating a flexible offset of an AP SRS resource set, according to an embodiment;

FIG. 32 illustrates a MAC CE for indicating a flexible offset value and an operation for an offset;

FIG. 33 illustrates a MAC CE for indicating activation of an SRS resource in an AP SRS resource set, according to an embodiment;

DETAILED DESCRIPTION

Figure 1:
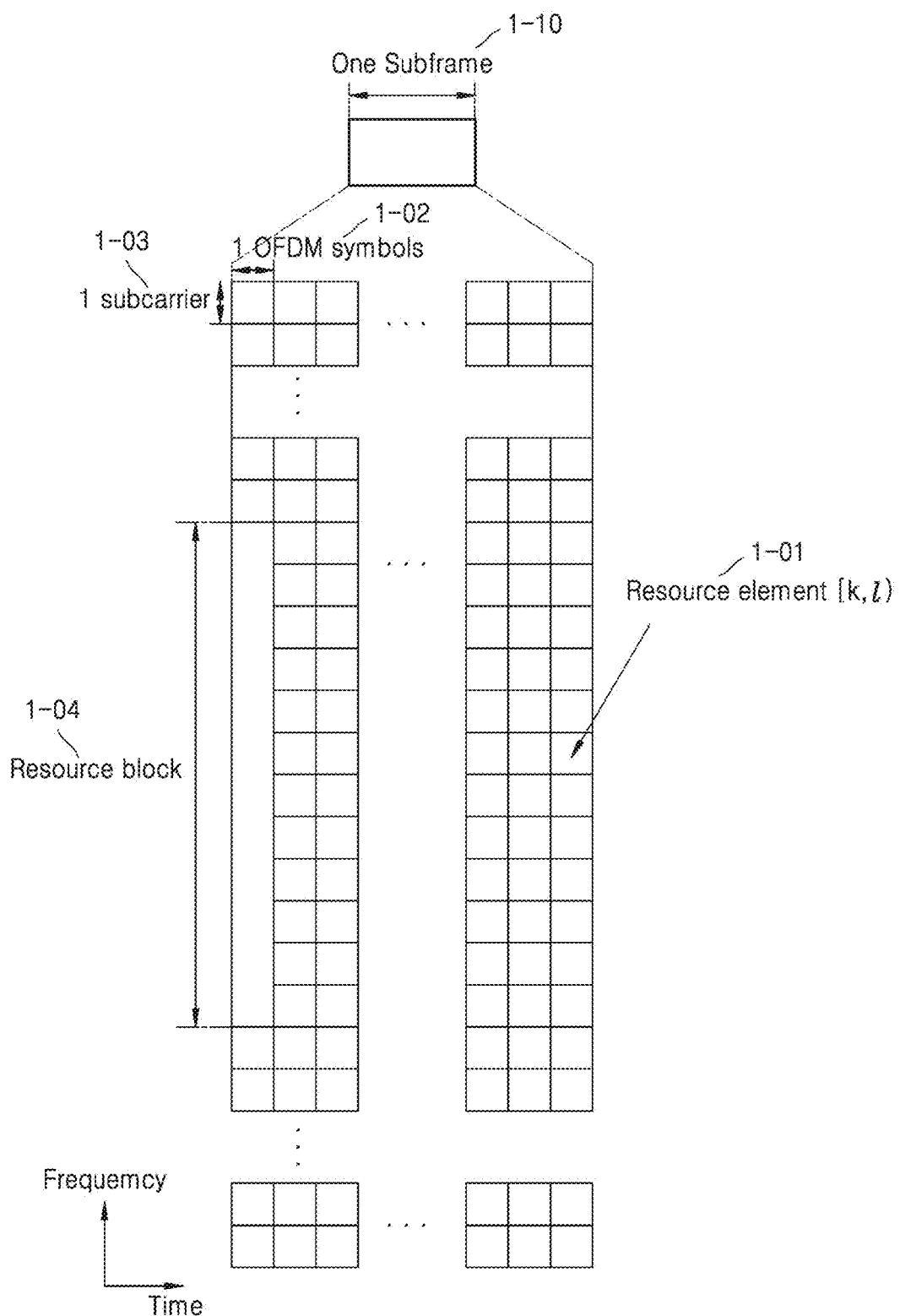
FIG. 1 illustrates a basic structure of a time-frequency domain that is a wireless resource domain, according to an embodiment.

Hereinafter, various embodiments of the disclosure will be described in detail with reference to the accompanying drawings.

In the description of the embodiments, technical matters that are well known in a technical field of the disclosure and are not directly related to the disclosure will not be described. By omitting unnecessary descriptions, the subject matter of the disclosure will be more clearly described without being obscured.

Likewise, some elements may have been exaggerated, omitted, or schematically illustrated in the attached drawings. In addition, the size of each element may not substantially reflect its actual size. In each drawing, the same or corresponding element is denoted by the same reference numeral.

Throughout the disclosure, the expression "at least one of a, b or c" may indicate only a, only b, only c, both a and b, both a and c, both b and c, all of a, b, and c, or variations thereof.

Examples of a terminal may include a UE, a mobile station (MS), a cellular phone, a smartphone, a computer, a multimedia system capable of performing a communication function, etc.

A controller herein may also be referred to as a processor.

A layer (or a layer apparatus) may also be referred to as an entity.

The advantages and features of the disclosure, and methods of achieving the same, will become apparent with reference to the embodiments described below in detail in conjunction with the accompanying drawings. However, the disclosure is not limited to the embodiments disclosed below, but may be embodied in different forms. The embodiments described herein are provided to enable a complete disclosure and to fully convey the scope of the disclosure to one of ordinary skill in the art, and the disclosure may be defined by the scope of the claims.

The same reference numerals in the specification denote the same elements.

The terms used herein are defined in consideration of functions used in the disclosure, and may be changed according to the intention of users or operates, precedents, etc. Accordingly, definitions of the terms should be understood on the basis of the entire description of the present specification.

Hereinafter, a BS is an entity that performs resource allocation of a terminal, and may be at least one of a gNode B, an eNode B, a Node B, a BS, a radio access unit, a BS controller, or a node on a network. A terminal may include a UE, an MS, a cellular phone, a smartphone, a computer, or a multimedia system capable of performing communication functions. In the disclosure, a DL denotes a wireless transmission path of a signal transmitted by a BS to a terminal, and a UL denotes a wireless transmission path of a signal transmitted by a terminal to a BS. While embodiments of the disclosure are described by using an LTE or LTE-advanced (LTE-A) system as an example, the embodiments of the disclosure may also be applied to other communication systems having a similar technical background or channel form. For example, 5G mobile communication technology (5G or new radio (NR)) developed after LTE-A may be included, and the following 5G systems may include systems including existing LTE, LTE-A, and other similar services. Also, the embodiments of the disclosure may be applied to other communication systems through partial modification without departing from the scope of the disclosure according to the determination by one of ordinary skill in the art.

Each block of flowchart illustrations and combinations of blocks in the flowchart illustrations may be implemented by computer program instructions. These computer program instructions may be mounted on a processor of a general purpose computer, special purpose computer, or other programmable data processing equipment, so that the instructions executed by the processor of the computer or other programmable data processing equipment generate a means for performing the functions described in the flowchart block(s). These computer program instructions may be stored in a computer-executable or computer-readable memory that intends a computer or other programmable data processing equipment to implement a function in a specific method, and thus the instructions stored in the computer-executable or computer-readable memory may produce a manufacture product including instructions means performing the functions described in the flowchart block(s). As the computer program instructions may be mounted on the computer or other programmable data processing equipment, by generating a process executable by a computer by performing a series of operation steps on the computer or other programmable data processing equipment, the instructions performing the computer or other programmable data processing equipment may provide operations to execute the functions described in the flowchart block(s).

Each block may represent a portion of a module, a segment, or a code that includes one or more executable instructions for executing a specified logical function(s). In some alternative implementations, the functions noted in the blocks may occur out of order. For example, the two blocks shown in succession may be executed substantially concurrently, or the blocks may sometimes be executed in the reverse order, depending on the corresponding function.

Herein, the term '~unit' refers to a software component or a hardware component such as a field-programmable gate array (FPGA) or an application-specific integrated circuit (ASIC), which performs certain tasks. However, the term '~unit' is not limited to software or hardware. A '~unit' may be configured to be in an addressable storage medium or may be configured to operate one or more processors. Thus, a '~unit' may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Functions provided within components and '~units' may be combined into fewer components and '~units' or further separated into additional components and '~units'. In addition, the components and '~units' may be implemented to operate one or more central processing units (CPUs) in a device or a secure multimedia card. Also, a '~unit' may include one or more processors.

Although a method and apparatus provided as an embodiment of the disclosure are described as an example of a service for improving coverage, the disclosure is not limited thereto and a method of transmitting and receiving a data channel, a control channel, and a reference signal corresponding to other additional services may be used by using a combination of all or some embodiments of the disclosure. Accordingly, embodiments of the disclosure may be applied through partial modification without departing from the scope of the disclosure according to the determination by one of ordinary skill in the art.

A wireless communication system has evolved from an initial one that provides a voice-oriented service to a broadband wireless communication system that provides a high-speed and high-quality packet data service, using communication standards such as $3^{rd}$ generation partnership project (3GPP) high speed packet access (HSPA), LTE or evolved universal terrestrial radio access (E-UTRA), LTE-A, LTE-Pro, 3GPP2 high rate packet data (HRPD), ultra-mobile broadband (UMB), and the institute of electrical and electronics engineers (IEEE) 802.16e.

An LTE system, which is a representative example of a broadband wireless communication system, employs an orthogonal frequency division multiplexing (OFDM) scheme for a DL, and employs a single carrier frequency division multiple access (SC-FDMA) scheme for a UL.

In the multi-access scheme described above, time-frequency resources for carrying data or control information are allocated and operated in a manner to prevent overlapping of the resources, i.e., to establish orthogonality between users in order to identify data or control information of each user.

As future communication systems, after LTE, 5G communication systems should be able to freely reflect various requirements of users and service providers, and thus services simultaneously satisfying the various requirements should be supported. Services considered for 5G communication systems include enhanced mobile broadband (eMBB), massive MTC (mMTC), and ultra-reliable low-latency communication (URLLC).

eMBB may aim to provide a higher data rate than a data rate supported by legacy LTE, LTE-A, or LTE-Pro. For example, in a 5G communication system, eMBB should be able to provide a peak data rate of 20 gigabits per second (Gbps) in a DL and a peak data rate of 10 Gbps in a UL with respect to one BS. Also, the 5G communication system should be able to provide an increased user-perceived data rate of a terminal while providing the peak data rate. In order to satisfy such requirements, in the 5G communication system, various transmission and reception technologies including a further enhanced MIMO transmission technology need to be improved. Also, an LTE system transmits a signal by using a maximum transmission bandwidth of 20 megahertz (MHz) in a frequency band of 2 gigahertz (GHz). In contrast, the 5G communication system transmits a signal by using a frequency bandwidth wider than 20 MHz in a frequency band of 3 to 6 GHz or more, and thus may satisfy the data rate requirements necessary for the 5G communication system.

When a BS supports a wide bandwidth frequency, a BWP technology which divides an entire carrier frequency band into multiple frequency bands, each of which the BS may support for each terminal, is becoming more important. That is, when a BS supports a BWP and a terminal has a low bandwidth capability, the BS may support a small frequency bandwidth to the terminal through the BWP and may reduce energy consumption of the terminal by reducing the frequency bandwidth by changing the BWP. In addition, a different frame structure may be supported for each of multiple BWPs and various services may be provided to one terminal by changing a BWP without latency. A BWP technology may be applied to a control channel or a data channel corresponding one to one between a certain terminal and a BS. Also, for a control channel and a data channel for transmitting a common signal (e.g., a synchronization signal (SS), a physical broadcast channel (PBCH), or system information) to multiple terminals in a system, a BS may transmit the control channel and the data channel only in a configured BWP, thereby reducing energy consumption of the BS.

Further, mMTC is considered to support application services such as IoT in a 5G communication system. In order to efficiently provide IoT, the mMTC should support access to a large number of terminals in a cell, improved battery time, cost reduction of a terminal, etc. Because IoT is attached to various sensors and various devices to provide a communication function, IoT should support a large number of terminals (e.g., 1,000,000 terminals/km$^2$) in a cell. Also, because a terminal supporting the mMTC is likely to be located in a shaded area not covered by a cell, such as a basement of a building, the terminal requires a wider coverage than other services provided by the 5G communication system. The terminal supporting the mMTC should be an inexpensive terminal, and because it is difficult to frequently replace a battery of the terminal, the terminal requires a very long battery lifetime (e.g., 10 to 15 years).

URLLC is a cellular-based wireless communication service used for mission-critical purposes. For example, the URLLC is used in remote control of robots or machinery, industrial automation, unmanned aerial vehicles, remote health care, emergency alert, etc. Accordingly, communication provided by the URLLC should provide very low latency (ultra-low latency) and very high reliability (ultra-high reliability). For example, a service supporting the URLLC should meet an air interface latency of less than 0.5 milliseconds and have a packet error rate of $10^{-5}$ or less. Accordingly, for a service supporting the URLLC, the 5G system should provide a transmission time interval (TTI) that is shorter than that of other services, and a design for broad resource allocation in a frequency band in order to ensure the reliability of a communication link.

The three services considered for the 5G communication system (hereinafter, interchangeably used with 5G system), i.e., eMBB, URLLC, and mMTC, may be multiplexed and transmitted in one system. In order to satisfy different requirements of the services, different transmission and reception schemes and different transmission and reception parameters may be used between the services.

FIG. 1 illustrates a time-frequency domain that is a radio resource domain of a 5G system, according to an embodiment.

Referring to FIG. 1, the horizontal axis represents a time domain, and the vertical axis represents a frequency domain. A basic resource unit in the time-frequency domain is a resource element (RE) 1-01 and may be defined by one OFDM symbol (or discrete Fourier transform spread OFDM (DFT-s-OFDM) symbol) 1-02 in a time axis and one subcarrier 1-03 in a frequency axis. In the frequency domain, $N_{SC}^{RB}$ (e.g., 12) consecutive REs may constitute one resource block (RB) 1-04. Also, in the time domain, $N_{Symb}^{Subframe}$ consecutive OFDM symbols may constitute one subframe 1-10.

Figure 2:
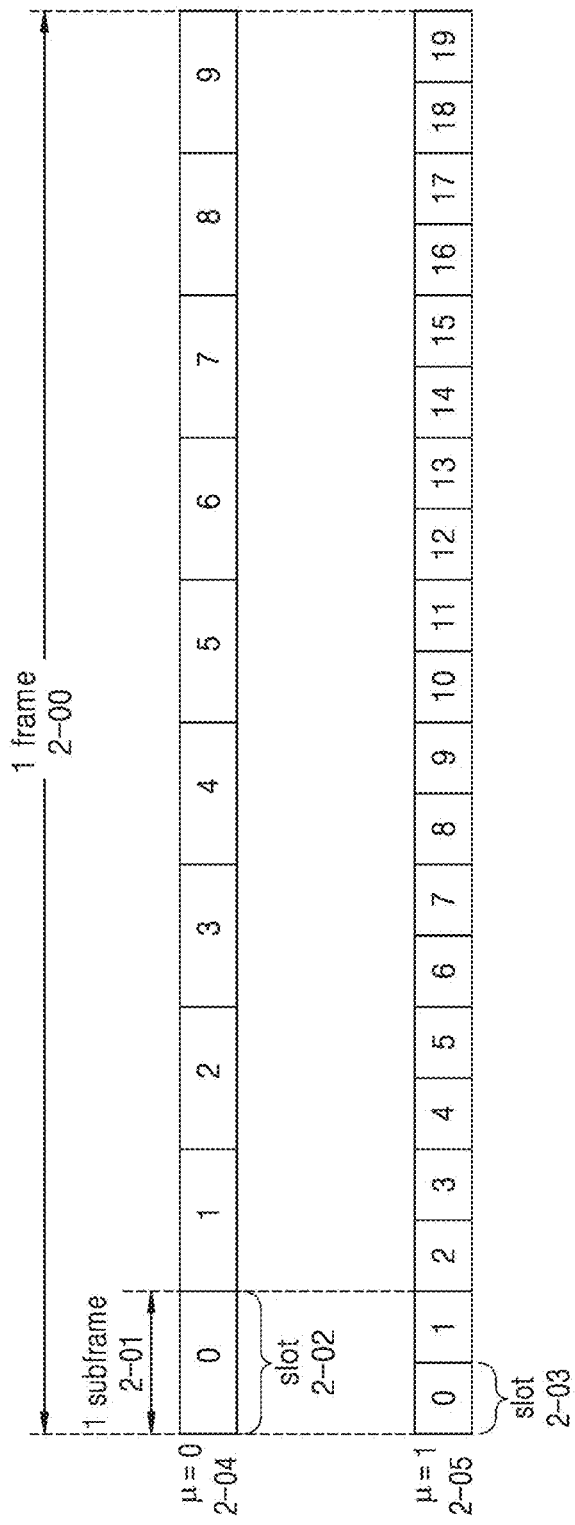
FIG. 2 illustrates a slot structure, according to an embodiment.

FIG. 2 illustrates a slot structure considered in a 5G system, according to an embodiment.

Referring to FIG. 2, structures of a frame 2-00, a subframe 2-01, and slots 2-02 and 2-03 are illustrated. One frame 2-00 may be defined as 10 ms. One subframe 2-01 may be defined as 1 ms, and thus, one frame 2-00 may include a total of 10 subframes 2-01. Also, one slot 2-02 or 2-03 may be defined as 14 OFDM symbols (i.e., the number of symbols per slot ($N_{Symb}^{Slot}$)=14). One subframe 2-01 may include one or more slots 2-02 or 2-03, and the number of slots 2-02 or 2-03 per subframe 2-01 may vary according to a subcarrier spacing configuration value µ (2-04 and 2-05).

FIG. 2 illustrates the subcarrier spacing configuration value µ being 0 (2-04) and the subcarrier configuration value µ being 1 (2-05). When µ=0 (2-04), one subframe 2-01 may include one slot 2-02, and when µ=1 (2-05), one subframe 2-01 may include two slots 2-03. That is, the number of slots per subframe ($N_{Slot}^{Subframe,\mu}$) may vary according to the subcarrier spacing configuration value µ, and the number of slots per frame ($N_{Slot}^{frame,\mu}$) may accordingly vary. $N_{Slot}^{Subframe,\mu}$ and $N_{Slot}^{frame,\mu}$ according to each subcarrier spacing configuration value µ may be defined as shown in Table 1.

TABLE 1

| µ | $N_{Symb}^{Slot}$ | $N_{Slot}^{frame,\mu}$ | $N_{Slot}^{Subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

A BWP configuration in a 5G communication system will now be described in detail with reference to the drawings.

Figure 3:
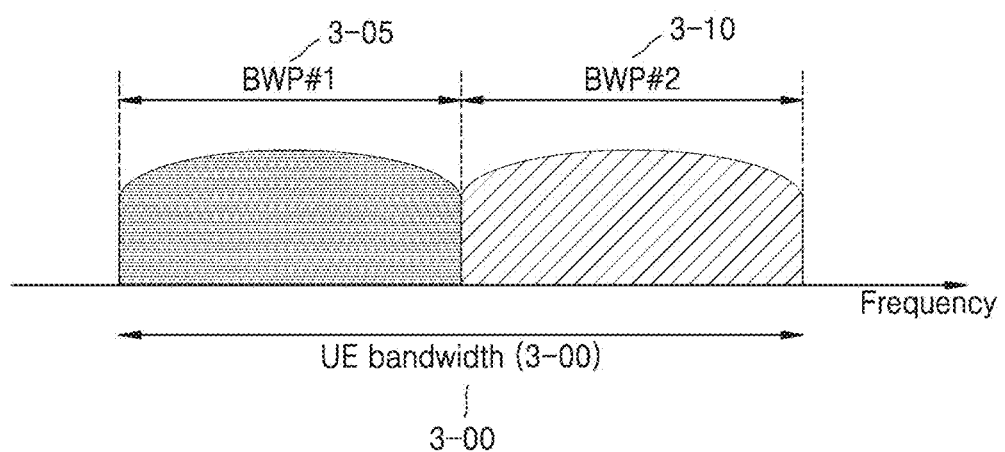
FIG. 3 illustrates a bandwidth part (BWP), according to an embodiment.

FIG. 3 illustrates a BWP configuration in a 5G communication system, according to an embodiment.

Referring to FIG. 3, a UE bandwidth 3-00 includes a BWP #1 3-05 and a BWP #2 3-10. A BS may configure one or more BWPs in a UE, and may configure the following information for each BWP.

TABLE 2

| BWP ::= | SEQUENCE{ |
|---|---|
| Bwp-Id | BWP-Id |
| locationAndBandwidth | INTEGER (1..65536), |
| subcarrierSpacing | ENUMERATED {n0, n1, n2, n3, n4, n5}, |
| cyclicPrefix | ENUMERATED { extended } |
| } | |

The disclosure is not limited to the configurations in FIG. 3 and Table 2, and various parameters related to a BWP in addition to the configuration information may be configured in the UE. The BS may transmit the information to the UE through higher layer signaling, e.g., radio resource control (RRC) signaling. At least one BWP from among the configured one or more BWPs may be activated. Whether the configured BWP is activated may be semi-statically transmitted from the BS to the UE through RRC signaling or may be dynamically transmitted through DCI.

The UE, before RRC connection, may be configured with an initial BWP for an initial connection through a master information block (MIB) from the BS. More specifically, the UE may receive configuration information for a search space and a control region (e.g., a CORESET) where a physical DL control channel (PDCCH) may be transmitted in order to receive system information (e.g., remaining system information (RMSI) or system information block 1 (SIB1)) required for initial access through the MIB in an initial access stage. An identifier (ID) of the control region and the search space configured through the MIB may be considered as 0. The BS may notify configuration information such as frequency allocation information, time allocation information, and a numerology for a control region #0 through the MIB to the UE. The BS may notify configuration information for a monitoring period and an occasion for the control region #0, i.e., configuration information for a search space #0, through the MIB to the UE. The UE may consider a frequency domain configured as the control region #0 obtained from the MIB as the initial BWP for initial access. In this case, an ID of the initial BWP may be considered as 0.

A configuration of a BWP supported by a 5G system may be used for various purposes.

When a bandwidth supported by a UE is smaller than a system bandwidth, a BS may support the UE through a BWP configuration. For example, the BS configures a frequency location (configuration 2) of a BWP in the UE so that the UE transmits and receives data at a specific frequency location within the system bandwidth.

The BS may configure a plurality of BWPs in the UE in order to support different numerologies. For example, in order to support data transmission and reception using both a subcarrier spacing of 15 kHz and a subcarrier spacing of 30 kHz to and from a certain UE, the BS may configure two BWPs as subcarrier spacings of 15 kHz and 30 kHz. Different BWPs may be frequency division multiplexed, and when data is to be transmitted and received at a specific subcarrier spacing, a BWP configured as the specific subcarrier spacing may be activated.

The BS may configure BWPs having different bandwidths in the UE in order to reduce power consumption of the UE. For example, when the UE supports a very large bandwidth, e.g., a bandwidth of 100 MHz, and always transmits and receives data in the bandwidth, vary high power consumption may occur. In particular, monitoring an unnecessary DL control channel by using a large bandwidth of 100 MHz when there is no traffic may be very inefficient in terms of power consumption. In order to reduce power consumption of the UE, the BS may configure a BWP having a relatively small bandwidth, e.g., a BWP of 20 MHz, for the UE. The UE may perform a monitoring operation in the BWP of 20 MHz when there is no traffic, and the UE may transmit and receive data in the BWP of 100 MHz according to an indication from the BS when data is generated.

In the above-described method of configuring a BWP, UEs, before an RRC connection, may receive configuration information regarding an initial BWP through an MIB in an initial access stage. More specifically, a UE may be configured with a control region (e.g., a CORESET) for a DL control channel in which DCI for scheduling an SIB may be transmitted, from an MIB of a PBCH. A bandwidth of the control region configured through the MIB may be considered as an initial BWP, and the UE may receive a physical DL shared channel (PDSCH) through which the SIB is transmitted via the configured initial BWP. The initial BWP may be used for other system information (OSI), paging, and random access as well as for reception of the SIB.

When one or more BWPs are configured in the UE, the BS may indicate to the UE to change a BWP by using a BWP indicator field in the DCI. For example, when a currently activated BWP of the UE is the BWP #1 3-05 in FIG. 3, the BS may indicate the BWP #2 3-10 to the UE through the BWP indicator in the DCI, and the UE may change the BWP to the BWP #2 3-10 indicated by the BWP indicator in the received DCI.

Because a DCI-based BWP change may be indicated by DCI for scheduling a PDSCH or a physical UL shared channel (PUSCH) as described above, when the UE receives a BWP change request, the UE should receive or transmit the PDSCH or the PUSCH scheduled by the DCI in a changed BWP without difficulty. To this end, requirements for a latency time $T_{BWP}$ required for a BWP change are specified in a standard, and may be defined, e.g., as follows.

TABLE 3

| | | BWP switch delay $T_{BWP}$ (slots) | |
|---|---|---|---|
| μ | NR Slot length (ms) | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 17 |

Note 1:
Depends on UE capability.
Note 2:
If the BWP switch involves changing of SCS, the BWP switch delay is determined by the larger one between the SCS before BWP switch and the SCS after BWP switch.

The requirements for the BWP change latency time support Type 1 and Type 2 according to a capability of the UE. The UE may report a supportable BWP latency time type to the BS.

Figure 4:
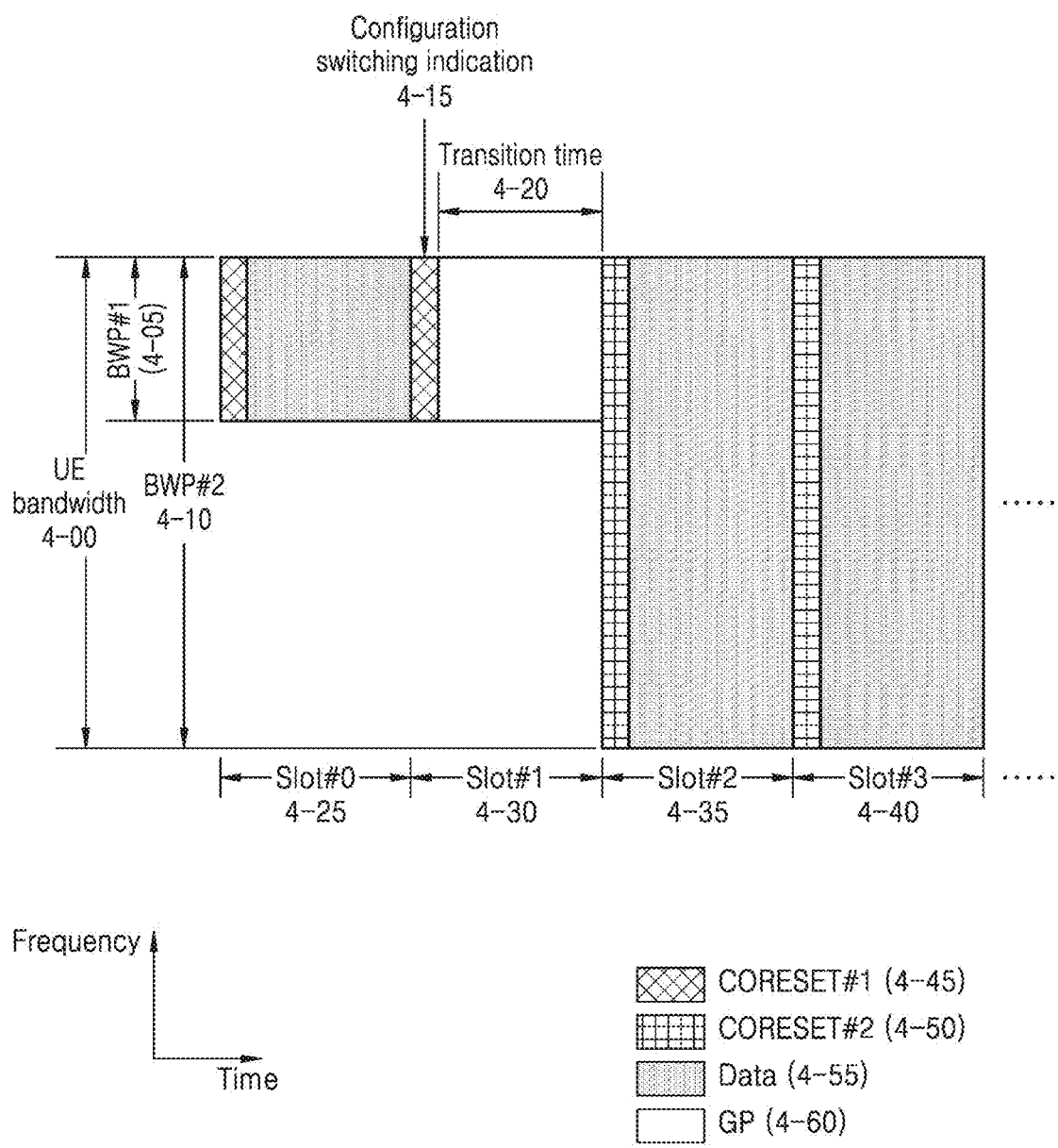
FIG. 4 illustrates a method of changing a BWP, according to an embodiment.

FIG. 4 illustrates a method of changing a bandwidth, according to an embodiment.

Referring to FIG. 4, according to requirements for a BWP change latency time, when a UE receives DCI including a BWP change indicator in a slot n (4-15), the UE may complete changing to a new BWP indicated by the BWP change indicator no later than a slot n+$T_{BWP}$, and may transmit and receive a data channel scheduled by the DCI in the new BWP 4-10. When a BS is to schedule a data channel to the new BWP, the BS may determine time domain resource allocation for the data channel by considering a BWP change latency time $T_{BWP}$ 4-20 of the UE. That is, when the BS is to schedule the data channel to the new BWP, in a method of determining time domain resource allocation for the data channel, the BS may schedule the data channel after the BWP change latency time (4-35 and 4-40). Accordingly, the UE may not expect that the DCI indicating the BWP change indicates a slot offset K0 or K2 smaller than the BWP change latency time $T_{BWP}$ 4-20.

When the UE received the DCI indicating the BWP change (e.g., a DCI format 1_1 or 0_1), the UE may not perform any transmission or reception during a time duration from a third symbol of a slot in which a PDCCH including the DCI is received to a starting point of a slot indicated by the slot offset K0 or K2 indicated by a time domain resource allocation indicator field in the DCI. For example, when the UE receives the DCI indicating the BWP change in the slot n and a slot offset value indicated in the DCI is K, the UE may not perform any transmission or reception during a time duration from a third symbol of the slot n to a symbol before a slot n+K (i.e., a last symbol of a slot n+K−1).

A UE may be configured with one or more BWPs from a BS, and may be additionally configured with parameters (e.g., UL data channel and control channel related configuration information) to be used for transmission and reception for each configured BWP. For example, when the UE is configured with the BWP #1 3-05 and the BWP #2 3-10 in FIG. 3, the UE may be configured with a transmission and reception parameter #1 for the BWP #1 3-05 and may be configured with a transmission and reception parameter #2 for the BWP #2 3-10. When the BWP #1 3-05 is activated, the UE may perform transmission and reception with the BS based on the transmission and reception parameter #1, and when the BWP #2 3-10 is activated, the UE may perform transmission and reception with the BS based on the transmission and reception parameter #2.

More specifically, the following parameters may be configured in the UE from the BS.

First, the following information may be configured, for a UL BWP.

TABLE 4

```
BWP-Uplink ::= SEQUENCE {
    bwp-Id              BWP-Id,
    bwp-Common              BWP-UplinkCommon OPTIONAL, -- Cond SetupOtherBWP
    bwp-Dedicated       BWP-UplinkDedicated OPTIONAL, -- Cond SetupOtherBWP
    ...
}
BWP-UplinkCommon ::= SEQUENCE {
    genericParameters       BWP,
    rach-ConfigCommon       SetupRelease { RACH-ConfigCommon } OPTIONAL,
    -- Need M
    pusch-ConfigCommon      SetupRelease { PUSCH-ConfigCommon } OPTIONAL,
    -- Need M
    pucch-ConfigCommon      SetupRelease { PUCCH-ConfigCommon } OPTIONAL,
    -- Need M
    ...
}
BWP-UplinkDedicated ::= SEQUENCE {
    pucch-Config            SetupRelease { PUCCH-Config } OPTIONAL, -- Need M
    pucch-Config            SetupRelease { PUSCH-Config } OPTIONAL, -- Need M
    configuredGrantConfig       SetupRelease { ConfiguredGrantConfig } OPTIONAL,
        -- Need M
    srs-Config                          SetupRelease { SRS-Config } OPTIONAL,
    -- Need M
    beamFailureRecoveryConfig           SetupRelease { BeamFailureRecoveryConfig }
        OPTIONAL, -- Cond SpCellOnly
    ...
}
```

According to Table 4, the UE may be configured with cell-specific (or cell common or common) transmission related parameters (e.g., random-access channel (RACH), UL control channel (physical UL control channel (PUCCH), and UL data channel (PUSCH) related parameters) from the BS (corresponding to BWP-UplinkCommon). The UE may be configured with UE-specific (or dedicated) transmission related parameters (e.g., PUCCH, PUSCH, grant-free based UL transmission (configured grant PUSCH), and SRS related parameters) from the BS (corresponding to BWP-UplinkDedicated).

The following information may be configured, for a DL BWP.

TABLE 5

```
BWP-Downlink ::= SEQUENCE {
    bwp-Id              BWP-Id,
    bwp-Common              BWP-DownlinkCommon OPTIONAL, -- Cond SetupOtherBWP
    bwp-Dedicated           BWP-DownlinkDedicated OPTIONAL, -- Cond SetupOtherBWP
    ...
}
BWP-DownCommon ::= SEQUENCE {
    genericParameters       BWP,
    pdcch-ConfigCommon          SetupRelease { PDCCH-ConfigCommon } OPTIONAL,
    -- Need M
    pdsch-ConfigCommon          SetupRelease { PDSCH-ConfigCommon } OPTIONAL,
    -- Need M
    ...
}
BWP-DownDedicated ::= SEQUENCE {
    pdcch-Config                SetupRelease { PDCCH-Config } OPTIONAL, -- Need M
    pdsch-Config                SetupRelease { PDSCH-Config } OPTIONAL, -- Need M
    sps-Config          SetupRelease { SPS-Config } OPTIONAL, -- Need M
    radioLinkMonitoringConfig       SetupRelease { radioLinkMonitoringConfig} OPTIONAL,
        - Cond SpCellOnly
    ...
}
```

According to Table 5, the UE may be configured with cell-specific (or cell common or common) reception related parameters (e.g., DL control channel, such as a PDCCH, and DL data channel, such as a PDSCH) related parameters) from the BS (corresponding to BWP-DownlinkCommon). The UE may be configured with UE-specific (or dedicated) reception related parameters (e.g., PDCCH, PDSCH, grant-free based DL data transmission (semi-persistent scheduled PDSCH), and radio link monitoring (RLM) related parameters) from the BS (corresponding to BWP-UplinkDedicated).

Figure 5:
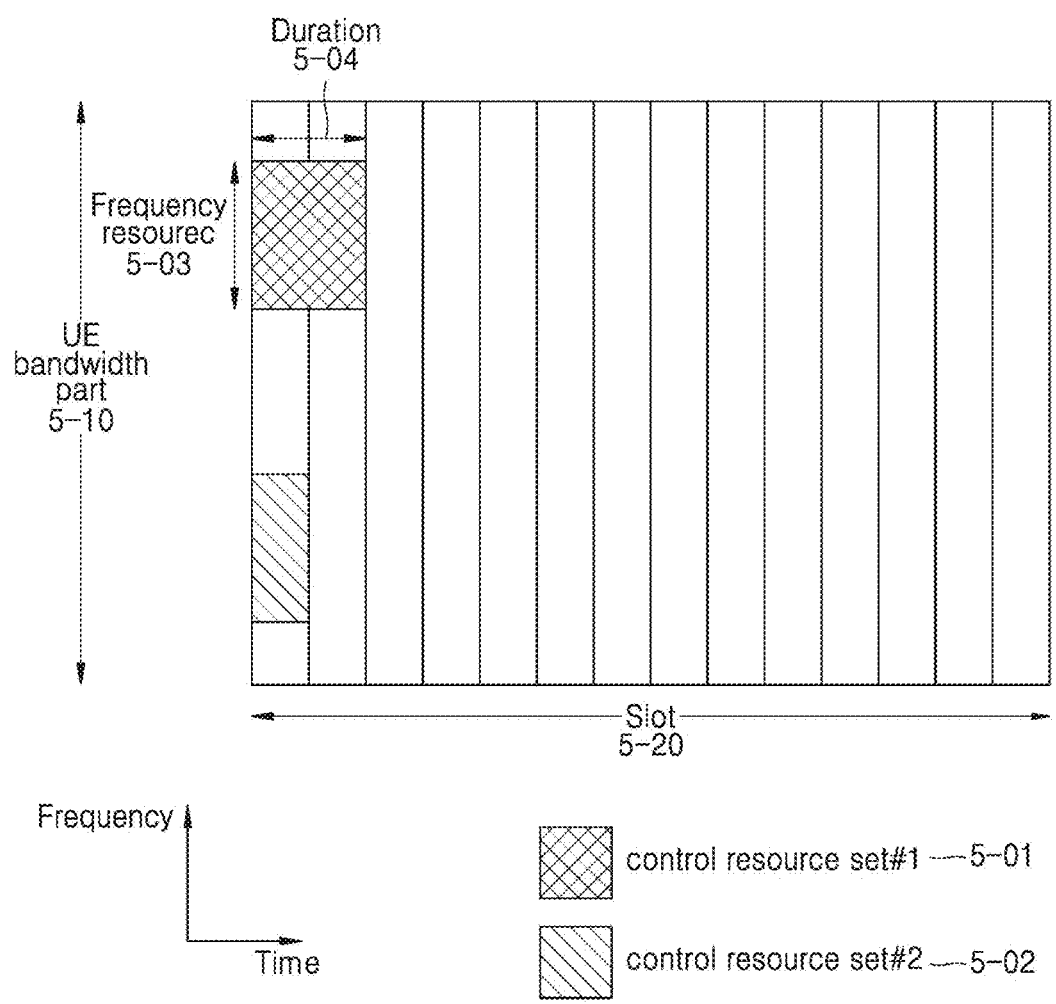
FIG. 5 illustrates a control resource set (CORESET) in which a DL control channel is transmitted, according to an embodiment.

FIG. 5 illustrates a CORESET in which a DL control channel is transmitted, according to an embodiment.

Referring to FIG. 5, a UE BWP 5-10 is configured in a frequency axis, and two control resource sets (a control resource set #1 5-01 and a control resource set #2 5-02) are configured in one slot 5-20 in a time axis. The control resource sets 5-01 and 5-02 may be configured in a specific frequency resource 503 within the entire UE BWP 5-10 along the frequency axis. The control resource sets 5-01 and 5-02 may be configured with one or more OFDM symbols along the time axis, and may be defined by a control resource set duration 5-04. The control resource set #1 5-01 may be configured to have a control resource set duration of two symbols, and the control resource set #2 5-02 may be configured to have a control resource set duration of one symbol.

In a 5G system, a BS may configure each control resource set in a UE through higher layer signaling (e.g., system information, MIB, or RRC signaling). When the control resource set is configured in the UE, it means that information such as a control resource set ID, a frequency location of the control resource set, and a symbol length of the control resource set is provided to the UE. For example, the information provided to configure the control resource set is as follows.

TABLE 6

```
ControlResourceSet ::=                              SEQUENCE {
    -- Corrseponds to L1 parameter 'CORESET-ID'
    controlResourceSetId                            ControlResourceSetId,
    frequencyDomainResources                        BIT STRING (SIZE (45)),
    duration                                        INTEGER (1..maxCoReSetDuration),
    cce-REG-MappingType                                   CHOICE {
        interleaved                                   SEQUENCE {
            reg-BundleSize                          ENUMERATED {n2, n3, n6},
            precoderGranularity                     ENUMERATED {sameAsREG-bundle,
        allContiguousRBs},
            interleaverSize                         ENUMERATED {n2, n3, n6},
            shiftIndex
            INTEGER(0..maxNrofPhysicalResourceBlocks-1)
```

TABLE 6-continued

```
                           OPTIONAL
    },
        nonInterleaved              NULL
    },
        tci-StatesPDCCH             SEQUENCE(SIZE
            (1..maxNrofTCI-StatesPDCCH)) OF TCI-StateId
            OPTIONAL,
        tci-PresentInDCI            ENUMERATED {enabled}
                                    OPTIONAL, --Need S
}
```

A control resource set in a 5G system may include NRBCORESET RBs in a frequency domain, and may include NsymbCORESET∈{1,2,3} symbols in a time axis. One control channel element (CCE) may include 6 resource element groups (REGs), and each REG may be defined as one RB during one OFDM symbol. REGs in one control resource set may be numbered in a time-first manner, starting with 0 for a first OFDM symbol and a lowest-numbered RB in the control resource set.

In a 5G system, an interleaving method and a non-interleaving method are supported as a method of transmitting a PDCCH. A BS may configure whether to perform interleaving transmission or non-interleaving transmission for each control resource set in a UE through higher layer signaling. Interleaving may be performed in units of REG bundles. The term 'REG bundle' may be defined as a set of one or more REGs. The UE may determine a CCE-to-REG mapping method in the control resource set by using the following method based on whether to perform interleaving or non-interleaving transmission configured from the BS.

including CCEs that the UE should attempt to decode at a given AL. Because there are various ALs for bundling up 1, 2, 4, 8 or 16 CCEs, the UE may have a plurality of search spaces. A search space set may be defined as a set of search spaces at all configured ALs.

A search space may be classified into a common search space and a UE-specific search space. A group of UEs or all UEs may investigate a common search space of a PDCCH in order to receive cell-common control information such as a paging message or dynamic scheduling for system information. For example, the UEs may receive PDSCH scheduling allocation information for SIB transmission including cell service provider information or the like by investigating the common search space of the PDCCH. Because a certain group of UEs or all UEs should receive a PDCCH, a common search space may be defined as a set of CCEs that are previously agreed on. A UE may receive scheduling allocation information for a UE-specific PDSCH or PUSCH by investigating a UE-specific search space of a PDCCH. The UE-specific search space may be UE-specifically

TABLE 7

The CCE-to-REG mapping for a control-resource set can be interleaved or non-interleaved and is described by REG bundles:
- REG bundle i is defined as REGs {iL, iL+1, ...,iL+L−1} where L is the REG bundle size, i = 0, 1,..., $N_{REG}^{CORESET} = N_{RB}^{CORESET} = N_{symb}^{CORESET}$ is the number of REGs in the CORESET
- CCE j consists of REG bundles {f(6j/L), f(6j/L+1),...,f(6j/L+6/L−1)} where f(•) is an interleaver For non-interleaved CCE-to-REG mapping, L=6 and f(x)=x.
For interleaved CCE-to-REG mapping, L ∈ {2, 6} for $N_{symb}^{CORESET}$ = 1 and L∈{$N_{symb}^{CORESET}$,6} for $N_{symb}^{CORESET}$ ∈{2, 3}.
The interleaver is defined by
$$f(x) = (rC + c + nshift) \mod(N_{REG}^{CORESET}/L)$$
$$x = cR + r$$
$$r=0, 1,..., C−1$$
$$C= N_{REG}^{CORESET}/LR$$
where R∈{2, 3, 6}.

A basic unit of a DL control channel, i.e., an REG, may include REs to which DCI is mapped and a region to which a demodulation reference signal (DMRS), which is a reference signal (RS) for decoding the REs, is mapped. One REG may include three DMRS REs. The number of CCEs required to transmit a PDCCH may be 1, 2, 4, 8, or 16 according to an aggregation level (AL), and different number of CCEs may be used to implement link adaptation of the DL control channel. For example, when AL=L, one DL control channel may be transmitted through L CCEs.

A UE should detect a signal without knowing information on the DL control channel, and a search space indicating a set of CCEs for blind decoding may be defined. The search space may be a set of DL control channel candidates defined through a function of various system parameters and an identity of the UE.

In a 5G system, parameters for a search space of a PDCCH may be configured by a BS in a UE through higher layer signaling (e.g., SIB, MIB, or RRC signaling). For example, the BS may configure, in the UE, the number of PDCCH candidates at each AL L, a monitoring period for the search space, a monitoring occasion of a symbol unit within a slot for the search space, a search space type (i.e., a common search space or a UE-specific search space), a combination of a radio network temporary identifier (RNTI) and a DCI format to be monitored in the search space, and an index of a control resource set for monitoring the search space. For example, the parameters for the search space of the PDCCH may include the following information.

TABLE 8

```
SearchSpace ::=                         SEQUENCE {
    -- Identity of the search space. SearchSpaceId = 0 identifies the SearchSpace
        configured via PBCH (MIB) or ServingCellConfigCommon.
    searchSpaceId                       SearchSpaceId,
    controlResourceSetId                ControlResourceSetId,
    monitoringSlotPeriodicityAndOffset  CHOICE {
        sl1                                 NULL,
        sl2                                 INTEGER (0..1),
        sl4                                 INTEGER (0..3),
        sl5                                 INTEGER (0..4),
        sl8                                 INTEGER (0..7),
        sl10                                INTEGER (0..9),
        sl16                                INTEGER (0..15),
        sl20                                INTEGER (0..19)
    }
                                        OPTIONAL,
    duration                            INTEGER (2..2559)
    monitoringSymbolsWithinSlot             BIT STRING (SIZE (14))
                                        OPTIONAL,
    nrofCandidates                      SEQUENCE {
        aggregationLevel1               ENUMERATED {n0, n1, n2, n3, n4, n5,
        n6, n8},
        aggregationLevel2               ENUMERATED {n0, n1, n2, n3, n4, n5,
        n6, n8},
        aggregationLevel4               ENUMERATED {n0, n1, n2, n3, n4, n5,
        n6, n8},
        aggregationLevel8               ENUMERATED {n0, n1, n2, n3, n4, n5,
        n6, n8},
        aggregationLevel16                  ENUMERATED {n0, n1, n2, n3, n4,
        n5, n6, n8}
    },
    searchSpaceType                     CHOICE {
        -- Configures this search space as common search space (CSS) and DCI formats
        to monitor.
        common                              SEQUENCE {
        }
        ue-Specific                         SEQUENCE {
            --Indicates whether the UE monitors in this USS for DCI formats 0-0 and
        1-0 or for formats 0-1 and 1-1.
            formats                     ENUMERATED   {formats0-0-And-1-0,
        formats0-1-And-1-1},
            ...
        }
```

The BS may configure one or more search space sets in the UE. The BS may configure a search space set 1 and a search space set 2 in the UE. In the search space set 1, a DCI format A scrambled by an X-RNTI may be configured to be monitored by the UE in a common search space, and in the search space set 2, a DCI format B scrambled by a Y-RNTI may be configured to be monitored by the UE in a UE-specific search space.

According to the configuration information, one or more search space sets may exist in the common search space or the UE-specific search space. For example, a search space set #1 and a search space set #2 may be configured in the common search space, and a search space set #3 and a search space set #4 may be configured in the UE-specific search space.

In the common search space, a combination of a DCI format and an RNTI as follows may be monitored. However, the disclosure is not limited to the following examples.

DCI format 0_0/1_0 with a cyclic redundancy check (CRC) scrambled by cell-RNTI (C-RNTI), configured scheduling RNTI (CS-RNTI), semi-persistent channel state information RNTI (SP-CSI-RNTI), random access RNTI (RA-RNTI), temporary cell RNTI (TC-RNTI), paging RNTI (P-RNTI), system information RNTI (SI-RNTI)

DCI format 2_0 with CRC scrambled by slot format indicator RNTI (SFI-RNTI)

DCI format 2_1 with CRC scrambled by interruption RNTI (INT-RNTI)

DCI format 2_2 with CRC scrambled by transmit power control for PUSCH RNTI (TPC-PUSCH-RNTI), TPC for PUCCH RNTI (TPC-PUCCH-RNTI)

DCI format 2_3 with CRC scrambled by TPC for SRS RNTI (TPC-SRS-RNTI)

In the UE-specific search space, a combination of a DCI format and an RNTI as follows may be monitored. However, the disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI Specified RNTIs may comply with the following definitions and uses.

C-RNTI: used for scheduling a UE-specific PDSCH

TC-RNTI: used for scheduling a UE-specific PDSCH

CS-RNTI: used for scheduling a semi-statically configured UE-specific PDSCH

RA-RNTI: used for scheduling a PDSCH in a random access stage

P-RNTI: used for scheduling a PDSCH for transmitting paging

SI-RNTI: used for scheduling a PDSCH for transmitting system information

INT-RNTI: used for notifying whether a PDSCH is punctured

TPC-PUSCH-RNTI: used for indicating a power control command for a PUSCH

TPC-PUCCH-RNTI: used for indicating a power control command for a PUCCH

TPC-SRS-RNTI: used for indicating a power control command for an SRS

The above-described DCI formats may comply with the following definitions.

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, a BS may use a DCI format 0_0 or a DCI format 0_1 to schedule a PUSCH in one cell.

The DCI format 0_0 includes at least the following pieces of information when transmitted along with a CRC scrambled by at least one of a C-RNTI, a CS-RNTI, or a modulation coding scheme cell RNTI (MCS-C-RNTI).

ID for DCI formats (1 bit): DCI format indicator, which is always set to 0

Frequency domain resource assignment (payload is determined according to frequency domain resource allocation): indicates frequency domain resource allocation, and $\lceil \log_2(N_{RB}^{UL,BWP}(N_{RB}^{UL,BWP}+1)/2) \rceil$ is a size of an active UL BWP.

Time domain resource assignment (4 bits): indicates time domain resource allocation.

Frequency hopping flag (1 bit): indicates whether frequency hopping of a PUSCH allocated by DCI is performed.

Modulation and coding scheme (5 bits): indicates a modulation order and a coding rate used for PUSCH transmission.

New data indicator (1 bit): indicates whether a PUSCH corresponds to initial transmission or retransmission depending on toggling.

Redundancy version (2 bits): indicates a redundancy version used for PUSCH transmission.

Hybrid automatic repeat request (HARQ) process number (4 bits): indicates a HARQ process number used for PUSCH transmission.

Transmit power control (TPC) command for scheduled PUSCH (2 bits): PUSCH power control indicator.

UL/supplementary UL (SUL) indicator (1 bit): indicates whether an SUL of a PUSCH allocated by DCI is transmitted. When transmission using an SUL is not performed, a bit length of a corresponding field is 0 bit.

The DCI format 0_1 includes at least the following pieces of information when transmitted along with a CRC scrambled by at least one of a C-RNTI, a CS-RNTI, an SP-CSI-RNTI, or an MCS-C-RNTI.

ID for DCI formats (1 bit): DCI format indicator, which is set to 0

Carrier indicator (0 or 3 bits): indicates a component carrier (CC) (or cell) in which a PUSCH allocated by DCI is transmitted.

UL/SUL indicator (0 or 1 bit): indicates whether an SUL of a PUSCH allocated by DCI is transmitted.

BWP (0, 1, or 2 bits): indicates a BWP in which a PUSCH allocated by DCI is transmitted.

Frequency domain resource assignment (payload is determined according to frequency domain resource allocation): indicates frequency domain resource allocation, and $N_{RB}^{DL,BWP}$—is a size of an active DL BWP.

Time domain resource assignment (0, 1, 2, 3, or 4 bits): indicates time domain resource allocation.

Frequency hopping flag (0 or 1 bit): indicates whether frequency hopping of a PUSCH allocated by DCI is performed.

Modulation and coding scheme (5 bits): indicates a modulation order and a coding rate used for PUSCH transmission.

New data indicator (1 bit): indicates whether a PUSCH corresponds to initial transmission or retransmission depending on toggling.

Redundancy version (2 bits): indicates a redundancy version used for PUSCH transmission.

HARQ process number (4 bits): indicates an HARQ process number used for PUSCH transmission.

1st DL assignment index (DAI) (1 or 2 bits): indicates a DAI for HARQ-acknowledgement (ACK) codebook generation.

2nd DL assignment index (0 or 2 bits): indicates a DAI for HARQ-ACK codebook generation.

TPC command for scheduled PUSCH (2 bits): PUSCH TPC indicator allocated by DCI.

SRS resource indicator (variable according to an SRS usage configuration): indicates a transmission precoding configuration of a PUSCH allocated by DCI through an SRS resource.

Precoding information and number of layers (0, 1, 2, 3, 4, 5, or 6 bits): indicates transmission precoding information of a PUSCH allocated by DCI and the number of transmission layers.

Antenna port (2, 3, 4, or 5 bits): indicates a transmission DMRS port of a PUSCH allocated by DCI and a code division multiplexing (CDM) group without data.

SRS request (2 or 3 bits): indicates an SRS resource requested to be transmitted through DCI.

Channel state information (CSI) request (0, 1, 2, 3, 4, 5, or 6 bits): indicates a CSI report trigger state requested to be transmitted through DCI.

Code block group (CBG) transmission information (0, 2, 4, 6, or 8 bits): indicator indicating whether code block groups in a PUSCH allocated by DCI are transmitted.

Phase tracking reference signal (PTRS)-DMRS association (0 or 2 bits):

indicates an association between a PTRS port and a DMRS port of a PUSCH allocated by DCI.

Beta_offset indicator (0 or 2 bits): indicates an offset value used when an HARQ-ACK or a CSI report is multiplexed to a PUSCH.

DMRS sequence initialization (0 or 1 bit): DMRS scrambling ID selection indicator.

UL-shared channel (SCH) indicator (0 or 1 bit): indicates whether a UL-SCH is included in a PUSCH allocated by DCI.

For example, a BS may use a DCI format 1_0 or a DCI format 1_1 to schedule a PDSCH in one cell.

The DCI format 1_0 includes at least the following pieces of information when transmitted along with a CRC scrambled by a C-RNTI, a CS-RNTI, or an MCS-C-RNTI.

ID for DCI formats (1 bit): DCI format indicator, which is set to 1

Frequency domain resource assignment $\lceil \log_2(N_{RB}^{DL,BWP}(N_{RB}^{DL,BWP}+1)/2) \rceil$ bits): indicates frequency domain resource allocation, and when the DCI format 1_0 is monitored in a UE-specific search space, $N_{RB}^{DL,BWP}$ is a size of an active DL BWP and otherwise, $N_{RB}^{DL,BWP}$—is a size of an initial DL BWP. A detailed method is described in the above frequency domain resource allocation.

When all values of a frequency domain resource assignment field are set to 1, the DCI format 1_0 indicates a command for a random access procedure and all remaining fields are configured as follows.

Random Access Preamble index (6 bits): indicates an index of a preamble for performing random access.

UL/SUL indicator (1 bit): when all values of a random access preamble index field are not set to 0 and a UE is configured with supplementaryUplink in a higher layer parameter ServingCellConfig, the field indicates a UL carrier for transmitting a physical RACH (PRACH).

SS/PBCH index (6 bits): when all values of the random access preamble index field are not set to 0, the field indicates an SS/PBCH for PRACH transmission.

PRACH Mask index (4 bits): when all values of the random access preamble index field are not set to 0, the field indicates a RACH duration associated with an SS/PBCH indicated by an SS/PBCH index.

When all bits of the frequency domain resource assignment field are not set to 1, remaining fields are configured as follows.

Time domain resource assignment (4 bits): indicates time domain resource allocation according to the above description.

Virtual RB (VRB)-to-physical RB (PRB) mapping (1 bit): 0 indicates non-interleaved VRB-to-PRB mapping, and 1 indicates interleaved VRB-to-PRB mapping.

Modulation and coding scheme (5 bits): indicates a modulation order and a coding rate used for PDSCH transmission.

New data indicator (1 bit): indicates whether a PDSCH corresponds to initial transmission or retransmission according to toggling.

Redundancy version (2 bits): indicates a redundancy version used for PDSCH transmission.

HARQ process number (4 bits): indicates an HARQ process number used for PDSCH transmission.

DL assignment index (2 bits): DAI indicator

TPC command for scheduled PUCCH (2 bits): PUCCH power control indicator

PUCCH resource indicator (3 bits): PUCCH resource indicator, which indicates one of eight resources configured via a higher layer.

PDSCH-to-HARQ_feedback timing indicator (3 bits): HARQ feedback timing indicator, which indicates one of eight feedback timing offsets configured via a higher layer.

The DCI format 1_1 includes the following pieces of information when transmitted along with a CRC scrambled by a C-RNTI, a CS-RNTI, or an MCS-C-RNTI.

ID for DCI formats (1 bit): DCI format indicator, which is always set to 1

Carrier indicator (0 or 3 bits): indicates a CC (or cell) in which a PDSCH allocated by DCI is transmitted.

BWP indicator (0, 1, or 2 bits): indicates a BWP in which a PDSCH allocated by DCI is transmitted.

Frequency domain resource assignment (payload is determined according to the frequency domain resource allocation): indicates frequency domain resource allocation, and $N_{RB}^{DL,BWP}$—is a size of an active DL BWP. A detailed method is described in the above frequency domain resource allocation.

Time domain resource assignment (0, 1, 2, 3, or 4 bits): indicates time domain resource allocation according to the above description.

VRB-to-PRB mapping (0 or 1 bit): 0 indicates non-interleaved VRB-to-PRB mapping, and 1 indicates interleaved VRB-to-PRB mapping. When frequency domain resource allocation is configured as resource type 0, the information is 0 bit.

PRB bundling size indicator (0 or 1 bit): 0 bit when a higher layer parameter prb-BundlingType is not configured or set to 'static', and 1 bit when the higher layer parameter is set to 'dynamic'.

Rate matching indicator (0, 1, or 2 bits): indicates a rate matching pattern.

Zero power (ZP) CSI-RS trigger (0, 1, or 2 bits): indicator triggering an AP ZP CSI-RS.

For transport block 1:

Modulation and coding scheme (5 bits): indicates a modulation order and a coding rate used for PDSCH transmission.

New data indicator (1 bit): indicates whether a PDSCH corresponds to initial transmission or retransmission according to toggling.

Redundancy version (2 bits): indicates a redundancy version used for PDSCH transmission.

For transport block 2:

Modulation and coding scheme (5 bits): indicates a modulation order and a coding rate used for PDSCH transmission.

New data indicator (1 bit): indicates whether a PDSCH corresponds to initial transmission or retransmission according to toggling.

Redundancy version (2 bits): indicates a redundancy version used for PDSCH transmission.

HARQ process number (4 bits): indicates an HARQ process number used for PDSCH transmission.

DL assignment index (0, 2, or 4 bits): DAI indicator

TPC command for scheduled PUCCH (2 bits): PUCCH power control indicator

PUCCH resource indicator (3 bits): PUCCH resource indicator, which indicates one of eight resources configured via a higher layer.

PDSCH-to-HARQ_feedback timing indicator (0, 1, 2, or 3 bits): HARQ feedback timing indicator, which indicates one of eight feedback timing offsets configured via a higher layer.

Antenna port (4, 5, or 6 bits): indicates a DMRS port and a CDM group without data.

Transmission configuration indication (TCI) (0 or 3 bits): TCI indicator.

SRS request (2 or 3 bits): SRS transmission request indicator.

CBG transmission information (0, 2, 4, 6, or 8 bits): indicator indicating whether code block groups in an allocated PDSCH are transmitted. 0 indicates that a CBG is not transmitted, and 1 indicates that a CBG is transmitted.

CBG flushing out information (0 or 1 bit): indicator indicating whether previous CBGs are contaminated, and 0 indicates that the CBGs may be contaminated and 1 indicates that the CBGs may be combinable in retransmission reception.

DMRS sequence initialization (1 bit): DMRS scrambling ID selection indicator

For example, a BS may use a DCI format 2_3 to transmit a TPC command group for SRS transmission to one or more UEs.

The DCI format 2_3 includes the following pieces of information when transmitted along with a CRC scrambled by a TPC-SRS-RNTI.

block number 1, block number 2, . . . , block number B: indicates a starting position of a block by using a higher layer parameter staringBitOfFormat2-3 or startingBit-OfFormat2-3SUL-v1530.

When a UE is configured by a higher layer parameter srs-TPC-PDCCH-Group set to typeA without a PUCCH and a PUSCH or for an UL on which SRS power control is not associated with PUSCH power control, one block is configured for the UE along with the following fields via a higher layer:

SRS request (0 or 2 bits): when this field is present as a field for notifying an SRS request, indicates an AP SRS resource set to be triggered.

TPC command number 1, TPC command number 2, . . . , TPC command number N: TPC command applied to each UL carrier When a UE is configured by a higher layer parameter srs-TPC-PDCCH-Group set to typeB without a PUCCH or a PUSCH or for an UL on which SRS power control is not associated with PUSCH power control, one or more blocks are configured for the UE via a higher layer to each be applied along with the following fields to an UL carrier:

SRS request (0 or 2 bits): when this field is present as a field for notifying an SRS request, the field indicates an AP SRS resource set to be triggered.

TPC command (2 bits): TPC command for SRS transmission

The number of pieces of DCI having different sizes that a UE may receive per slot in a cell is up to 4. The number of pieces of DCI having different sizes scrambled by a C-RNTI that a UE may receive per slot in a cell is up to 3.

In a 5G system, a search space of an AL L in a control resource set p and a search space set s may be expressed as Equation (1).

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i \quad (1)$$

$L$: aggregation level $n_{CI}$: carrier index $N_{CCE,p}$: total number of CCEs in control resource set $p$ $n_{s,f}^\mu$: slot index $M_{p,s,max}^{(L)}$: number of PDCCH candidates of aggregation level $L$ $m_{s,n_{CI}} = 0, \ldots ,$ $M_{p,s,max}^{(L)} - 1$: indexes of PDCCH candidates of aggregation level $L$ $i = 0, \ldots , L - 1$

, , , , $nRNTI$: UE ID $Y_{p,n_{s,f}^\mu}$ may be 0 in a common search space.

In a UE-specific search space, $Y_{p,n_{s,f}^\mu}$ may vary according to an identity of a UE (a C-RNTI or an ID configured for the UE by a BS) and a time index.

A method of configuring a TCI state, which is a means for indicating or exchanging quasi co-location (QCL) information between a UE and a BS in a 5G communication system, will now be described in detail.

The BS may configure and indicate a TCI state between two different RSs or channels through appropriate signaling, to notify a QCL relationship between the different RSs or channels. When different RSs or channels are QCLed, when a channel is estimated through a reference RS antenna port A (reference RS #A) and a target RS antenna port B (target RS #B) which are in a QCL relationship, the UE is allowed to apply some or all of large-scale channel parameters estimated in the antenna port A to perform a channel measurement from the antenna port B. QCL may require different parameters to be associated with one another according to situations including 1) time tracking affected by average delay and delay spread, 2) frequency tracking affected by Doppler shift and Doppler spread, 3) radio resource management (RRM) affected by average gain, and 4) beam management (BM) affected by a spatial parameter. Accordingly, NR supports four types of QCL relationships as shown in Table 10.

TABLE 10

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial Rx parameter may be a generic term for all or some of various parameters including angle of arrival (AoA), power angular spectrum (PAS) of AoA, angle of departure (AoD), PAS of AoD, transmit/receive channel correlation, transmit/receive beamforming, and spatial channel correlation.

The QCL relationships may be configured in the UE through an RRC parameter TCI-State and QCL-Info as shown in Table 11.

Referring to Table 11, the BS may configure at least one TCI state in the UE to notify the UE of up to two QCL relationships (e.g., qcl-Type1 and qcl-Type2) relating to an RS referring to an ID of the TCI state, i.e., a target RS. In this case, each QCL information (QCL-Info) included in each TCI state includes a serving cell index and a BWP index of a reference RS indicated by the QCL information, a type and an ID of the reference RS, and a QCL type as shown in Table 10.

TABLE 11

| TCI-State ::= | SEQUENCE { | |
|---|---|---|
| tci-StateId | TCI-StateId, | |
| qcl-Type1 | QCL-Info, | |
| qcl-Type2 | QCL-Info | OPTIONAL, --Need R |
| ... | | |
| } | | |
| QCL-Info ::= | SEQUENCE { | |

TABLE 11-continued

```
    cell                    ServCellIndex        OPTIONAL, -- Need R
    bwp-ID                  BWP-Id
        OPTIONAL, -- Cond CSI-RS-Indicated
    referenceSignal         CHOICE {
        csi-rs              NZP-CSI-RS-ResourceId,
        ssb                 SSB-Index
    },
    qcl-Type                ENUMERATED {typeA, typeB, typeC, type D},
    ...
}
```

A method of configuring spatial relation information SpatialRelationInfo, which is a means for indicating UL beam information between a UE and a BS in a 5G communication system, will now be described in detail.

The BS may configure, in an UL channel or signal A (channel or signal referring to the spatial relation information Spatial Relation Info), a relationship with another DL channel or signal or UL channel or signal B (information referenceSignal included in the spatial relation information SpatialRelationInfo) through appropriate signaling. The UE uses a beam direction, which is used for reception or transmission of the channel or signal B, for transmission of the channel or signal A based on the relationship.

A configuration of the spatial relation information Spatial RelationlInfo may vary according to a type of the UL channel or signal referring to the spatial relation information SpatialsRelationInfo. For example, SpatialRelationInfo referenced by an SRS resource may include information referenceSignal for determining a PUCCH transmission beam as shown in Table 12.

TABLE 12

```
SRS-SpatialRelationInfo ::=          SEQUENCE {
    servingCellId                    ServCellIndex
            OPTIONAL,   -- Need S
        (serving cell index of reference RS indicated by spatial relation information)
    referenceSignal                  CHOICE {
        ssb-Index                    SSB-Index,
        csi-RS-Index                 NZP-CSI-RS-ResourceId,
        srs                          SEQUENCE {
            resourceId               SRS-ResourceID,
            uplinkBWP                BWP-Id
        }
    } (one of CSI-RS ID, SSB ID, or SRS resource ID indicated by spatial relation information)
}
```

Although a TCI state is used to indicate a beam of a DL channel (reception spatial filter value/type of the UE) and SpatialRelationInfo is used to indicate a beam of an UL channel (transmission spatial filter value/type of the UE), it does not imply a limitation according to UL/DL types and mutual extension may be possible. For example, a conventional DL TCI state may be extended to a UL TCI state by adding a UL channel or signal to a type of a target RS that may refer to a TCI state or adding a UL channel or signal to a type of referenceSignal (reference RS) included in TCI state or QCL-Info. Although there are various other extension methods, such as DL-UL joint TCI state, not all methods will be described in order not to obscure the gist of the disclosure.

A BS may configure configuration information for transmission of an UL reference signal in a UE. Although an SRS or an AP SRS is described as a UL reference signal, this is merely an example of a UL reference signal and the disclosure is not limited thereto. The BS may configure at least one SRS configuration for each UL BWP to transmit configuration information for SRS transmission, and may also configure at least one SRS resource set for each SRS configuration. For example, the BS and the UE may transmit and receive signaling information as below to transmit information on an SRS resource set (example according to Release 15).

TABLE 13

```
BWP-UplinkDedicated ::=                    SEQUENCE {
    pucch-Config          SetupRelease { PUCCH-Config }    OPTIONAL, -- Need M
       (PUCCH configuration for one BWP of serving cell)
    pusch-Config          SetupRelease { PUSCH-Config }    OPTIONAL, -- Need M
       (PUSCH configuration for one BWP of serving cell)
    configuredGrantConfig  SetupRelease {ConfiguredGrantConfig} OPTIONAL, -- Need M
       (configuration for type 1 or type 2 of Configured-Grant)
    srs-Config            SetupRelease { SRS-Config }      OPTIONAL, -- Need M
       (uplink sounging reference signal (SRS) configuration)
    beamFailureRecoveryConfig         SetupRelease { BeamFailureRecoveryConfig }
OPTIONAL,   -- Cond SpCellOnly
       (configuration for beam failure recovery)
       ...
}
```

[15]

srs-Config may be used to configure SRS transmission, to define an SRS-Resources list and an SRS-ResourceSets list and transmit and receive signaling information as follows.

TABLE 14

```
SRS-Config ::=                                      SEQUENCE {
    srs-ResourceSetToReleaseList            SEQUENCE (SIZE (1..maxNrofSRS-
ResourceSets) ) OF SRS-ResourceSetId         OPTIONAL,        -- Need N
(released SRS resource set list)
    srs-ResourceSetToAddModList             SEQUENCE (SIZE (1..maxNrofSRS-
ResourceSets) ) OF SRS-ResourceSet                    OPTIONAL ,      -- Need N
(added or modified SRS resource set list)
    srs-ResourceToReleaseList                         SEQUENCE (SIZE (1..maxNrofSRS-
Resources) ) OF SRS-ResourceId                         OPTIONAL,       -- Need N
(released SRS resource list)
    srs-ResourceToAddModList                          SEQUENCE (SIZE(1..maxNrofSRS-
Resources) ) OF SRS-Resource                           OPTIONAL,      --Need N
(added or modified SRS resource list)
    tpc-Accumulation                                  ENUMERATED {disabled}
       OPTIONAL,   -- Need S
(indicate whether to accumulate TPC commands)
    ...
}
SRS-ResourceSet : :=                       SEQUENCE {
    srs-ResourceSetId                                 SRS-ResourceSetId,
    srs-ResourceIdList                                SEQUENCE
(SIZE(1..maxNrofSRS-ResourcesPerSet) ) OF SRS-ResourceId    OPTIONAL, -- Cond
Setup
(IDs of SRS-resources included in SRS resource set)
    resourceType                                      CHOICE {
(time domain behavior of SRS resource configuration)
       aperiodic                                              SEQUENCE {
(aperiodic SRS configuration)
              aperiodicSRS-ResourceTrigger               INTEGER (1..maxNrofSRS-
TriggerStates-1),
(DCI code point upon which SRS is transmitted according to SRS resource set configuration of
corresponding field)
              csi-RS                                                     NZP-
CSI-RS-ResourceId
       OPTIONAL,     -- Cond NonCodebook
(CSI-RS resource ID associated with SRS resource set)
              slotOffset
       INTEGER (1..32)
                     OPTIONAL, -- Need S
(slot offset between DCI triggering time and actual SRS resource set transmission)
              ...,
       [ [
       aperiodicSRS-ResourceTriggerList-v1530          SEQUENCE (SIZE(1..maxNrofSRS-
TriggerStates-2) )
                                   OF INTEGER (1..maxNrofSRS-TriggerStates-1)
OPTIONAL   -- Need M
       ] ]
       },
(additional DCI code point list upon which SRS is transmitted according to SRS resource set
configuration of corresponding field)
       semi-persistent                     SEQUENCE {
(semi-persistent SRS configuration)
           associatedCSI-RS                NZP-CSI-RS-ResourceId
OPTIONAL, -- Cond NonCodebook
(CSI-RS resource ID associated with non-codebook based SRS resource set)
       ...
```

TABLE 14-continued

```
    },
    periodic                              SEQUENCE {
      associatedCSI-RS                    NZP-CSI-RS-ResourceId
OPTIONAL, -- Cond NonCodebook
(periodic SRS configuration)
      ...
    }
  },
  usage                                   ENUMERATED {beamManagement, codebook, nonCodebook,
antennaSwitching},
(indicate usage of SRS resource set)
  alpha                                   Alpha
OPTIONAL, -- Need S
(alpha value for SRS power control)
  p0                                      INTEGER (-202..24)
OPTIONAL, -- Cond Setup
(P0 value for SRS power control)
  pathlossReferenceRS                     CHOICE {
(reference signal for SRS path loss estimation)
    ssb-Index                             SSB-Index,
(path loss reference SSB/PBCH block index)
    csi-RS-Index                          NZP-CSI-RS-ResourceId
(path loss reference CSI-RS resource index)
  }
OPTIONAL, -- Need M
  srs-PowerControlAdjustmentStates        ENUMERATED { sameAsFci2, separateClosedLoop}
OPTIONAL, -- Need S
(indicate method of performing SRS power control adjustment)
  ...
}
SRS-ResourceSetId ::=                     INTEGER (0..maxNrofSRS-ResourceSets-1)
SRS-Resource ::=                          SEQUENCE {
  srs-ResourceId                          SRS-ResourceId,
  nrofSRS-Ports                           ENUMERATED {port1, ports2, ports4},
  ptrs-PortIndex                          ENUMERATED {n0, n1}
OPTIONAL, -- Need R
(PTRS port index of SRS resource for supporting non-codebook based uplink MIMO resource)
  transmissionComb                        CHOICE {
(SRS comb value and comb offset, configured for comb value of 2 or 4)
    n2                                    SEQUENCE {
      combOffset-n2                       INTEGER (0..1),
(comb offset, when comb value is 2)
      cyclicShift-n2                      INTEGER (0..7)
(cyclic shift configuration, when comb value is 2)
    },
    n4                                    SEQUENCE {
      combOffset-n4                       INTEGER (0..3),
(comb offset, when comb value is 4)
      cyclicShift-n4                      INTEGER (0..11)
(cyclic shift configuration, when comb value is 4)
    }
  },
  resourceMapping                         SEQUENCE {
(OFDM symbol position information of SRS resource)
    startPosition                         INTEGER (0..5),
(time domain SRS resource position, 0 is mapped to last symbol, 1 is mapped to second last
symbol)
    nrofSymbols                           ENUMERATED {n1, n2, n4}
    repetitionFactor                      ENUMERATED {n1, n2, n4}
  },
  freqDomainPosition                      INTEGER (0..67),
(frequency domain position of SRS resource)
  freqDomainShift                         INTEGER (0..268),
(frequency domain shift value of SRS resource)
  freqHopping                             SEQUENCE {
(frequency hopping information of SRS resource)
    c-SRS                                 INTEGER (0..63),
($C_{SRS}$ information)
    b-SRS                                 INTEGER (0..3) ,
($C_{SRS}$ information)
    b-hop                                 INTEGER (0..3)
($B_{hop}$ information)
  },
  groupOrSequenceHopping                  ENUMERATED { neither, groupHopping, sequenceHopping },
(information on whether to perform group hopping or sequence hopping for SRS resource)
  resourceType                            CHOICE {
    aperiodic                             SEQUENCE {
      ...
    },
    semi-persistent                       SEQUENCE {
```

TABLE 14-continued

```
    periodicityAndOffset-sp                    SRS-PeriodicityAndOffset,
(period and slot offset information of semi-persistent SRS resource)
    ...
  },
    periodic                                   SEQUENCE {
      periodicityAndOffset-p                   SRS-PeriodicityAndOffset,
(period and slot offset information of periodic SRS resource)
      ...
    }
  },
  sequenceId                                   INTEGER (0..1023),
(initial sequence ID for performing group hopping and sequence hopping)
  spatialRelationInfo                          SRS-SpatialRelationInfo
OPTIONAL, -- Need R
(spatial relation configuration information between target SRS and reference RS)
  ...
}
SRS-PeriodicityAndOffset ::=                   CHOICE {
  sl1                                          NULL,
  sl2                                          INTEGER(0..1),
  sl4                                          INTEGER(0..3),
  sl5                                          INTEGER(0..4),
  sl8                                          INTEGER(0..7),
  sl10                                         INTEGER(0..9),
  sl16                                         INTEGER(0..15),
  sl20                                         INTEGER(0..19),
  sl32                                         INTEGER(0..31),
  sl40                                         INTEGER(0..39),
  sl64                                         INTEGER(0..63),
  sl80                                         INTEGER(0..79),
  sl160                                        INTEGER(0..159),
  sl320                                        INTEGER(0..319),
  sl640                                        INTEGER(0..639),
  sl1280                                       INTEGER(0..1279),
  sl2560                                       INTEGER(0..2559)
}
``` resourceType: time domain transmission configuration of an SRS resource referenced by an SRS resource set, which may have one of 'periodic', 'semi-persistent', and 'AP'. When the time domain transmission configuration is set to 'periodic' or 'semi-persistent', associated CSI-RS information may be provided according to a usage of the SRS resource set. When the time domain transmission configuration is set to 'AP', an AP SRS resource trigger list and slot offset information may be provided, and associated CSI-RS information may be provided according to a usage of the SRS resource set.

usage: configuration for a usage of an SRS resource referenced by an SRS resource set, which may have one of 'beamManagement', 'codebook', 'nonCodebook', and 'antennaSwitching'.

alpha, p0, pathlossReferenceRS, srs-PowerControlAdjustmentStates: parameter configuration for transmission power control of an SRS resource referenced by an SRS resource set is provided.

A UE may identity that an SRS resource included in a set of SRS resource indexes referenced by an SRS resource set follows information configured in the SRS resource set.

A BS and the UE may transmit and receive higher layer signaling information to transmit individual configuration information of the SRS resource. For example, the individual configuration information of the SRS resource may include time-frequency domain mapping information in a slot of the SRS resource, and the time-frequency domain mapping information may include information on intra-slot or inter-slot frequency hopping of the SRS resource. Alternatively, the individual configuration information of the SRS resource may include a time domain transmission configuration of the SRS resource, and may have one of 'periodic', 'semi-persistent', and 'AP'. Accordingly, it may be possible to limit to have a time domain transmission configuration such as an SRS resource set including the SRS resource. When the time domain transmission configuration of the SRS resource is set to 'periodic' or 'semi-persistent', an SRS resource transmission period and a slot offset (e.g., periodicityAndOffset) may be additionally included. Alternatively, the individual configuration information of the SRS resource may include a configuration of a spatial domain transmission filter of the UE transmitting the SRS resource, and the configuration may be provided through spatial relation info for an SRS. When the spatial relation info included in the individual configuration information of the SRS resource refers to an index of a synchronization signal block (SSB) or a CSI-RS resource, the UE may identity that the same spatial domain transmission filter as a spatial domain reception filter used to receive the SSB or the CSI-RS resource is used. Alternatively, when the spatial relation info refers to another SRS resource index, the UE may identity that a spatial domain transmission filter used to transmit the referenced SRS resource is used.

The UE may be configured with one or more SRS resource sets as configured by a higher layer parameter SRS-ResourceSet. For each SRS resource set, the UE may be configured with K ($K \geq 1$) SRS resources. In this case, except that the maximum value K is set to 16 by a higher layer parameter [SRS-for-positioning], the maximum value K is determined by a UE capability. An applicability of the SRS resource set is configured according to 'usage' in the higher layer parameter SRS-ResourceSet. When the higher layer parameter 'usage' is set to 'beamManagement', only one SRS resource in each of multiple SRS sets may be transmitted at a given time instant, but the SRS resources in different SRS resource sets with the same time domain behavior in the same BWP may be transmitted simultaneously.

For an AP SRS, at least one state of a DCI field is used to select at least one of the configured SRS resource sets.

The following SRS parameters may be semi-statically configured by a higher layer parameter SRS-Resource.

srs-ResourceId determines an SRS resource configuration ID.

The number of SRS ports $N_{ap}^{SRS}$—may be configured by a higher layer parameter nrofSRS-Ports, and may be set to 1, 2, or 4. When nrofSRS-Ports is not configured, nrofSRS-Ports is 1.

- A time domain behavior of an SRS resource configuration indicated by a higher layer parameter resourceType may be one of periodic, semi-persistent, and AP SRS transmission.
- When an SRS resource type is periodic or semi-persistent, a slot level periodicity and a slot level offset are determined by a higher layer parameter periodicityAndOffset-p or periodicityAndOffset-sp. The UE does not expect to be configured with SRS resources in the same SRS resource set SRS-ResourceSet with different slot level periodicities. When the higher layer parameter resourceType for SRS-ResourceSet is set to 'AP', the slot level offset is defined by a higher layer parameter slotOffset.
- The number of OFDM symbols of the SRS resource, a starting OFDM symbol within a slot, and a repetition factor R are configured by a higher layer parameter resourceMapping. When the repetition factor R is not configured, the repetition factor R is the same as the number of OFDM symbols in the SRS resource.
- SRS bandwidths B_SRS and C_SRS are configured by a higher layer parameter freqHopping. When not configured, the SRS bandwidth B_SRS is 0.
- A frequency hopping bandwidth b_hop is configured by the higher layer parameter freqHopping. When not configured, the frequency hopping bandwidth b_hop is 0.
- A frequency domain position and a configurable shift are respectively configured by a higher layer parameters freqDomainPosition and freqDomainShift. When not configured, the higher layer parameter freqDomainPosition is 0.
- A cyclic shift is configured by each of a higher layer parameter cyclicShift-n2, cyclicShift-n4, and cyclicShift-n8 for transmission comb values 2, 4, and 8.
- A transmission comb value is configured by a higher layer parameter transmissionComb.
- A transmission comb offset is configured by a higher layer parameter combOffset-n2, combOffset-n4, or combOffset-n8 for a transmission comb value 2, 3, and 8.
- An SRS sequence ID is configured by a higher layer parameter sequenceID.
- A spatial relation configuration between a reference RS and a target SRS may be configured by a higher layer parameter spatialRelationInfo including an ID of the reference RS. The reference RS may be an SS/PBCH block, a CSI-RS configured on the same serving cell as a target SRS indicated by a higher layer parameter servingCellId, or an SRS configured on the same serving cell as the target SRS indicated by a higher layer parameter servingCellId and an UL BWP indicated by a higher layer parameter uplinkBWP. When the SRS is configured by the higher layer parameter [SRS-for-positioning], the reference RS may also be a DL positioning reference signal (PRS) configured on a serving cell, an SS/PBCH block, or a DL PRS of a non-serving cell indicated by a higher layer parameter.

The UE may be configured by the higher layer parameter resourceMapping in SRS-Resource with an SRS resource occupying $N_s \in \{1, 2, 4\}$ adjacent symbols within last 6 symbols of a slot. Symbols of the resource are mapped to all SRS antenna ports. When the SRS is configured by the higher layer parameter [SRS-for-positioning], the UE may be configured by the higher layer parameter resourceMapping in SRS-Resource with an SRS resource occupying $N_s \in \{1, 2, 4, 8, 12\}$ adjacent symbols anywhere within the slot.

When the UE is not configured by [intraUEPrioritization] and a PUSCH and the SRS are transmitted in the same slot on a serving cell, the UE is configured to transmit the SRS after transmitting the PUSCH and a corresponding DMRS.

When the UE is configured by [intraUEPrioritization] and PUSCH transmission and SRS transmission overlap in time, the UE does not transmit the SRS in overlapping symbol(s).

When the UE is configured with one or more SRS resources and the higher layer parameter resourceType in SRS-Resource is set to 'periodic', the following operation is performed:

When the UE is configured by the higher layer parameter spatialRelationInfo including an ID of a reference 'ssb-Index', the UE transmits a target SRS resource with the same spatial domain transmission filter as that used for reception of a reference SS/PBCH block. When the UE is configured by the higher layer parameter spatialRelationInfo including an ID of a reference 'csi-RS-Index', the UE transmits the target SRS resource with the same spatial domain transmission filter as that used for reception of a reference periodic CSI-RS or a reference semi-persistent CSI-RS. When the UE is configured by the higher layer parameter spatialRelationInfo including an ID of a reference 'srs', the UE transmits the target SRS resource with the same spatial domain transmission filter as that used for transmission of a reference periodic SRS. When the SRS is configured by the higher layer parameter [SRS-for-positioning] and the UE is configured by the higher layer parameter spatialRelationInfo including an ID of a reference 'DL-PRS-ResourceId', the UE transmits the target SRS resource with the same spatial domain transmission filter as that used for reception of a reference DL PRS.

When the UE is configured with one or more SRS resource configurations and the higher layer parameter resourceType in SRS-Resource is set to 'semi-persistent', the following operation is performed:

When the UE receives an activation command for the SRS resource and the UE transmits a PUCCH with HARQ-ACK information corresponding to a PDSCH carrying the activation command in a slot n, corresponding actions and UE assumptions on SRS transmission corresponding to the configured SRS resource set are applied starting from a first slot that is after a slot $n+3N_{slot}^{subframe,\mu}$. $\mu$ is a subcarrier configuration of the PUCCH. The activation command also includes spatial relation assumptions provided by a list of references to reference signal IDs, one per element of the activated SRS resource set. Each ID in the list refers to a reference SS/PBCH block, a non ZP (NZP) CSI-RS resource configured on a serving cell indicated by a Resource Serving Cell ID field in the activation command when the same serving cell as the SRS resource set is present, or an SRS resource configured on a serving cell and an UL BWP indicated by the Resource Serving Cell ID field and a Resource BWP ID field in the activation command when the same serving cell and the same BWP as the SRS resource set are present. When the SRS is configured by the higher layer parameter [SRS-for-positioning], each ID in the list of reference signal IDs may refer to a reference SS/PBCH block of a non-serving cell or a DL PRS of a serving or non-serving cell indicated by a higher layer parameter.

When the SRS resource in the activated resource set is configured by the higher layer parameter spatialRelationInfo, the UE assumes that an ID of a reference signal in the activation command overrides the one configured in spatialRelationInfo.

When the UE receives a deactivation command for the activated SRS resource set and transmits a PUCCH with HARQ-ACK information corresponding to a PDSCH carrying the deactivation command in a slot n, corresponding actions and UE assumptions on cessation of SRS transmission corresponding to the deactivated SRS resource set are applied starting from a first slot that is after a slot $n+3N_{slot}^{subframe,\mu}$. $\mu$ is a subcarrier configuration of the PUCCH.

When the UE is configured by the higher layer parameter spatialRelationInfo including an ID of a reference 'ssb-Index', the UE transmits a target SRS resource with the same spatial domain transmission filter as that used for reception of a reference SS/PBCH block. When the higher layer parameter spatialRelationInfo includes an ID of a reference 'csi-RS-Index', the UE transmits the target SRS resource with the same spatial domain transmission filter as that used for reception of a reference periodic CSI-RS or a reference semi-persistent CSI-RS. When the higher layer parameter spatialRelationInfo includes an ID of a reference 'srs', the UE transmits the target SRS resource with the same spatial domain transmission filter as that used for transmission of a reference periodic SRS or a reference semi-persistent SRS.

When the SRS is configured by the higher layer parameter [SRS-for-positioning] and the higher layer parameter spatialRelationInfo includes an ID of a reference 'DL-PRS-ResourceId', the UE transmits the target SRS resource with the same spatial domain transmission filter as that used for reception of a reference DL PRS.

When the UE has an active semi-persistent SRS resource configuration and has not received the deactivation command, the semi-persistent SRS configuration is considered to be active in a UL BWP which is active, otherwise it is considered suspended.

When the UE is configured with one or more SRS resource configurations and the higher layer parameter resourceType in SRS-Resource is set to 'AP', the following operation is performed:

The UE receives an SRS resource set configuration.

The UE receives a DL DCI, group common DCI, or UL DCI-based command. A code point of the DCI may trigger one or more SRS resource sets. For an SRS in a resource set with a usage set to 'codebook' or 'antennaSwitching', a minimal time interval between a last symbol of a PDCCH triggering AP SRS transmission and a first symbol of an SRS resource is $N_2$. Otherwise, the minimal time interval between the last symbol of the PDCCH triggering the AP SRS transmission and the first symbol of the SRS resource is $N_2+14$. The minimal time interval in units of OFDM symbols is counted based on a minimum subcarrier spacing between the PDCCH and the AP SRS.

When the UE receives DCI triggering the AP SRS in a slot n, the UE transmits the AP SRS in each of the triggered SRS resource sets in the slot as defined in Equation (2) below.

$$\left\lfloor n \cdot \frac{2^{\mu_{SRS}}}{2^{\mu_{PDCCH}}} \right\rfloor + k + \left\lfloor \left( \frac{N_{slot,offset,PDCCH}^{CA}}{2^{\mu_{offset,PDCCH}}} - \frac{N_{slot,offset,SRS}^{CA}}{2^{\mu_{offset,SRS}}} \right) \cdot 2^{\mu_{SRS}} \right\rfloor \quad (2)$$

$$\left\lfloor n \cdot \frac{2^{\mu_{SRS}}}{2^{\mu_{PDCCH}}} \right\rfloor + k + \left\lfloor \left( \frac{N_{slot,offset,PDCCH}^{CA}}{2^{\mu_{offset,PDCCH}}} - \frac{N_{slot,offset,SRS}^{CA}}{2^{\mu_{offset,SRS}}} \right) \cdot 2^{\mu_{SRS}} \right\rfloor$$

In Equation (2), k is configured by the higher layer parameter slotOffset for each triggered SRS resource set and is based on a subcarrier spacing for the triggered SRS transmission. $\mu_{SRS}$ and $\mu_{PDCCH}$ are respectively subcarrier spacing configurations for the triggered SRS and the PDCCH carrying the triggering command. $N_{slot,offset}^{CA}$ and $\mu_{offset}$ refer to a scheduling carrier and a scheduled carrier when carrier aggregation is performed.

When the UE is configured by the higher layer parameter spatialRelationInfo including an ID of a reference 'ssb-Index', the UE transmits a target SRS resource with the same spatial domain transmission filter as that used for reception of a reference SS/PBCH block. When the UE is configured by the higher layer parameter spatialRelationInfo including an ID of a reference 'csi-RS-Index', the UE transmits the target SRS resource with the same spatial domain transmission filter as that used for reception of a reference periodic CSI-RS, a reference semi-persistent CSI-RS, or a latest reference AP CSI-RS. When the UE is configured by the higher layer parameter spatialRelationInfo including an ID of a reference 'srs', the UE transmits the target SRS resource with the same spatial domain transmission filter as that used for transmission of a reference periodic SRS, a reference semi-persistent SRS, or a reference AP SRS. When the SRS is configured by the higher layer parameter [SRS-for-positioning] and the higher layer parameter spatialRelationInfo includes an ID of a reference 'DL-PRS-ResourceId', the UE transmits the target SRS resource with the same spatial domain transmission filter as that used for reception of a reference DL PRS.

When the UE receives a spatial relation update command for an SRS resource and HARQ-ACK information corresponding to a PDSCH carrying the update command is transmitted in a slot n, corresponding actions and UE assumptions on updating a spatial relation for the SRS resource are applied for SRS transmission starting from a first slot that is after a slot $n+3N_{slot}^{subframe,\mu}$. The update command includes spatial relation assumptions provided by a list of references to reference signal IDs, one per element of the updated SRS resource set. Each ID in the list refers to a reference SS/PBCH block, an NZP CSI-RS resource configured on a serving cell indicated by a Resource Serving Cell ID field in the update command when the same serving cell as the SRS resource set is present, or an SRS resource configured on a serving cell and an UL BWP indicated by the Resource Serving Cell ID field and a Resource BWP ID field in the update command when the same serving cell and the same BWP as the SRS resource set are present.

When the UE is configured by the higher layer parameter usage in SRS-ResourceSet set to 'antennaSwitching', the UE does not expect to be configured with different spatial relations for SRS resources in the same SRS resource set.

The UE does not expect to be configured with different time domain behaviors for SRS resources in the same SRS resource set. The UE does not expect to be configured with a different time domain behavior between an SRS resource and an associated SRS resource set. An SRS request field in DCI formats 0_1, 1_1, and 0_2 indicates a triggered SRS resource set, and an SRS request field in a DCI format 1_2 indicates a triggered SRS resource set as shown in Table 15.

When a higher layer parameter srs-TPC-PDCCH-Group for the UE is set to 'typeB', a 2-bit SRS request field in a DCI format 2_3 indicates a triggered SRS resource set. When the higher layer parameter srs-TPC-PDCCH-Group for the UE is set to 'typeA', the 2-bit SRS request field in the DCI format 2_3 indicates SRS transmission on a set of serving cells configured by a higher layer. In more detail, an operation of triggering an SRS resource set using an SRS request field in Rel-15/16 will be described. When the UE receives the DCI formats 0_1, 0_2, 1_1, 1_2, and 2_3 including an SRS request field from the BS, the UE determines whether aperiodicSRS-ResourceTrigger or aperiodicSRS-ResourceTriggerList of the higher layer parameter SRS-ResourceSet in which a time domain transmission configuration is 'AP' is the same as or corresponds to an SRS request field in DCI. The UE transmits SRS-ResourceSet(s) including the same aperiodicSRS-ResourceTrigger or aperiodicSRS-ResourceTriggerList as the SRS request field. A timing of transmitting a triggered AP SRS may be semi-statically determined to be n+X according to an n in which the DCI is received and a slotOffset X configured in the higher layer parameter SRS-ResourceSet.

For a PUCCH and an SRS scheduled on the same carrier, the UE does not transmit the SRS when a semi-persistent SRS and a periodic SRS are configured in the same symbol with the PUCCH carrying only a CSI report, only an L1-reference signal received power (RSRP) report, or an L1-signal to interference plus noise ratio (SINR) report. The UE does not transmit the SRS when a semi-persistent SRS or a periodic SRS is configured or an AP SRS is triggered to be transmitted in the same symbol with the PUCCH carrying an HARQ-ACK, a link recovery request, and/or a scheduling request (SR). When the SRS is not transmitted due to overlap with the PUCCH, only SRS symbol(s) that overlap with the PUCCH are dropped. The PUCCH is not transmitted when an AP SRS is triggered to be transmitted to overlap in the same symbol with the PUCCH carrying only a semi-persistent/periodic CSI report, only a semi-persistent/periodic L1-RSRP report, or only an L1-SINR report.

In the case of intra-band carrier aggregation or inter-band carrier aggregation band-band combination, where simultaneous SRS and PUCCH/PUSCH transmissions are not allowed, the UE does not expect to be configured with an SRS from a carrier and PUSCH/UL DMRS/UL PT-RS/PUCCH formats from a different carrier in the same symbol.

In the case of intra-band carrier aggregation or inter-band carrier aggregation band-band combination, where simulta-

TABLE 15

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured with higher layer parameter aperiodicSRS-ResourceTrigger set to 1 or an entry in aperiodicSRS-ResourceTriggerList set to 1 | SRS resource set(s) configured with higher layer parameter usage in SRS-ResourceSet set to 'antennaSwitching' and resourceType in SRS-ResourceSet set to 'aperiodic' for a 1st set of serving cells configured by higher layers, or SRS resource set(s) configured by [SRS-ResourceSetForPositioning] and resourceType in [SRS-ResourceSetForPositioning] set to 'asperiodic' for a 1st set of serving cells configured by higher layers |
| 10 | SRS resource set(s) configured with higher layer parameter aperiodicSRS-ResourceTrigger set to 2 or an entry in aperiodicSRS-ResourceTriggerList set to 2 | SRS resource set(s) configured with higher layer parameter usage in SRS-ResourceSet set to 'antennaSwitching' and resourceType in SRS-ResourceSet set to 'aperiodic' for a 2nd set of serving cells configured by higher layers, or SRS resource set(s) configured by [SRS-ResourceSetForPositioning] and resourceType in [SRS-ResourceSetForPositioning] set to 'aperiodic' for a 2nd set of serving cells configured by higher layers |
| 11 | SRS resource set(s) configured with higher layer parameter aperiodicSRS-ResourceTrigger set to 3 or an entry in aperiodicSRS-ResourceTriggerList set to 3 | SRS resource set(s) configured with higher layer parameter usage in SRS-ResourceSet set to 'antennaSwitching' and resourceType in SRS-ResourceSet set to 'aperiodic' for a 3rd set of serving cells configured by higher layers, or SRS resource set(s) configured by [SRS-ResourceSetForPositioning] and resourceType in [SRS-ResourceSetForPositioning] set to 'aperiodic' for a 3rd set of serving cells configured by higher layers | neous SRS and PRACH transmissions are not allowed, the UE does not simultaneously transmit an SRS from a carrier and a PRACH from a different carrier.

When an SRS resource with the higher layer parameter resourceType set to 'AP' is triggered on OFDM symbol(s) for periodic/semi-persistent SRS transmission, the UE transmits the AP SRS resource and periodic/semi-persistent SRS symbol(s) overlapping with the symbol(s) are dropped and periodic/semi-persistent SRS symbol(s) not overlapping with the symbol(s) are transmitted. When an SRS resource with the higher layer parameter resourceType set to 'semi-persistent' is triggered on OFDM symbols configured for periodic SRS transmission, the UE transmits the semi-persistent SRS resource and periodic SRS symbol(s) overlapping with the symbol(s) are dropped and periodic SRS symbol(s) not overlapping with the symbol(s) are transmitted.

When the UE is configured by the higher layer parameter usage in SRS-ResourceSet set to 'antennaSwitching' and a guard period of Y symbols is configured, the UE uses the same priority rules as defined above during the guard period as if the SRS were configured.

When the higher layer parameter spatialRelationInfo is activated or updated for a semi-persistent or AP SRS resource through a MAC CE for set of CCs/BWPs indicated by a higher layer parameter [applicableCellList], the higher layer parameter spatialRelationInfo is applied to semi-persistent or AP SRS resource(s) having the same SRS resource ID for all BWPs in the indicated CCs.

When a higher layer parameter enableDefaultBeamPl-ForSRS is set to 'enabled', the higher layer parameter spatialRelationInfo for the SRS resource, except for the SRS resource with the higher layer parameter usage in SRS-ResourceSet set to 'beamManagement' or for the SRS resource with the higher layer parameter usage in SRS-ResourceSet set to 'nonCodebook' with a configuration of associatedCSI-RS, is not configured in FR2, and the UE is not configured with a higher layer parameter pathlossReferenceRS, the UE transmits a target SRS resource as follows.

The UE transmits the target SRS resource with the same spatial field transmission filter as that used for reception of a CORESET having a lowest controlResourceSetID in an activated DL BWP in a CC.

When the UE is not configured with any CORESET in the CC, the UE transmits the target SRS resource with the same spatial field transmission filter as that used for reception of an activated TCI state having a lowest ID applicable to a PDSCH in the activated DL BWP of the CC.

FIG. 6A illustrates a MAC CE configuration for activation/deactivation of an SP SRS, according to an embodiment.

Referring to FIG. 6A, a network may activate and deactivate configured SP SRS resource sets of a serving cell by sending an SP SRS activation/deactivation MAC CE. The configured SP SRS resource sets are initially deactivated upon configuration and after a handover.

The SP SRS activation/deactivation MAC CE may be identified by a MAC subheader with an LCID as described in Table 16.

TABLE 16

| Index | LCID value |
|---|---|
| ... | ... |
| 48 | SP ZP CSI-RS Resource Set Activation/Deactivation |
| 49 | PUCCH spatial relation Activation/Deactivation |

TABLE 16-continued

| | |
|---|---|
| 50 | SP SRS Activation/Deactivation |
| 51 | SP CSI reporting on PUCCH Activation/Deactivation |
| 52 | TCI State Indication for UE-specific PDCCH |
| ... | ... |

| Index | LCID value |
|---|---|
| ... | ... |
| 42 | AP SRS spatial relation Indication |
| ... | ... |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| ... | ... |

The SP SRS activation/deactivation MAC CE includes the following fields and may be represented as shown in FIG. 6A:

A/D 6a-00: This field indicates whether an SP SRS resource set is activated or deactivated. In order to indicate activation, this field is set to 1, and otherwise, deactivation is indicated.

SRS Resource Set's Cell ID 6a-05: This field indicates an identity of a serving cell, and includes an activated/deactivated SP SRS resource set. When a C field 6a-15 is set to 0, this field indicates an ID of a serving cell including all resources indicated by Resource $Id_i$ fields. This field has a length of 5 bits.

SRS Resource Set's BWP ID 6a-10: This field indicates an UL BWP with a code point of a DCI bandwidth part indicator field, and includes an activated/deactivated SP SRS resource set. When the C field 6a-15 is set to 0, this field indicates an ID of a BWP including all resources indicated by Resource $Id_i$ fields. This field has a length of 2 bits.

C 6a-15: This field indicates whether octets including Resource Serving Cell ID fields and Resource BWP ID fields are present. When this field is set to 1, it indicates that the octets including the resource Serving Cell ID fields and the Resource BWP ID fields are present, and otherwise, it indicates that the octets are not present.

SUL 6a-20: This field indicates whether a MAC CE is applied to a normal UL (NUL) carrier configuration or an SUL carrier configuration. When this field is set to 1, it indicates that the MAC CE is applied to the SUL carrier configuration, and when this field is set to 0, it indicates that the MAC CE is applied to the NUL carrier configuration.

SP SRS Resource Set ID 6a-25: This field indicates an activated or deactivated SP SRS resource set ID identified by SRS-ResourceSetId. This field has a length of 4 bits.

$F_i$ 6a-30: This field indicates a type of a resource used as a spatial relation for an SRS resource within an SP SRS resource set indicated by an SP SRS Resource Set ID field. $F_0$ refers to a first SRS resource within the resource set, $F_1$ refers to a second one, etc. $F_i$ may be mapped to an SRS resource in an SP SRS resource set. This field is set to 1 to indicate that an NZP CSI-RS resource index is used, and this field is set to 0 to indicate that either an SSB index or an SRS resource index is used. This field has a length of 1 bit. This field is only present when a MAC CE is used for activation, i.e. the A/D field is set to 1.

Resource ID$_i$ 6a-35: This field includes an ID of a resource used for spatial relation derivation for an SRS resource i. Resource ID$_0$ refers to a first SRS resource within the resource set, Resource ID$_1$ refers to a second one, etc. Resource ID$_i$ may be mapped to an SRS resource in an SP SRS resource set. When F$_i$ is set to 0 and a first bit of this field is set to 1, the remainder of this field includes SSB-Index. When F$_i$ is set to 0 and a first bit of this field is set to 0, the remainder of this field includes SRS-ResourceId. This field has a length of 7 bits. This field is only present when a MAC CE is used for activation, i.e., the A/D field is set to 1.

Resource Serving Cell ID$_i$ 6a-40: This field indicates an identity of a serving cell on which a resource used for spatial relation derivation for an SRS resource i is located. This field has a length of 5 bits.

Resource BWP ID$_i$ 6a-45: This field indicates a UL BWP with a code point of a DCI bandwidth part indicator field on which a resource used for spatial relation derivation for an SRS resource i is located. This field has a length of 2 bits.

R: Reserved bit, set to 0.

FIG. 6B illustrates a MAC CE configuration for spatial relation indication of an AP SRS, according to an embodiment.

Referring to FIG. 6b, in order to indicate a spatial relation for an AP SRS, an AP SRS spatial relation Indication MAC CE may be configured (Example according to Release 16). The AP SRS spatial relation Indication MAC CE may be identified by a MAC subheader in which an LCID value is set to 42. The AP SRS spatial relation Indication MAC CE includes the following fields and may be represented as shown in FIG. 6B:

SRS Resource Set's Cell ID 6b-05: This field indicates an identity of a serving cell including an indicated AP SRS resource set. When a C field is set to 0, this field indicates an identity of a serving cell including all resources indicated by Resource ID$_i$. This field has a length of 5 bits.

SRS Resource Set's BWP ID 6b-10: This field indicates a UL BWP with a code point of a DCI bandwidth part indicator field, and includes an activated SRS resource set. When the C field is set to 0, this field indicates an identity of a BWP including all resources indicated by Resource ID$_i$.

C 6b-15: This field indicates whether octets including Resource Serving Cell ID fields and Resource BWP ID fields are present. When this field is set to 1, the octets including the Resource Serving Cell ID fields and the Resource BWP ID fields are present, and otherwise, the octets are not present.

SUL 6b-20: This field indicates whether a MAC CE is applied to a NUL carrier configuration or an SUL carrier configuration. When the MAC CE is applied to the SUL carrier configuration, this field is set to 1, and when the MAC CE is applied to the NUL carrier configuration, this field is set to 0.

AP SRS Resource Set ID 6b-25: This field indicates an AP SRS resource set ID identified by SRS-ResourceSetID. This field has a length of 4 bits.

F$_i$ 6b-30: This field indicates a type of a resource used as a spatial relation for an SRS resource within an AP SRS resource set indicated by an AP SRS Resource Set ID field. F$_0$ refers to a first SRS resource within the resource set, F$_1$ refers to the second one, etc. As such, a relationship between another Fi field and the SRS resource may be defined. The field is set to 1 to indicate that an NZP CSI-RS resource index is used, and this field is set to 0 to indicate either an SSB index or an SRS resource index. This field has a length of 1 bit. This field is only present when a MAC CE is used for activation, i.e., an A/D field is set to 1.

Resource ID$_i$ 6b-35: This field includes an ID of a resource used for spatial relation derivation for an SRS resource i. Resource ID$_0$ refers to a first SRS resource within the resource set, Resource ID$_1$ refers to a second one, etc. As such, a relationship between another resource ID1 and an SRS resource may be defined. When F$_i$ is set to 0 and a first bit of this field is set to 1, the remainder of this field includes SRS-ResourceId. This field has a length of 7 bits.

Resource Serving Cell ID$_i$ 6b-40: This field indicates an ID of a serving cell on which a resource used for spatial relation derivation for an SRS resource i is located. This field has a length of 5 bits.

Resource BWP ID$_i$ 6b-45: This field indicates a UL BWP with a code point of the DCI bandwidth part indicator field on which a resource used for spatial relation derivation for an SRS resource i is located. This field has a length of 2 bits.

An AP SRS is triggered according to an SRS resource set configured in a higher layer and a code point indicated by a field for triggering an SRS in DCI. Although an operation for triggering an AP SRS is described for convenience of description, the AP SRS is merely an example of an UL reference signal, and the same description may apply to an operation for triggering another type of UL reference signal. Technology development for supporting a 5G wireless communication system by using a frequency range 2 (FR2) in addition to supporting a 5G wireless communication system by using a frequency range 1 (FR1) is being actively conducted. The FR2 is located in a higher frequency band than the FR1, and thus an increased number of AP SRSs may be triggered to support an UL for an extended frequency bandwidth. As the increased number of AP SRSs are triggered, DCI overhead required to trigger an AP SRS may be significantly increased at a certain point of time. Due to significantly increased AP SRS triggering overhead, restricted resources for PDCCH transmission may be insufficient, and thus an AP SRS may not be triggered in a desired time domain and DCI for other operations to be transmitted through the same PDCCH may not be transmitted.

In an existing environment where an AP SRS is statically triggered, when the AP SRS is triggered and then a BWP in which a UE operates is changed, a BWP change configuration may not be dynamically performed on the triggered AP SRS. In consideration of the changed BWP, an SRS resource for the changed BWP should be selected in an SRS resource set in SRS-config configured in a higher layer and triggered again, and SRS transmission for an SRS resource that is previously triggered before the BWP is changed should not be performed. When this operation is supported by an existing AP SRS triggering method, triggering is performed based on a higher layer-based operation, and a changed situation such as a BWP change may not be rapidly reflected and supported.

When an AP SRS is triggered in an existing method, the same value as one value in aperiodicSRS-ResourceTrigger or aperiodicSRS-ResourceTriggerList in a higher layer parameter SRS-ResourceSet may be configured and indicated by an SRS request field in DCI. When this method is used, the configured one value in AperiodicsRS-Resource- Trigger or AperiodicsRS-ResourceTriggerList may be indicated by the DCI, and an SRS may be transmitted only according to SRS-Resource configured in a higher layer as described above. In Rel-15/16, a timing of transmitting an SRS resource set indicated by an SRS request field is determined to be n+X by considering a slot n in which a PDCCH including the SRS request field is received and slotOffset X configured in a higher layer parameter SRS-ResourceSet.

When a UE is supported in a time division duplex (TDD) manner, in order for a BS to transmit an AP SRS in a desired slot, triggering DCI should be transmitted in a specific slot according to a TDD slot configuration and a slotOffset value of an SRS resource set to be transmitted. For example, when the BS is able to transmit DCI in a first slot, a second slot, a third slot, and a fourth slot and triggering is performed to transmit an SRS resource set 1 in which slotOffset is set to 2 in a fifth slot, the bae station should transmit DCI for triggering the SRS resource set 1 in the third slot. In the same situation, when triggering is performed to transmit an SRS resource set 2 in which slotOffset is set to 3 in a sixth slot, the bae station should transmit DCI for triggering the SRS resource set 2 in the third slot. As such, when a plurality of AP SRS triggerings are required, DCI overhead may be increased at a specific point of time. When an SRS is triggered and an UL resource to be transmitted is occupied due to another operation such as PUCCH transmission having a higher priority and thus the SRS is unable to be transmitted according to a preset SRS-Resource configuration, additional SRS triggering may be required. When triggering is performed again on the SRS that is unable to be transmitted, DCI overhead may be additionally increased.

Accordingly, an AP SRS triggering method should be complemented according to increased AP SRS usages. The following methods may be considered to complement the AP SRS triggering method.

As a first method, in order to support an UL for an extended frequency with no increase in DCI overhead, a BS may increase the number of SRS-ResourceSets in a list included in a higher layer parameter SRS-Config and the number of SRS-Resources included in SRS-ResourceSet, and may cause a UE to share the information so that the number of SRS resource sets and SRS resources configured simultaneously by aperiodicSRS-ResourceTrigger or aperiodicSRS-ResourceTriggerList indicating an SRS trigger state are increased. However, this method may have a disadvantage in that because an AP SRS is triggered with a fixed number of SRS resource sets and resources configured in a higher layer, an SRS resource may not be dynamically managed.

As a second method, a BS may support a UE by distributing DCI overhead that may be significantly increased at a specific point of time due to AP SRS triggering. DCI overhead that is significantly increased due to an increased number of AP SRS triggerings may be distributed by distributing existing AP SRS triggering. When AP SRS triggering is distributed, it indicates that DCI that is transmitted in a specific slot as in the example above is distributed and transmitted in a time domain. In order to distribute and transmit DCI for triggering an AP SRS along a time axis, a method of dynamically determining a transmission timing by using an additional offset indicated by the DCI, instead of semi-statically determining a transmission timing with slotOffset fixed in a higher layer, may be used.

When distributed AP SRS triggering is performed for each of groups consisting of multiple UEs, DCI overhead required to trigger an AP SRS of each UE may be reduced.

When triggered AP SRS transmission and another physical channel signal transmission such as PUCCH transmission for HARQ-ACK overlap each other or a BWP change is performed, an AP SRS is unable to be transmitted on a corresponding UL resource. In order to solve the problem, a method of dynamically triggering an AP SRS is required. Dynamic AP triggering in an embodiment of the disclosure refers to an operation including an operation of triggering an AP SRS and an operation of dynamically determining a transmission timing of the AP SRS. The disclosure provides, as a method for reducing DCI overhead due to AP SRS trigging and a method for dynamically performing AP SRS triggering, DCI overhead management for increased AP SRS triggering, flexible offset control based on DCI, automatic delay, and group-common DCI control. For DCI-based flexible offset control, an AP SRS triggering offset may be transmitted in DCI, and one or more operations from among 'reservation', 'adjustment', 'reordering', and 'cancellation' may be indicated to be performed. The AP SRS triggering offset transmitted in the DCI refers to an offset (e.g., a slot offset or an SRS resource set ID pair for AP SRS transmission reordering) for dynamically determining a transmission timing of a triggered AP SRS.

In addition to the DCI-based flexible offset control, a method of automatically delaying in an order triggered AP SRSs until an AP SRS is transmitted on an available UL resource and continuously automatically delaying until an offset of the SRS is transmitted may be used. A group-common DCI control method may collectively transmit a group-based dynamic offset or a group-based cancellation indication to all UEs belonging to a group. To perform dynamic AP SRS triggering, a MAC CE for AP SRS triggering may be used. Activation information on an AP SRS resource set configured in a higher layer may be indicated through a MAC CE, a code point included in DCI may be referenced, and thus an AP SRS may be triggered, or a code point for a dynamic AP SRS triggering offset may be defined through a MAC CE, the code pint may be indicated by DCI, and thus an AP SRS triggering offset may be determined. A BS may transmit a MAC CE including new slotOffset to a UE in order to change slotOffset configured in a higher layer parameter SRS-ResourceSet.

A UL signal considered in the disclosure includes an SRS, and signaling for UL signal transmission of the BS includes some or all of higher layer signaling including RRC or MAC CE or L1 signaling including DCI. A dynamic triggering method for AP SRS signal transmission of a UE in various cases will be described in detail in the following embodiments of the disclosure.

The disclosure provides a DCI overhead management method for AP SRS triggering through the following embodiments of the disclosure. The disclosure provides a method by which a BS performs dynamic AP SRS triggering with a DCI-based flexible offset. The disclosure provides a method of, when a BS triggers an AP SRS to a UE, determining an operation of the UE through automatic delay according to an available UL transmission resource. The disclosure provides a method by which a BS performs AP SRS triggering or triggering cancellation on one or more UEs through group-common DCI.

Although Embodiments 1 through 3 are described herein, the embodiments of the disclosure may be combined and implemented. That is, numbers of the embodiments of the disclosure are provided for convenience of description, and the disclosure is not limited thereto and different embodiments of the disclosure may be combined.

Embodiment 1: DCI Overhead Management Method for Increased AP SRS Triggering

In order for a BS to support an UL in an extended bandwidth, the number of required AP SRSs is increased according to SRS usages as described above and DCI overhead that is increased to trigger the AP SRSs should be solved. As a method of solving DCI overhead, there are i) a method of increasing the number of SRS-ResourceSets whose time domain behavior is AP in a list of SRS resource sets of a higher layer parameter SRS-config and increasing the number of SRS resource sets and resources that are simultaneously triggered and ii) a method of distributing DCI overhead that is increased at a specific time by distributing AP SRS triggering.

In order to increase resource sets and resources of an AP SRS triggered based on a higher layer parameter, a BS may support a UE by updating the higher layer parameter. The BS may trigger the AP SRS with SRS resource sets and SRS resources configured in an SRS-ResourceSet list SRS-ResourceSetToAddModlist and an SRS-Resource list srs-ResourceToAddModList in a higher layer parameter SRS-Config. 1n an NR system, a maximum configurable number of SRS resource sets (maxNrofSRS-ResourceSets) in the list srs-ResourceSetToAddModList is 16, and a maximum configurable number of SRS resources (maxNrofSRS-Resources) in the list srs-ResourceToAddModList is 64 (example according to Release 15).

As described above, a UE receiving a DCI format 0_1, 1_1, or 2_3 transmitted by the BS may trigger SRS resource sets and resources in which a resource type (resourceType) is set to AP by referring to one value in aperiodicSRS-ResourceTrigger or aperiodicSRS-ResourceTriggerList indicated by an SRS request field. In this case, the UE may trigger SRS resource set(s) in which an aperiodicSRS-ResourceTrigger value in an AP SRS resource set is the same as a value indicated by an SRS request in DCI and may trigger only SRS resource sets present in a configured list. Accordingly, when SRS resource sets and SRS resources for the AP SRS are increased, the number of AP SRS resource sets and resources that are simultaneously triggered by the DCI may be increased. At this time, the BS may trigger the AP SRS of the UE by configuring a parameter slotOffset configured for each SRS-ResourceSet from 1 to 32 or, when a wider range of slot offsets is required, by configuring the parameter slotOffset from 1 to $P_{slotoffset}$ that is greater than 32.

The BS may support the UE by increasing a maximum configurable value maxNrofSRS-TriggerStates-1 of aperiodicSRS-ResourceTrigger for triggering the AP SRS for the increased SRS resources set or resources. In an existing NR system, the BS may support the UE by setting aperiodicSRS-ResourceTrigger to maxNrofSRS-TriggerStates-1=3 (Example according to Release 15). When the BS increases the maximum configurable value maxNrofSRS-TriggerStates-1 as AP SRS resource sets are increased, the AP SRS may be triggered by using various combinations of SRS resource sets.

A BS may distribute and trigger an AP SRS to be transmitted by a UE. Although the BS distributes and transmits triggering DCI for each AP SRS resource set, the BS may configure the UE to transmit AP SRS resources at the same transmission timing by considering a point of time when a higher layer parameter slotOffset is triggered and a transmission timing of the AP SRS. For example, an SRS resource set that is triggered in a slot n and in which slotOffset in a higher layer parameter SRS-ResourceSet is set to L and an SRS resource set that is triggered in a slot n−1 and in which slotOffset in the higher layer parameter SRS-ResourceSet is set to L+1 may be transmitted at the same timing. As such, because DCI for triggering each SRS resource set is not transmitted to the UE at the same time but is distributed and transmitted to the UE, a significant increase in DCI overhead due to DCI for AP SRS triggering during a specific time duration may be prevented.

Embodiment 2: DCI-Based Flexible Offset Control Method for AP SRS Transmission of UE Embodiment 2 provides a method of performing dynamic AP SRS triggering by adding or replacing a DCI-based flexible offset control method for AP SRS triggering performed based on a higher layer parameter. That is, in Embodiment 2, a method of dynamically determining an AP SRS transmission timing will be described. In Rel-15/16, AP SRS triggering is dynamically performed through DCI whereas an AP SRS transmission timing is semi-statically configured with SlotOffset in a higher layer parameter SRS-ResourceSet. Detailed embodiments of the disclosure provide various methods of dynamically indicating an AP SRS transmission timing based on DCI. As described above, a DCI-based flexible offset control method may include four independent operations such as 'reservation', 'adjustment', 'reordering', and 'cancellation' or a combination thereof. A BS may transmit, to a UE, DCI for flexible offset control according to a transmittable UL resource and a triggered AP SRS. The term 'flexible offset control' refers to dynamically determining a transmission timing of an AP SRS, which is semi-statically configured in Rel-15/16 as described above, by using an offset that is additionally indicated through DCI. The additional offset may be indicated by an additional field in DCI including an SRS request field for triggering an AP SRS or may be indicated by another DCI. Each flexible offset control method will be described in detail in Embodiment 2-1, Embodiment 2-2, Embodiment 2-3, and Embodiment 2-4. Embodiment 2-5 provides a method of managing an AP SRS that is triggered according to a capability of a UE. Each embodiment of the disclosure may operate independently from other embodiments or may operate in consideration of a combination thereof.

Embodiment 2-1: AP SRS Reservation Method Using Flexible Triggering Offset

In Embodiment 2-1, an operation of adjusting a transmission timing of an AP SRS by using a field additionally indicated in DCI to dynamically change a transmission timing of an AP SRS will be described.

As one of methods of dynamically triggering an AP SRS, a BS may transmit a new offset for triggering an AP SRS to a UE through DCI. In this case, a slot offset may be considered as an example of the new offset. When the new offset includes slot offset information for SRS transmission, the UE may determine an AP SRS transmission timing by referring to the slot offset information. That is, the BS may indicate a new offset (slotOffset) for dynamically determining a transmission timing of an AP SRS to the UE through DCI. The new offset may be indicated by a new field in DCI. The new field for indicating the new offset may be configured as in Embodiment 4 described below. The new field for indicating the new offset may be present in DCI including an SRS request field, or may be present in DCI independent from the DCI including the SRS request field. The new offset transmitted through the DCI may trigger an AP SRS along with an offset configured by a higher layer parameter or may trigger the AP SRS alone. Regarding a method of triggering an AP SRS, the AP SRS may be triggered in the same manner as that in Rel-15/16 through an SRS request field, and in this case, a transmission timing of the AP SRS may be determined by referring to both an added new offset field and a Rel-15/16 higher layer parameter slotOffset or by referring to only the new offset field. A method of dynamically triggering an AP SRS will be described below with reference to FIGS. 7 and 9.

The following parameters may be defined in order to determine a final transmission timing of an AP SRS by considering both a slot offset configured in a higher layer and a new field in DCI that dynamically indicates a transmission timing of an AP SRS. An offset configured in a higher layer is defined as X, and a new offset transmitted through DCI is defined as Y. The offset X configured in the higher layer refers to slotOffset configured in a higher layer parameter SRS-ResourceSet. When the UE receives a PDCCH including DCI for triggering an AP SRS based on a higher layer parameter (e.g., an RRC configuration) in a slot n and a PDCCH including DCI for dynamically triggering an AP SRS in a slot n', a timing of transmitting a corresponding SRS may be defined according to a dynamic AP SRS triggering method using a new offset as follows. In this case, an SRS request field for triggering an AP SRS and a field for a new offset may be included in one DCI, or may each be indicated by individual DCI. Although each field is indicated by individual DCI in FIGS. 7 through 9 for convenience of description, the disclosure is not limited thereto and the SRS request field and the field for the new offset may be indicated by the same DCI.

Figure 7:
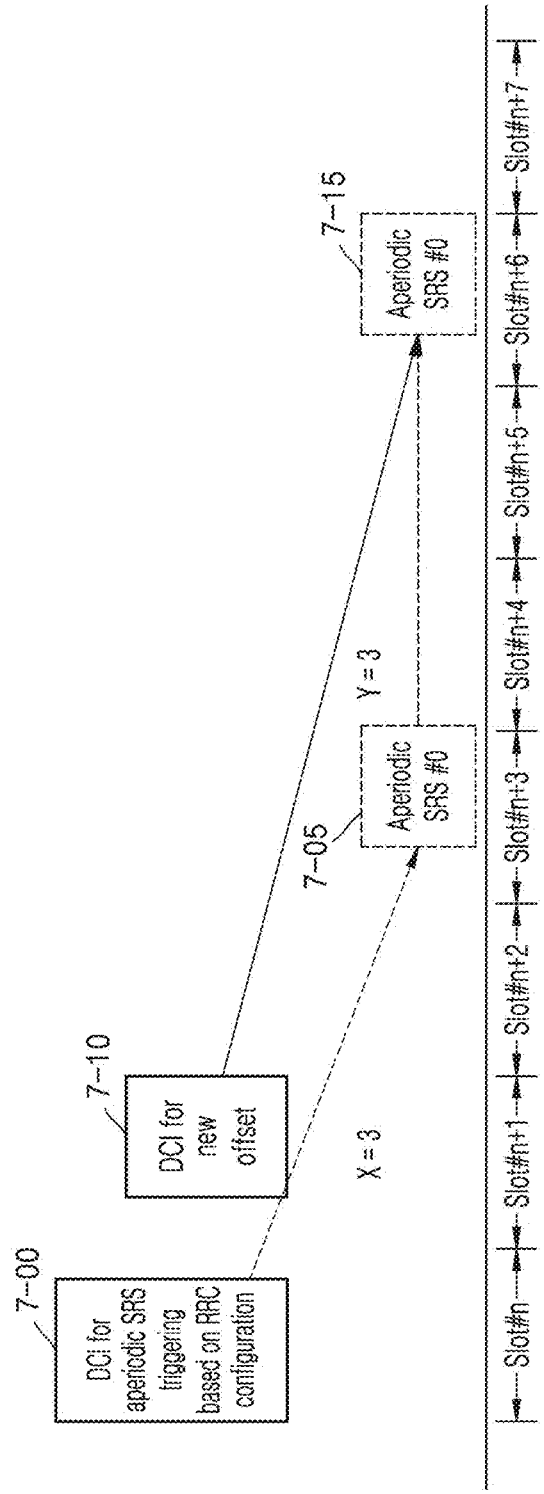
FIG. 7 illustrates a method by which a user equipment (UE) determines an AP SRS transmission timing by using an offset received based on higher layer configuration information and a new offset for dynamically triggering an AP SRS, according to an embodiment.

FIG. 7 illustrates a method by which a UE determines an AP SRS transmission timing by using an offset received based on higher layer configuration information and a new offset for dynamically triggering an AP SRS, according to an embodiment.

Referring to FIG. 7, an operation of determining an AP SRS transmission timing by using a slot offset X configured in a higher layer and a slot offset Y configured through DCI to dynamically trigger an AP SRS will be described. Specifically, the UE may determine an AP SRS transmission timing by associating the offset Y configured through the DCI with the offset X. The UE may define an AP SRS transmission timing as n+X+Y, by considering the two slots and a slot n in which a PDCCH including DCI indicating AP SRS triggering based on a higher layer parameter is received.

In FIG. 7, as an example of this operation, the UE updates a transmission timing of an AP SRS resource set 7-05 that is triggered by a higher layer by considering an offset X for triggering an AP SRS based on a higher layer and an offset Y for dynamically triggering the AP SRS (7-15). That is, the UE may receive, in a slot n, DCI 7-00 including an SRS request field required to determine the offset X (e.g., X=3) for triggering the AP SRS based on a higher layer parameter (e.g., an RRC configuration). The UE may receive, in a slot n+1, DCI including the new offset Y (e.g., Y=3) for dynamically triggering the AP SRS. In this case, the UE may determine an AP SRS transmission timing as n+X+Y (=N+6), and may transmit the AP SRS in a slot n+6.

The offset Y may include offset Y candidate values configured through higher layer signaling and indirectly indicated by DCI or a value directly indicated by DCI. When a higher layer parameter slotOffset is not configured (slotOffset field is absent), a configuration for a new offset Y is indicated through higher layer signaling, and an indicator for indicating the offset Y is transmitted through DCI, the UE may identity that X is 0 and may determine that an AP SRS transmission timing is n+Y based on a slot n for receiving DCI including the new offset Y and an SRS request field.

Figure 8:
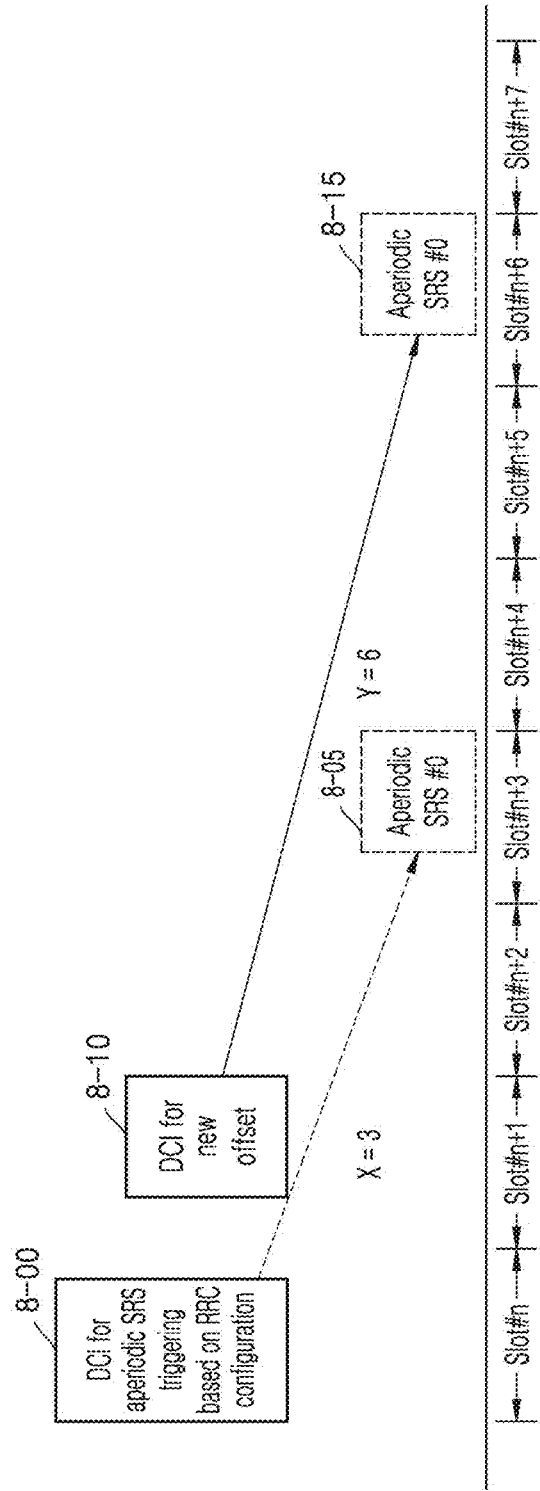
FIG. 8 illustrates a method by which a UE determines an AP SRS transmission timing by using a new slot offset for dynamically triggering an AP SRS, according to an embodiment.

FIG. 8 illustrates a method by which a UE determines an AP SRS transmission timing by using a new slot offset for dynamically triggering an AP SRS, according to an embodiment.

Referring to FIG. 8, an operation of determining an AP SRS transmission timing by using only a new slot offset Y configured through DCI, while ignoring a slot offset X configured in a higher layer, will be described. Specifically, when the UE receives DCI for dynamically triggering an AP SRS, the UE may ignore the slot offset X. The DCI for dynamically triggering the AP SRS may include the slot offset Y. The UE may define an AP SRS transmission timing as n+Y, by considering the slot offset Y and a slot n in which a PDCCH including DCI indicating triggering based on a higher layer parameter is received. That is, referring to FIG. 8, the UE may determine the AP SRS transmission timing by using only the slot offset Y. When the UE receives the offset Y for dynamically triggering the AP SRS, the UE may ignore the offset X based on a higher layer parameter that is previously received and may determine a transmission timing of an AP SRS resource set (8-15). That is, the UE may receive, in the slot n, DCI 8-00 including an SRS request field required to determine the offset X (e.g., X=3) for triggering the AP SRS based on the higher layer parameter (e.g., an RRC configuration). The UE may receive, in a slot n+1, DCI including the new offset Y (e.g., Y=6) for dynamically triggering the AP SRS. In this case, when the UE receives the DCI 8-10 for the offset Y, the UE may ignore the offset X, may determine that an AP SRS transmission timing is n+Y (=N+6), and may transmit the AP SRS in a slot n+6.

Figure 9:
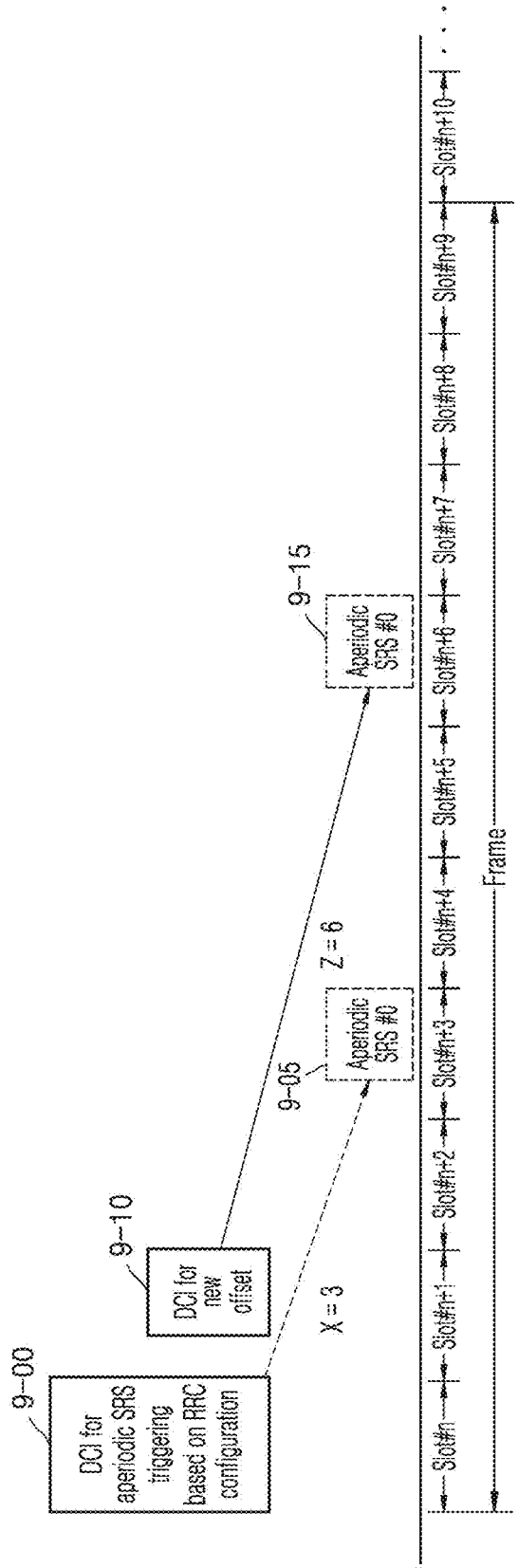
FIG. 9 illustrates a method by which a UE determines an AP SRS transmission timing by using a slot index in a frame to dynamically trigger an AP SRS, according to an embodiment.

FIG. 9 illustrates a method by which a UE determines an AP SRS transmission timing by using a slot index in a frame to dynamically trigger an AP SRS, according to an embodiment.

Referring to FIG. 9, an operation in which the UE ignores a slot offset X configured in a higher layer, uses only a new offset Z configured through DCI, and determines an AP SRS transmission timing when the offset Z indicates a specific slot index in a frame will be described. When a UE receives DCI for dynamically triggering an AP SRS, the UE may ignore the slot offset X. The offset Z may indicate an index of a slot in which an AP SRS is transmitted in a current transmission frame as illustrated in FIG. 9. The new offset Z may be set to one of values 0~10·$2^\mu$−1 according to p, indicating a subcarrier spacing. In detail, the offset Z may be for indicating a timing of transmitting the AP SRS in each frame.

In FIG. 9, p indicates the subcarrier spacing is set to 0, and the number of slots included in one frame is 10. For example, when the offset Z is 6, the UE may transmit the AP SRS in a slot n+6, a slot n+16, a slot n+26, . . . to which the offset 6 is applied every frame. It is assumed that a slot n is a $0^{th}$ slot of the frame. Specifically, when the AP SRS is able to be transmitted in a slot whose slot index is 6 within a frame including a slot in which the offset Z is received, the AP SRS is transmitted in the slot n+6. When the AP SRS is unable to be transmitted in the slot n+6, the AP SRS may be transmitted in a slot whose slot index is 6 within a next frame to the frame including the slot in which the offset Z is received. When the slot n is a $k^{th}$ slot, instead of a $0^{th}$ slot in the frame, an AP SRS transmission timing considering the new offset Z (e.g., Z=6) may be determined to be a sixth slot in the frame such as a slot n−k+6, a slot n−k+16, a slot, n−k+26, . . . .

The UE may receive, in the slot n, DCI 9-00 including an SRS request field required to determine the offset X (e.g., X=3) for triggering the AP SRS based on a higher layer parameter (e.g., an RRC configuration). The UE may receive, in a slot n+1, DCI including the new offset Z (e.g., Z=6) for dynamically triggering the AP SRS. When the UE receives the DCI 9-10 for the offset Z, the UE may ignore the offset X, may determine that an AP SRS transmission timing is a sixth slot of each frame, and may transmit the AP SRS in the slot n+6, the slot n+16, the slot n+26, etc. In this case, it is assumed that the slot n is a $0^{th}$ slot in the frame. When the slot n is a $k^{th}$ slot, instead of a $0^{th}$ slot in the frame, the UE may transmit the AP SRS in the slot −k+6, the slot n−k+16, the slot n−k+26, etc., as in the above example.

Although DCI including an SRS request field is received in a slot n and DCI including a new slot offset is received in a slot n'=n+1 in FIGS. 7 through 9 for convenience of description, n and n' may be set to the same value and in this case, the SRS request field and a field for the new offset may be indicated by one DCI or may each be indicated by individual DCI. When n'≠n, the SRS request field and the field for the new offset are indicated by different DCIs.

An AP SRS transmission timing indicated in a method of Embodiment 2-1 should be greater than n'+K by considering a minimum time interval K (K=$N_2$ symbols (PUSCH preparation time) when a usage of an AP SRS is set to 'codebook' or 'antennaSwitching' and $N_2$+14 symbols in other cases) according to usages. When the configured AP SRS transmission timing is not greater than n'+K, the AP SRS may be transmitted or a corresponding indication may be ignored by applying an automatic delay method or an offset control method described below.

Embodiment 2-2: Adjustment Method for Changing Triggered AP SRS Transmission Timing A UE may determine an AP SRS transmission timing by using only an offset configured in a higher layer or by using a new offset indicated by DCI as in Embodiment 2-1. However, when a resource having a higher priority is transmitted at a pre-configured SRS transmission timing and thus an AP SRS is unable to be transmitted, a configuration may need to be changed to delay the configured transmission timing and transmit the SRS at the delayed transmission timing. In contrast, a configuration may be changed to transmit the AP SRS at a timing earlier than the configured SRS transmission timing.

In order to dynamically change an AP SRS transmission timing by considering a changed UL transmission resource, adjustment for changing a DCI-based AP SRS offset may be performed. The adjustment for changing the AP SRS transmission timing may be defined by a pre-configured transmission timing $T_{old}$ and a slot offset m for adjustment as follows.

Figure 10:
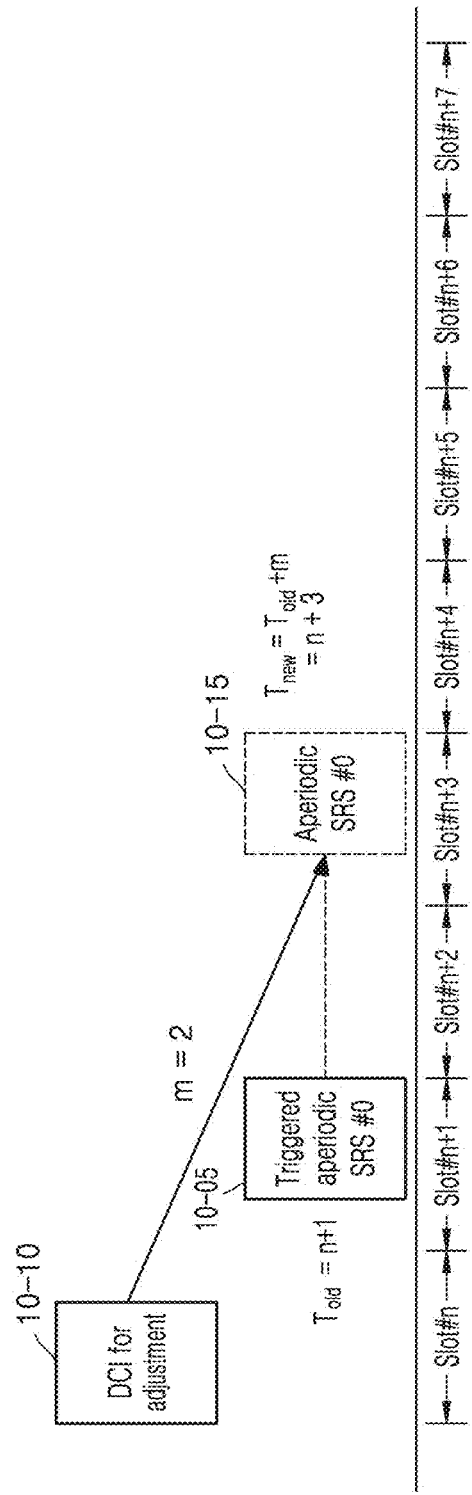
FIG. 10 illustrates a UE changing an AP SRS transmission timing by using an offset for dynamically changing an AP SRS transmission timing and a pre-configured AP SRS transmission timing, according to an embodiment.

FIG. 10 illustrates a UE changing an AP SRS transmission timing by using an offset for dynamically changing an AP SRS transmission timing and a pre-configured AP SRS transmission timing, according to an embodiment.

It may be assumed that the pre-configured AP SRS transmission timing is semi-statically determined with slotOffset in a higher layer parameter SRS-ResourceSet as in a Rel-15/16 operation. Alternatively, it may be assumed that the pre-configured AP SRS transmission timing is determined by considering a new offset for dynamically determining a transmission timing as in Embodiment 2-1. A slot offset for adjusting the pre-configured AP SRS transmission timing may be indicated by DCI separate from DCI including an SRS request field for triggering the AP SRS, and the separate DCI may be transmitted at a later time than the DCI including the SRS request field.

Referring to FIG. 10, an operation of determining a transmission timing by using a pre-configured timing $T_{old}$ and an offset m configured through DCI including timing adjustment information will be described. The UE may determine an AP SRS transmission timing by associating the timing adjustment offset m configured through the DCI with the pre-configured timing $T_{old}$, and the adjusted AP SRS transmission timing may be defined as an AP SRS transmission timing $T_{new}$ (=$T_{old}$+m) by receiving the offset m indicated by DCI 10-10 for adjustment as shown in FIG. 10. In this case, $T_{old}$ may be an AP SRS transmission timing determined by the above method. That is, $T_{old}$ may be a transmission timing determined based on an offset Y or Z. $T_{old}$ may be an AP SRS transmission timing triggered by an RRC configuration-based SRS request field. The AP SRS transmission timing triggered by the RRC configuration-based SRS request field refers to a timing determined according to slotOffset in a higher layer parameter SRS-ResourceSet for the triggered AP SRS. the UE may apply the offset m (e.g., m=2) to an AP SRS 10-05 triggered in a slot n+1 ($T_{old}$), based on the DCI for adjustment. Accordingly, the UE may change the transmission timing $T_{new}$ of the AP SARS from the slot n+1 to n+3 ($T_{old}$+2).

Figure 11:
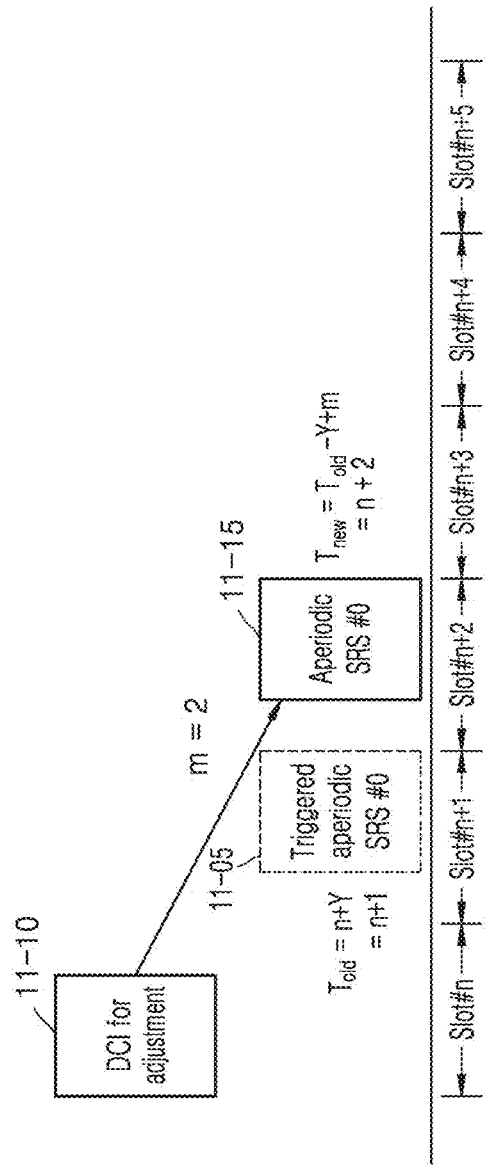
FIG. 11 illustrates a UE changing an AP SRS transmission timing by using only an offset for dynamically changing an AP SRS transmission timing, according to an embodiment.

FIG. 11 illustrates a UE changing an AP SRS transmission timing by using only an offset for dynamically changing an AP SRS transmission timing, according to an embodiment.

Referring to FIG. 11, an operation of determining a transmission timing by using only an offset m configured through DCI that is transmitted last and includes timing adjustment information excluding a pre-configured offset Y will be described. When the UE receives DCI for adjusting an AP SRS transmission timing, the UE may cancel the offset YE used to determine a pre-configured timing $T_{old}$ and may determine an AP SRS transmission timing by using the offset m indicated by the DCI that is transmitted last. In this case, the adjusted AP SRS transmission timing may be defined as $T_{new}=T_{old}-Y+m$ as shown in FIG. 11.

The UE may apply the offset m (e.g., m=2) to an AP SRS 11-05 triggered in a slot n+1 ($T_{old}$), based on the DCI for adjustment. In this case, the offset Y (e.g., Y=1) that is received earlier than the DCI 11-10 for adjustment may be cancelled. That is, the UE may change the transmission timing $T_{new}$ of the AP SRS from the slot n+1 to n+2 ($T_{old}-1+2$).

Figure 12:
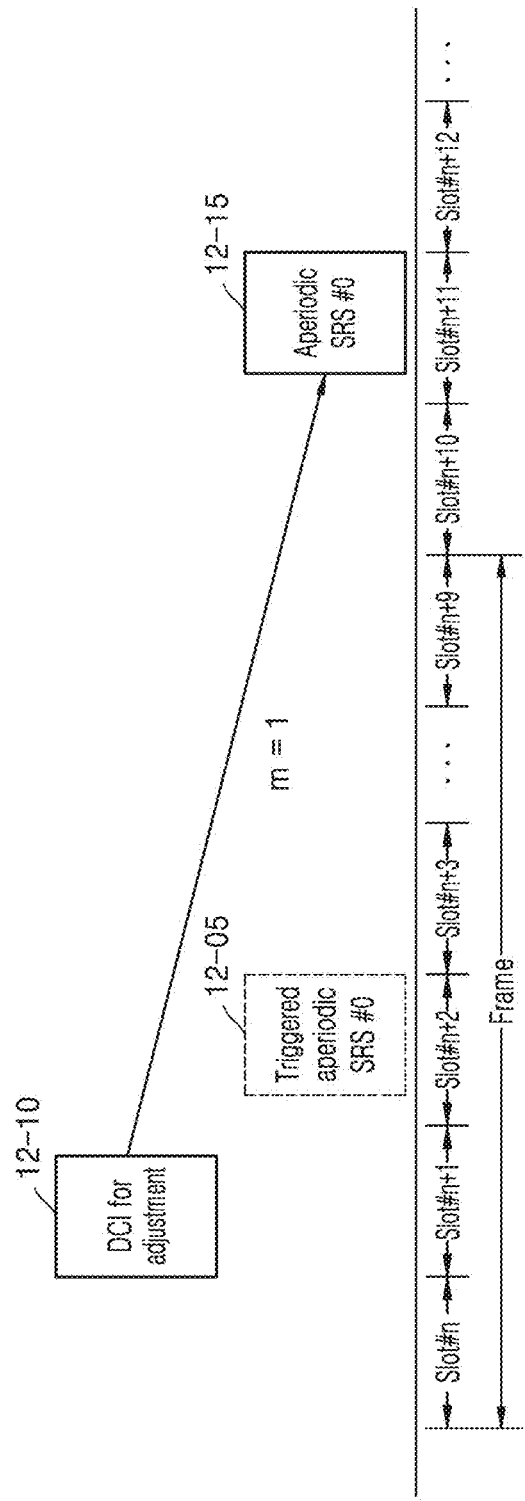
FIG. 12 illustrates a UE changing an AP SRS transmission timing by using only a slot index in a frame for dynamically changing an AP SRS transmission timing, according to an embodiment.

FIG. 12 illustrates a UE changing an AP SRS transmission timing by using only a slot index in a frame for dynamically changing an AP SRS transmission timing, according to an embodiment.

Referring to FIG. 12, an operation by which a UE determines an AP SRS transmission timing by using only an offset m configured through DCI including timing adjustment information, regardless of a pre-configured timing $T_{old}$, will be described. In detail, the UE may receive DCI 12-10 including transmission timing adjustment information. The UE may configure the offset m based on the DCI 12-10, and the offset m may indicate a slot in which an AP SRS is transmitted every frame. In detail, the UE may ignore the pre-configured timing $T_{old}$, based on the offset m. As illustrated in FIG. 12, after the UE receives the DCI 12-10 including an offset for adjustment, the UE may define the slot m of each frame as an AP SRS transmission timing.

When the offset m included in the DCI 12-10 is 1, the UE may not transmit the AP SRS at the same time as receiving the DCI 12-10 in a slot n+1 in which the DCI 12-10 is received. Accordingly, the UE may transmit the AP SRS 12-15 in a slot n+11 that is a first slot of a next frame. Also, the UE may ignore a slot n+2 that is the pre-configured timing $T_{old}$ based on the DCI 12-10.

An AP SRS transmission timing indicated in the above method should be greater than n'+K by considering a minimum time interval K (K=$N_2$ symbols (PUSCH preparation time) when a usage of an AP SRS is set to 'codebook' or 'antennaSwitching' and $N_2$+14 symbols in other cases) according to usages and a slot n' in which a PDCCH including DCI indicating timing adjustment is received. When the configured AP SRS transmission timing is not greater than n'+K, the AP SRS may be transmitted or a corresponding indication may be ignored by applying an automatic delay method or an offset control method described below.

Embodiment 2-3: Reordering Method for Changing Order of Triggered AP SRSs

Embodiment 2-3 provides a method of changing a transmission order of triggered AP SRSs by using additional DCI.

A BS may change an order of triggered AP SRSs according to a usage priority change, an available physical resource state, etc. For example, when an AP SRS resource set whose usage is set to 'codebook' is triggered at an earlier timing than an AP SRS resource set whose usage is set to 'beamManagement' and the BS determines that AP SRS transmission set to 'beamManagement' is prioritized, the BS may reorder an order of the corresponding AP SRS resource set. Although this operation may be performed through adjustment of changing an offset provided by Embodiment 2-2, when this operation is performed through DCI for reordering, AP SRS transmission timings may be exchanged by indicating only an index of an SRS whose order is to be changed. An operation according to a method of changing an order of triggered AP SRSs may be defined as follows. An operation according to a method of changing an order of triggered AP SRSs will be described with reference to FIGS. 13 through 15.

An AP SRS before an order is changed may be dynamically triggered through an SRS request field included in DCI, and a transmission timing may be semi-statically determined according to slotOffset included in a higher layer parameter SRS-ResourceSet as in an operation of Rel-15/16 or may be dynamically determined by using a new offset as in Embodiment 2-1.

Figure 13:
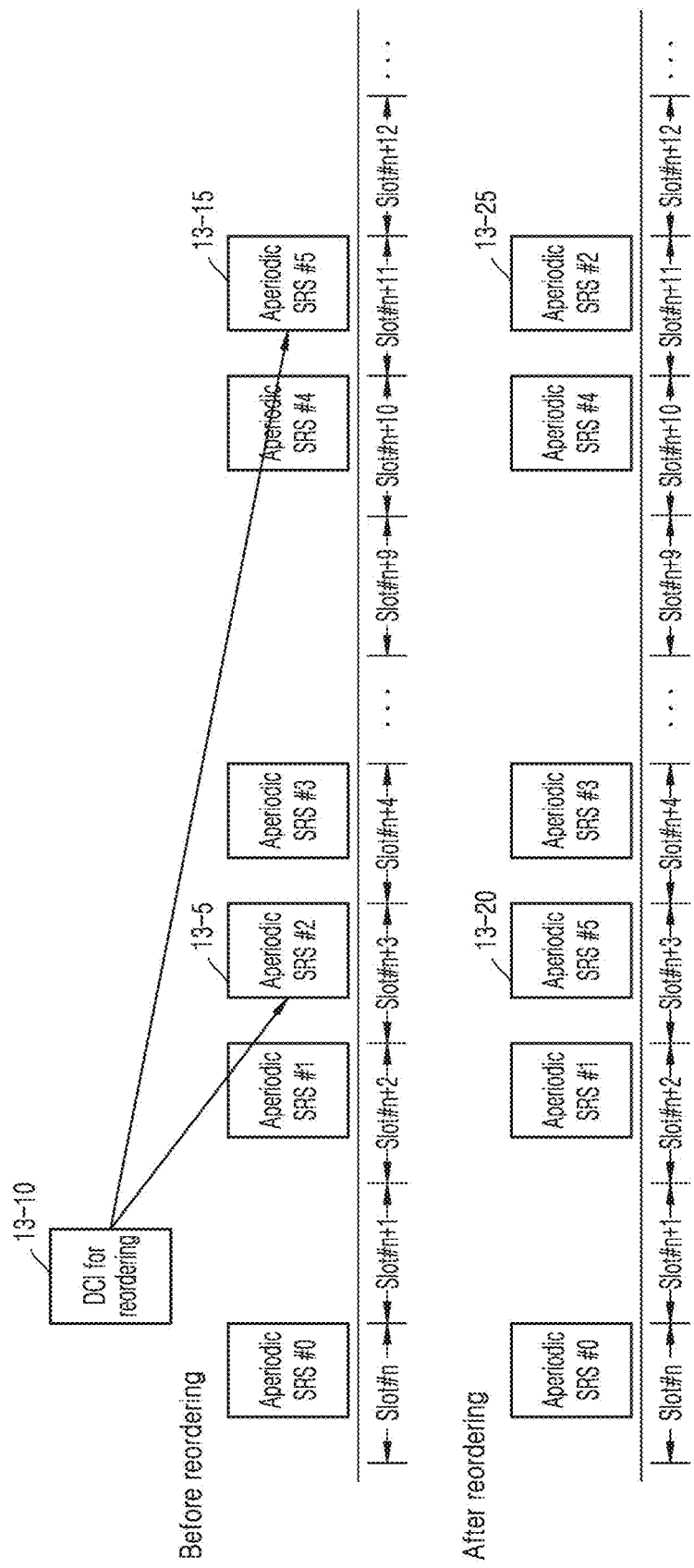
FIG. 13 illustrates a UE dynamically exchanging timings by using an offset indicating two AP SRS resource sets, according to an embodiment.

FIG. 13 illustrates a UE dynamically exchanging timings by using an offset indicating two AP SRS resource sets, according to an embodiment.

Referring to FIG. 13, an operation of exchanging transmission timings of AP SRSs that need to be reordered will be described. In order to exchange transmission timings of SRS resource sets indicated by two different AP SRS set IDs, a BS may transmit, to a UE, DCI including an SRS resource set ID pair including two SRS resource set IDs for exchanging transmission timings. An offset indicating the SRS resource set ID pair of AP SRSs whose transmission timings are to be exchanged may be indicated by DCI separate from DCI including an SRS request field for triggering the AP SRSs, and the separate DCI may be transmitted at a later time than the DCI including the SRS request field. Referring to FIG. 13, the UE may exchange transmission timings of two AP SRS resource sets 13-5 and 13-15 by referring to an SRS resource set ID pair indicated by received DCI 13-10. That is, the UE may change the transmission timings of the two AP SRS resource sets 13-5 and 13-15 to transmission timings of two AP SRS resource sets 13-20 and 13-25. When an indicated SRS resource set includes a plurality of SRS resources, transmission timings of the included resources may be changed.

Figure 14:
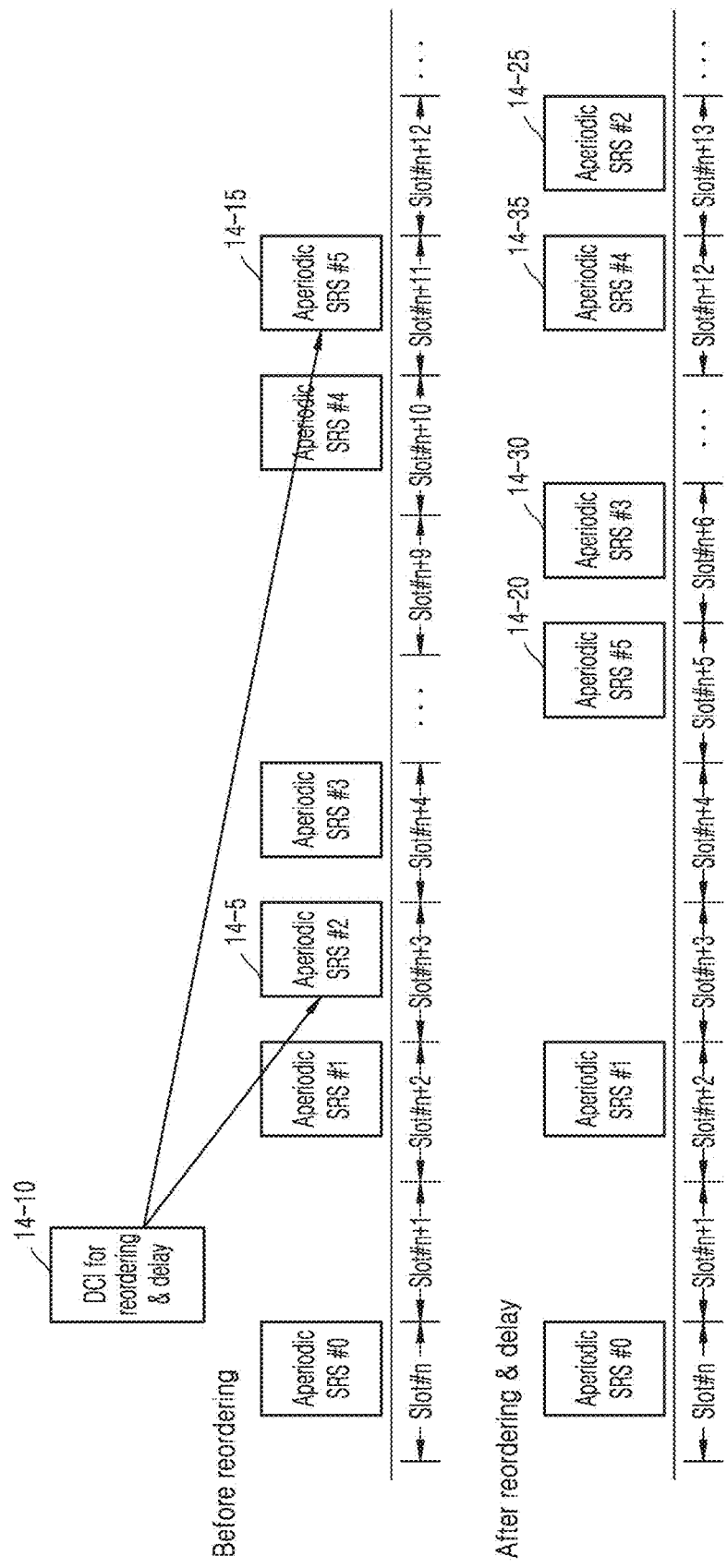
FIG. 14 illustrates a UE dynamically exchanging transmission timings of two AP SRS resource sets and delaying transmission timings of AP SRS sets by using information indicating the two AP SRS resource sets and a timing delay offset, according to an embodiment.

FIG. 14 illustrates a UE dynamically exchanging transmission timings of two AP SRS resource sets and delaying transmission timings of AP SRS resource sets by using information indicating the two AP SRS resource sets and a timing delay offset, according to an embodiment.

Referring to FIG. 14, an operation of exchanging and automatically delaying AP SRS transmission timings will be described. A BS may transmit, to a UE, DCI 14-10 including an SRS resource set ID pair including two SRS resource set IDs whose transmission timings are to be exchanged and a delay offset indicating a timing delay. The DCI including the SRS resource set ID pair of the AP SRSs whose transmission timings are to be exchanged and the delay offset may be indicated by DCI separate from DCI including an SRS request field for triggering the AP SRSs, and the separate DCI may be transmitted at a later time than the DCI including the SRS request field. As an example of this operation, FIG. 14 illustrates an operation of exchanging transmission timings of two AP SRS resource sets 14-5 and 14-15 and delaying transmission timings by an indicated delay offset. When the UE receives the DCI 14-10 including the SRS resource set ID pair and the timing delay offset, the UE may change the transmission timings of the two AP SRS resource sets 14-5 and 14-15 to transmission timings of two AP SRS resource sets 14-20 and 14-25. Also, based on the exchanged AP SRS transmission timings, the UE may automatically delay transmission timings of all AP SRS resource sets 14-20, 14-30, 14-35, and 14-25, which are to be transmitted after a slot n+3 including a first transmitted AP SRS resource set ID, by the indicated delay offset (e.g., the delay offset is 2).

Figure 15:
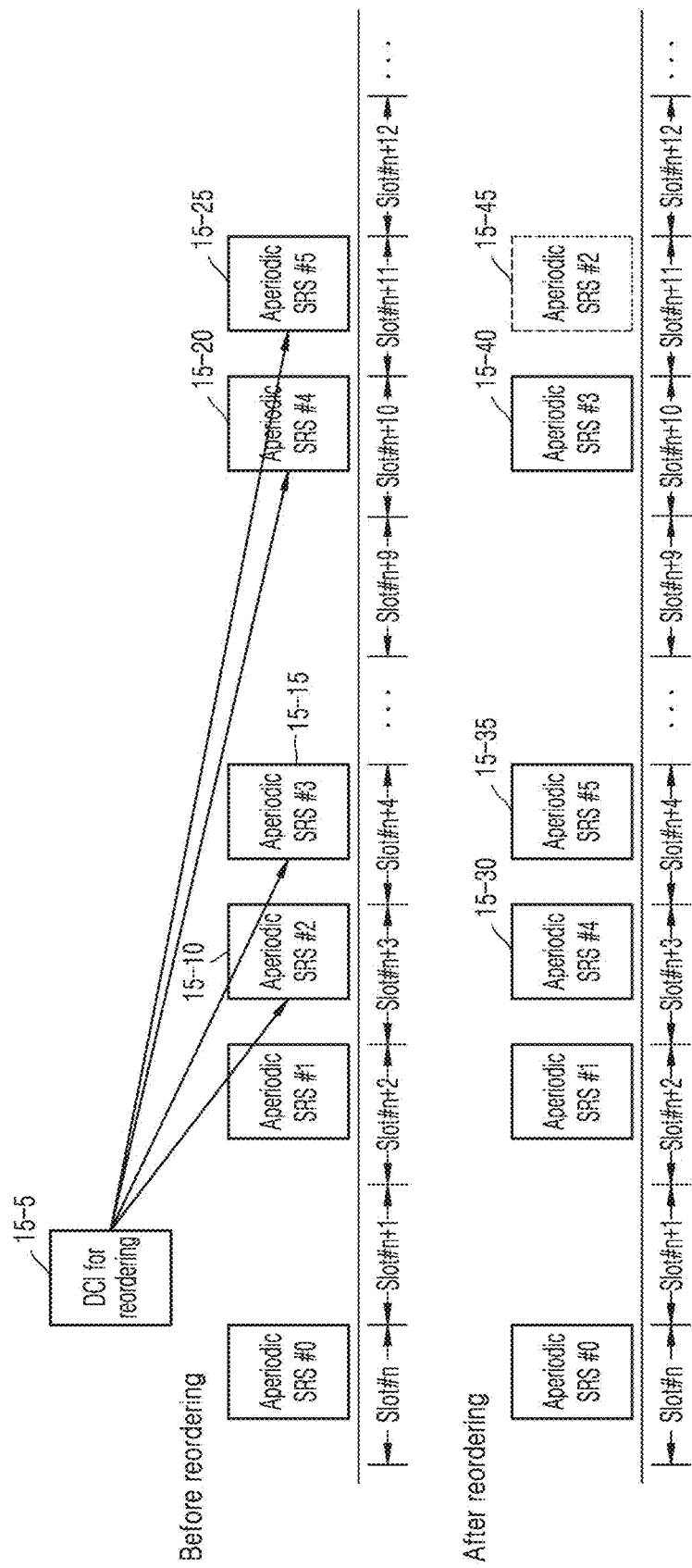
FIG. 15 illustrates a UE dynamically reordering transmission timings of three or more AP SRS resource sets by using an offset of reordering an order of triggered AP SRS resources, according to an embodiment.

FIG. 15 illustrates a UE dynamically reordering transmission timings of three or more AP SRS resource sets by using an offset of reordering an order of triggered SRS resources, according to an embodiment.

Referring to FIG. 15, an operation of overwriting transmission timings will be described. A BS may reorder an order of triggered AP SRS resource set IDs and may transmit a reordered AP SRS resource set ID list through DCI 15-5 to a UE. This method may be used to exchange three or more AP SRS transmission timings. The reordered AP SRS resource set ID list may be represented as AP SRS resource set IDs whose transmission timings are to be sequentially exchanged based on pre-configured transmission timings.

FIG. 15 illustrates an example of generating the reordered AP SRS resource set ID list. DCI including the reordered AP SRS resource set ID list for exchanging transmission timings may be indicated by DCI separate from DCI including an SRS request field for triggering the AP SRSs, and the separate DCI may be transmitted at a later time than the DCI including the SRS request field. The UE may receive the DCI 15-5 for reordering AP SRS resource sets 15-10, 15-15, 15-20, and 15-25, and may reorder transmission timings of SRS resource sets 15-30, 15-35, and 15-40 and may cancel transmission an SRS resource set 15-45. When the number of all triggered AP SRS resource sets is M, the number of bits for indicating AP SRS resource set IDs whose transmission timings are to be exchanged may be defined as

[log$_2$M]. The UE may reorder all SRS transmission timings by mapping a pre-configured AP SRS transmission timing to an AP SRS resource set ID indicated by DCI. In this case, when there exists 0, instead of an AP SRS resource set ID whose transmission timing is to be exchanged, in the reordered SRS resource set ID list based on the DCI (e.g., 0 among IDs in the list, a negative number, or an ID not existing in the list), SRS transmission of the AP SRS resource set may be cancelled.

An AP SRS transmission timing of a first transmitted AP SRS from among AP SRS resource sets reordered in the above method should be greater than n'+K by considering a minimum time interval K (K=N$_2$ symbols (PUSCH preparation time) when a usage of the AP SRS is set to 'codebook' or 'antennaSwitching' and N$_2$+14 symbols in other cases) according to a usage and a slot n' in which a PDCCH including DCI indicating reordering is received. When the AP SRS transmission timing is not greater than n'+K, the AP SRS may be transmitted or a corresponding indication may be ignored by applying an automatic delay method or an offset control method described below.

Embodiment 2-4: Method for Cancelling Triggered AP SRS

In Embodiment 2-4, an operation by which a BS transmits additional DCI for cancelling trigged AP SRSs to a UE in order not to transmit the triggered AP SRSs and the UE cancels the triggered AP SRSs according to the received additional DCI will be described.

When triggered AP SRS transmission is no longer required, e.g., when a usage of an AP SRS is not valid or a transmission/reception related operation is changed, the BS may transmit information for cancelling the AP SRS that is not required to the UE. For example, when a BWP is changed after an AP SRS is triggered and before a corresponding resource is transmitted, information of an UL channel for a changed BWP, instead of an UL channel for a BWP to be estimated with the triggered AP SRS, may be required. In this case, AP SRS resource sets triggered before the BWP change should be cancelled and new AP SRS resource sets for the changed BWP should be triggered. When a usage of an AP SRS is not valid or a transmission/reception related operation is changed, when a DL signal should be urgently received in a slot in which the AP SRS is triggered or another UL signal should be urgently transmitted, the triggered AP SRS may need be cancelled. An operation according to a method of cancelling a triggered AP SRS may be defined as follows. An operation according to a method of cancelling a triggered AP SRS will be described with reference to FIGS. 16 through 18.

Figure 16:
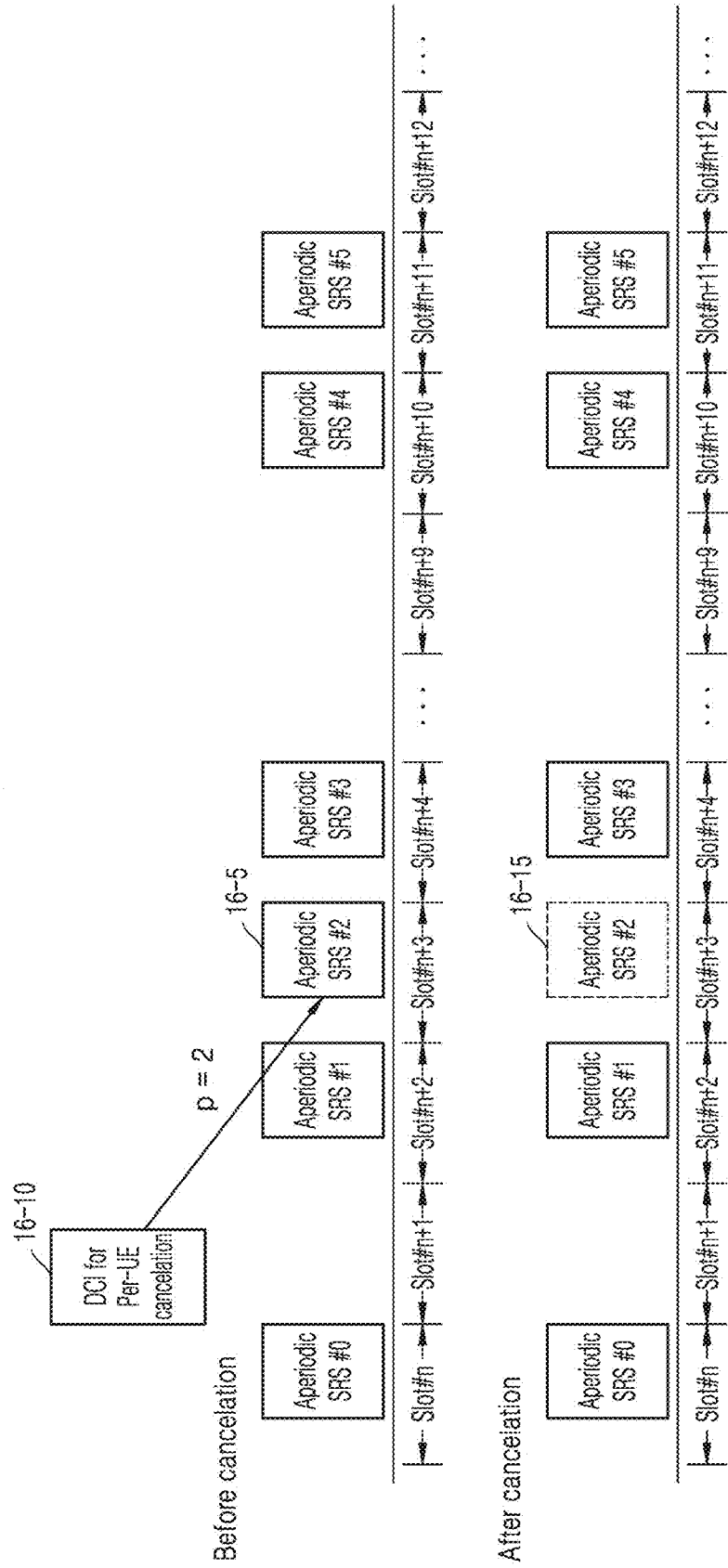
FIG. 16 illustrates a UE dynamically canceling a single AP SRS resource set by using an offset for cancelling a single triggered AP SRS resource set, according to an embodiment.

FIG. 16 illustrates a UE dynamically canceling a single AP SRS resource set by using an offset for cancelling a single triggered SRS resource set, according to an embodiment.

Referring to FIG. 16, an operation for cancelling a single AP SRS resource set (per-UE AP SRS dropping) will be described. In order to cancel a specific AP SRS, a BS may transmit, to a UE, DCI 16-10 including an AP SRS resource set ID to be cancelled. In order to cancel the specific AP SRS, the BS may transmit the DCI 16-10 including an offset p to the UE. The offset p may be indicated by the same DCI as the AP SRS resource set ID to be cancelled. The AP SRS resource set ID to be cancelled indicated by the DCI may be omitted as in the following example.

After the UE receives a PDCCH including the DCI 16-10 indicating cancellation of the triggered AP SRS in a slot n' (e.g., n'=n+1), the UE may cancel triggering of the corresponding AP SRS resource set. In this case, n' may be set to a value greater than a point of time n when DCI including an SRS request field for triggering the AP SRS to be cancelled is received. FIG. 16 illustrates an operation of cancelling a single triggered AP SRS resource set 16-5. In detail, when the offset p is 2, the UE may cancel an AP SRS triggered in a slot n+3 corresponding to n'+p, based on the DCI 16-10. When a plurality of AP SRS resource sets are triggered to be transmitted in the slot n+3, according to an AP SRS resource set ID indicating an AP SRS resource set to be cancelled, the UE may cancel the AP SRS resource set. When a single AP SRS resource set is triggered to be transmitted in the slot n+3, an AP SRS resource set ID indicating an AP SRS resource set to be cancelled may be omitted.

When a minimum time interval is K (K=N$_2$ symbols (PUSCH preparation time) when a usage of an AP SRS is set to 'codebook' or 'antennaSwitching' and N$_2$+14 symbols in other cases), a cancelled AP SRS transmission timing should be greater than n'+K. When the cancelled AP SRS transmission timing is not greater than n'+K, a corresponding indication may be ignored.

Figure 17:
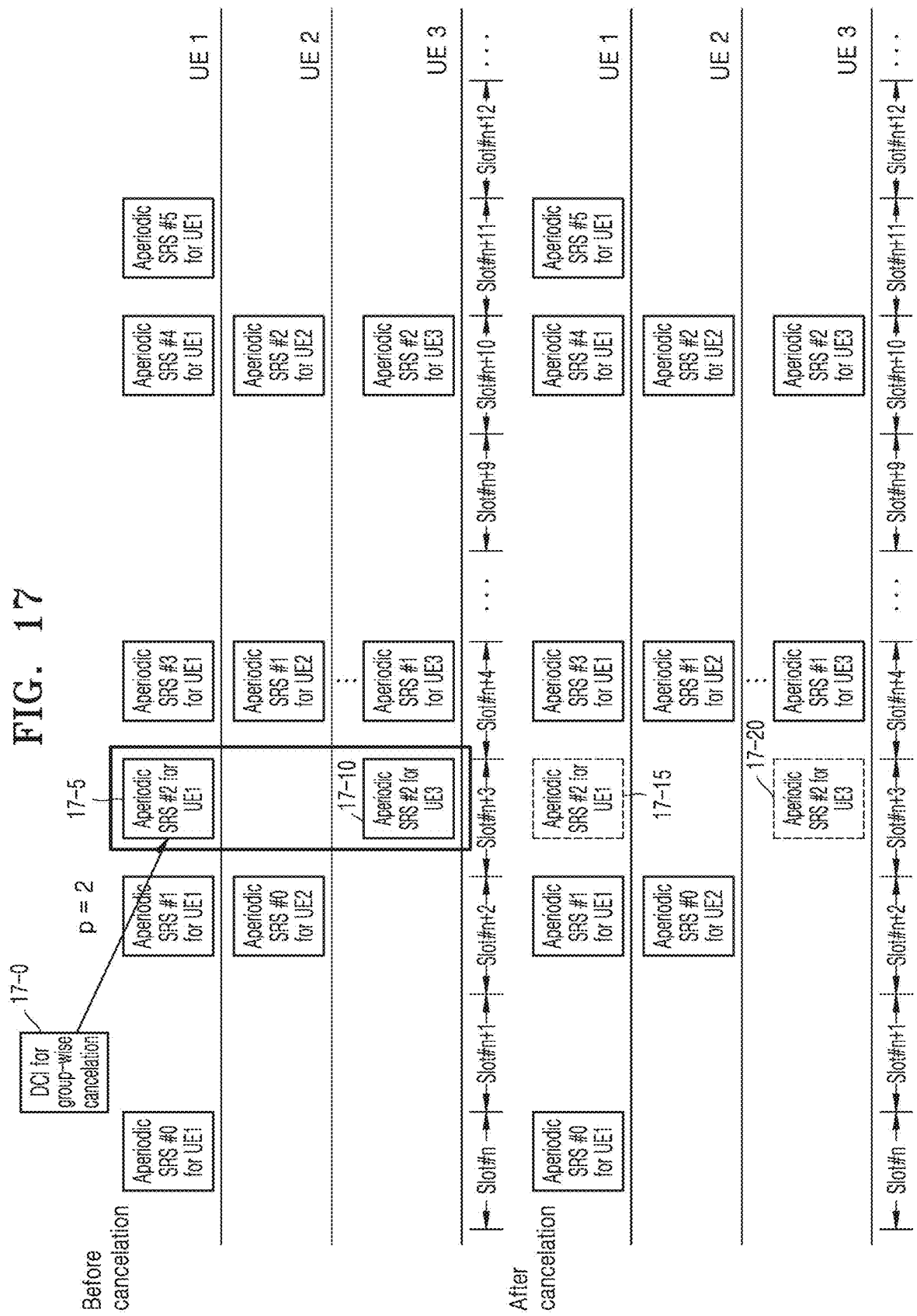
FIG. 17 illustrates a plurality of UEs cancelling triggered AP SRS resource sets by using an offset for cancelling group-based triggered AP SRS resource sets, according to an embodiment.

FIG. 17 illustrates a plurality of UEs cancelling triggered AP SRS resource sets by using an offset for cancelling group-based triggered AP SRS resource sets, according to an embodiment.

Referring to FIG. 17, an operation for cancelling AP SRS resource sets transmitted in a specific slot (group-wise AP SRS dropping) will be described. In order to cancel an AP SRS transmitted in a specific slot, a BS may transmit DCI 17-0 including a slot offset p for cancelling AP SRS transmission to a UE. After the UE receives a PDCCH including the DCI 17-0 for cancelling AP SRS transmission in a slot n', all AP SRS resource sets transmitted in a slot n'+p considering the slot n' in which the PDCCH is received and the slot offset p indicating cancellation may be cancelled.

FIG. 17 illustrates an operation by which a plurality of UEs cancel AP SRS resource sets 17-15 and 17-20 by using the offset p included in the DCI 17-0 for cancelling triggered AP SRS resources 17-5 and 17-10 of UEs UE1 through UE3 within a group. That is, referring to FIG. 17, when a slot in which the DCI 17-0 is received is a slot n+1 and the offset p is 2, n'+p may be n+3, and thus all of the AP SRSs 17-5 and 17-10 transmitted in the slot n+3 of the UEs UE1 through UE3 within the group may be cancelled (17-15 and 17-20).

When a minimum time interval is K (K=N$_2$ symbols (PUSCH preparation time) when a usage of an AP SRS is set to 'codebook' or 'antennaSwitching' and N$_2$+14 symbols in other cases), n'+p indicating cancellation of the AP SRS should be greater than n'+K. When n'+p is not greater than n'+K, a corresponding indication may be ignored.

Figure 18:
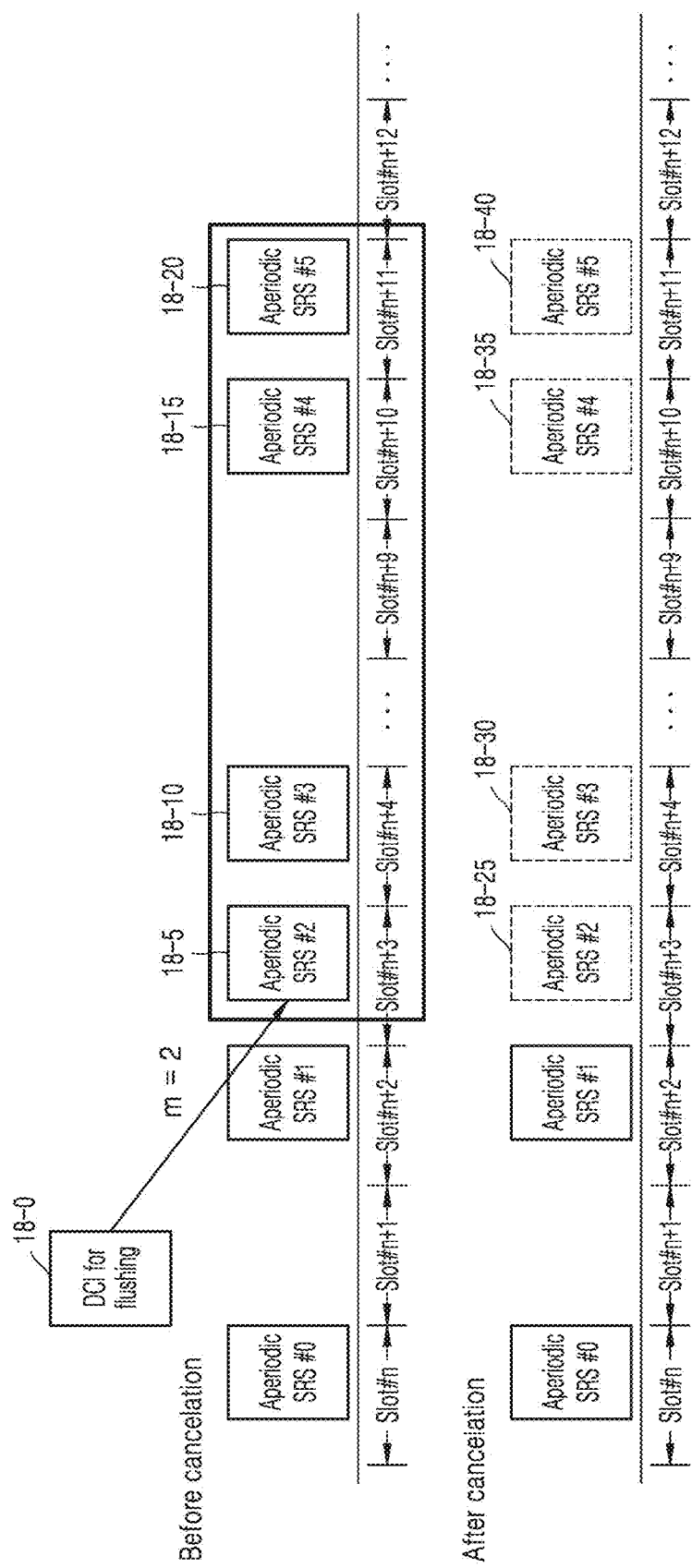
FIG. 18 illustrates a UE cancelling all triggered AP SRS resource sets after an indicated slot, according to an embodiment.

FIG. 18 illustrates a UE cancelling all triggered AP SRS resource sets after an indicated slot, according to an embodiment.

Referring to FIG. 18, an operation for cancelling all triggered AP SRSs after a slot m will be described. In order to cancel all AP SRSs transmitted after a specific slot, a BS may transmit, to a UE, DCI 18-0 including a slot offset m for cancelling AP SRS transmission.

After the UE receives a PDCCH including the DCI 18-0 for cancelling AP SRS transmission in a slot n' (here, slot n+1), the UE may cancel all AP SRS resource sets transmitted in a slot after n'+m (here, n+3) considering the slot n' in which the PDCCH is received and the slot offset m indicating cancellation.

FIG. 18 illustrates an operation of cancelling all AP SRS resource sets 18-5, 18-10, 18-15, and 18-20 after an indicated slot (18-25, 18-30, 18-35, and 18-40).

When a minimum time interval is K (K=$N_2$ symbols (PUSCH preparation time) when a usage of an AP SRS is set to 'codebook' or 'antennaSwitching' and $N_2$+14 symbols in other cases), n'+m indicating cancellation of all AP SRSs should be greater than n'+K. When n'+p is not greater than n'+K, a corresponding indication may be ignored or all AP SRSs triggered in slots after n'+K may be cancelled.

Embodiment 2-5: Triggered AP SRS Management Method According to UE Capability

There may be a limitation in periodic SRS resource sets that may be triggered by a UE according to a UE capability. For example, when an AP SRS is triggered by using a flexible triggering offset as in Embodiment 2-1, the UE may manage a plurality of different AP SRS resource sets that are dynamically triggered. In this case, the UE should store configuration information in a restricted resource (e.g., a memory for triggered AP SRS management) until UL transmission is performed for the triggered AP SRS resource sets. Accordingly, configuration information that may be stored by the UE may be limited according to a UE capability.

When AP SRSs are triggered as much as maximum configuration information that may be stored by the UE, the UE may ignore AP SRS information that is additionally triggered later. Alternatively, after AP SRSs are triggered as much as the maximum configuration information that may be stored, the UE may notify information indicating that maximum manageable AP SRS triggering has been reached to the BS via an UL transmission channel such as a PUCCH or a PUSCH.

Embodiment 3: Automatic Delay-Based Triggered AP SRS Transmission Method

When an AP SRS is triggered to be transmitted by using slotOffset in a higher layer parameter SRS-ResourceSet or according to Embodiment 2, a UE may not perform SRS transmission using an UL resource at an AP SRS transmission timing. An operation of triggering and transmitting an AP SRS will be described in detail. The UE may trigger an AP SRS according to an SRS request field indicated by DCI, and a transmission timing of the triggered AP SRS may be semi-statically determined with slotOffset in the higher layer parameter SRS-ResourceSet as defined in Rel-15/16. Alternatively, the UE may trigger an AP SRS according to an SRS request field indicated by DCI, and a transmission timing of the triggered AP SRS may be dynamically determined with a new offset indicated by DCI as in Embodiment 2. As in the following example, there may be a case where a triggered AP SRS is unable to be transmitted at a determined transmission timing. For example, when an AP SRS overlaps UL physical channel information having a higher priority than AP SRS transmission, the UE may not transmit the AP SRS for overlapping symbols and the un-transmitted SRS may be dropped. In order to prevent dropping of a triggered AP SRS, a transmission timing may be adjusted as described in Embodiment 2. However, when a transmission timing is adjusted by using this method, the BS transmits additional DCI, thereby increasing DCI overhead. In this case, the additional DCI is transmitted to indicate a new offset for dynamically determining a transmission timing.

In order to compensate for this problem, the disclosure provides an automatic delay-based triggered AP SRS transmission method. A dropped AP SRS may be transmitted without additional DCI or with very small additional DCI by using the automatic delay-based triggered AP SRS transmission method of the present embodiment of the disclosure. The automatic delay-based triggered AP SRS transmission method will be described in more detail in Embodiment 3-1, Embodiment 3-2, and Embodiment 3-3.

Embodiment 3-1: AP SRS Transmission Method Using Automatic Delay

When a UE is unable to transmit an AP SRS at a determined transmission timing, a BS may receive a report of a UE capability for automatic delay to determine whether the AP SRS may be transmitted by performing the automatic delay. When the UE transmits the report of the UE capability and the automatic delay may be supported, the BS may add a higher layer parameter, for example, 'enableAutoDelay', for determining whether to perform an automatic delay operation and may set a value to {on}, during an RRC configuration. The UE receives RRC configuration information from the BS. The UE may determine an AP SRS to be transmitted according to an AP SRS triggering operation described above. When the UE is unable to transmit the AP SRS at a determined AP SRS transmission time, the UE may transmit the AP SRS on an available physical resource through an automatic delay method as described with reference to FIG. 19.

Figure 19:
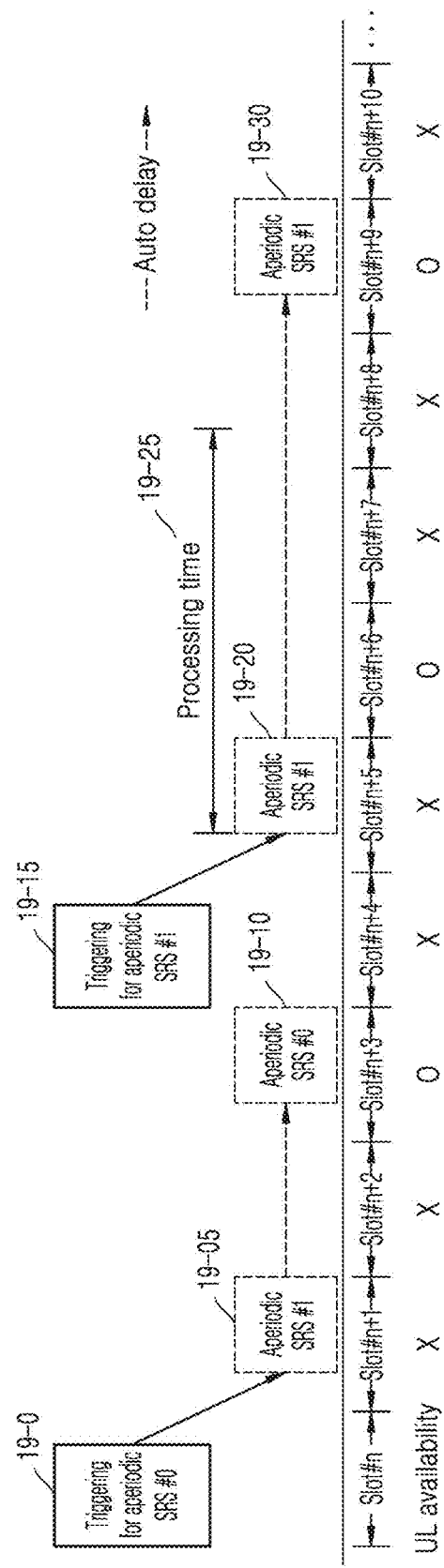
FIG. 19 illustrates a UE transmitting an AP SRS by using an automatic delay method, according to an embodiment.

FIG. 19 illustrates a UE transmitting an AP SRS by using an automatic delay method, according to an embodiment.

Referring to FIG. 19, a UE determines whether an AP SRS is able to be transmitted at a triggered transmission timing based on whether UL transmission of a physical resource is configured and whether UL transmission of another physical channel information is required. For example, when the UE is unable to transmit an AP SRS at a triggered transmission timing (19-05 and 1-20), the UE may automatically delay a transmission timing until the AP SRS is able to be transmitted (19-10 and 19-30) on an available physical resource.

As described in Embodiment 2, even when a timing of triggering and transmitting the AP SRS does not satisfy a required time 19-25 including a processing time for SRS transmission (19-20), the UE may transmit the AP SRS on a next available physical resource 19-30 through automatic delay of the present embodiment of the disclosure.

Embodiment 3-2: AP SRS Transmission Method Indicating Available Resource Index

A BS may trigger an AP SRS through DCI, and may semi-statically determine a transmission timing of the AP SRS by using a higher layer parameter slotOffset as in Rel-15/16 or may dynamically determine a transmission timing as in a method of Embodiment 2. However, when the triggered AP SRS is unable to be transmitted at an indicated timing, the UE may drop the triggered AP SRS as in a Rel-15/16 operation, or may automatically delay the triggered AP SRS till a next AP SRS transmittable resource as in a method of Embodiment 3-1. Because the method of Embodiment 3-1 performs automatic delay only till a very next transmittable resource, it is difficult to flexibly manage transmission resources for a plurality of triggered AP SRSs. Accordingly, Embodiment 3-2 provides an automatic delay method through an available resource index indicated by DCI to flexibly support an automatic delay method. An available resource index u indicates a $u^{th}$ transmittable resource (e.g., slot) from among resources (e.g., slots) on which AP SRSs may be transmitted may be transmitted, instead of a slot index.

When the UE is unable to transmit an AP SRS at a determined transmission timing, the BS may receive a report of a UE capability to determine whether automatic delay may be performed by considering an available resource index indicated by DCI. When the UE transmits the report of the UE capability and the automatic delay considering the available resource index may be supported, the BS may add a higher layer parameter, for example, 'enableAutoDelay-ResourceIndex', for determining whether to perform an automatic delay operation by considering the available resource index and may set a value to {on}, during an RRC configuration. This is an example of a higher layer parameter configuration method, and a higher layer parameter, for example, 'enableAutoDelay' described in Embodiment 3-1, may be added and a value may be set to {ResourceIndex} to be distinguished from Embodiment 3-1. When the UE is unable to transmit an AP SRS at a determined AP SRS transmission time, the UE may transmit the AP SRS by performing automatic delay based on an available resource index indicated by DCI as described with reference to FIG. 20.

Figure 20:
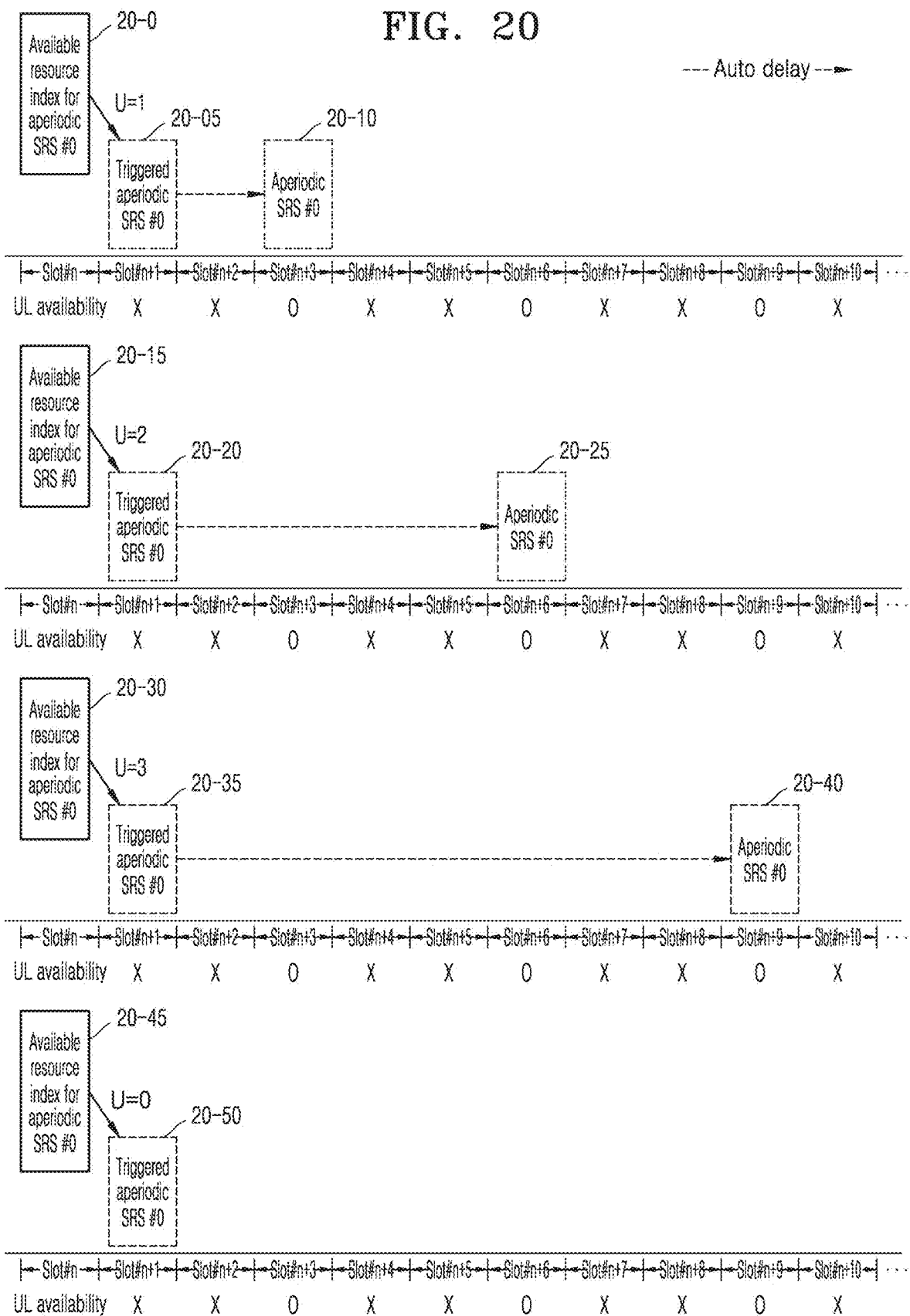
FIG. 20 illustrates a UE transmitting an AP SRS based on an indicated available resource index, according to an embodiment.

FIG. 20 illustrates a UE transmitting an AP SRS based on an indicated available resource index, according to an embodiment.

Referring to FIG. 20, a BS may indicate an available resource index to adjust a transmission timing of an AP SRS that is newly triggered or has already been triggered. When the BS indicates the available resource index of the newly triggered AP SRS, the BS may indicate the available resource index by using an additional field in DCI for triggering the AP SRS. In this case, the available resource index may be applied to an AP SRS resource set that is triggered through the transmitted DCI. Alternatively, the BS may indicate the available resource index of the AP SRS that has already been triggered by DCI separate from the DCI for triggering the AP SRS. In this case, an SRS resource set ID field in the DCI may be added to indicate the AP SRS to which the available resource index is applied. The term 'available resource index' refers to an index corresponding to an available resource.

For example, referring to FIG. 20, when the UE receives DCI in which an available resource index u 20-0 is set to 1 (u=1), the UE may perform automatic delay until an AP SRS 20-05 is transmitted on a first available resource (20-10). When the UE receives DCI in which an available resource index u 20-15 is set to 2 (u=2), the UE may automatically delay and may transmit an AP SRS 20-20 on a second available resource (20-25). Likewise, when the UE receives DCI in which an available resource index u 20-30 is set to 3 (u=3), the UE may automatically delay and transmit an AP SRS 20-35 on a third available resource (20-40).

The BS may indicate the UE to perform an operation defined in the present embodiment of the disclosure by using the same index u for all triggered AP SRS resource sets. Alternatively, the BS may indicate each index u for each AP SRS resource set that has already been triggered or is newly triggered through DCI, and may indicate an SRS to be transmitted on a different available resource. That is, an index u may be configured according to each AP SRS resource set. When the UE receives DCI in which an index u 20-45 is set to 0 (u=0) for a triggered AP SRS resource set from the BS, the UE may cancel the AP SRS resource set (20-50).

Embodiment 3-3: Method of Transmitting AP SRS with Overlapping Available Resource Due to Automatic Delay FIG. 21 illustrates rules under which a UE selects an AP SRS resource set that is preferentially transmitted when transmission timings of an AP SRS resource set that is automatically delayed and an AP SRS resource set that is newly triggered are the same and the AP SRS resource sets are unable to be simultaneously transmitted, according to an embodiment.

Figure 22:
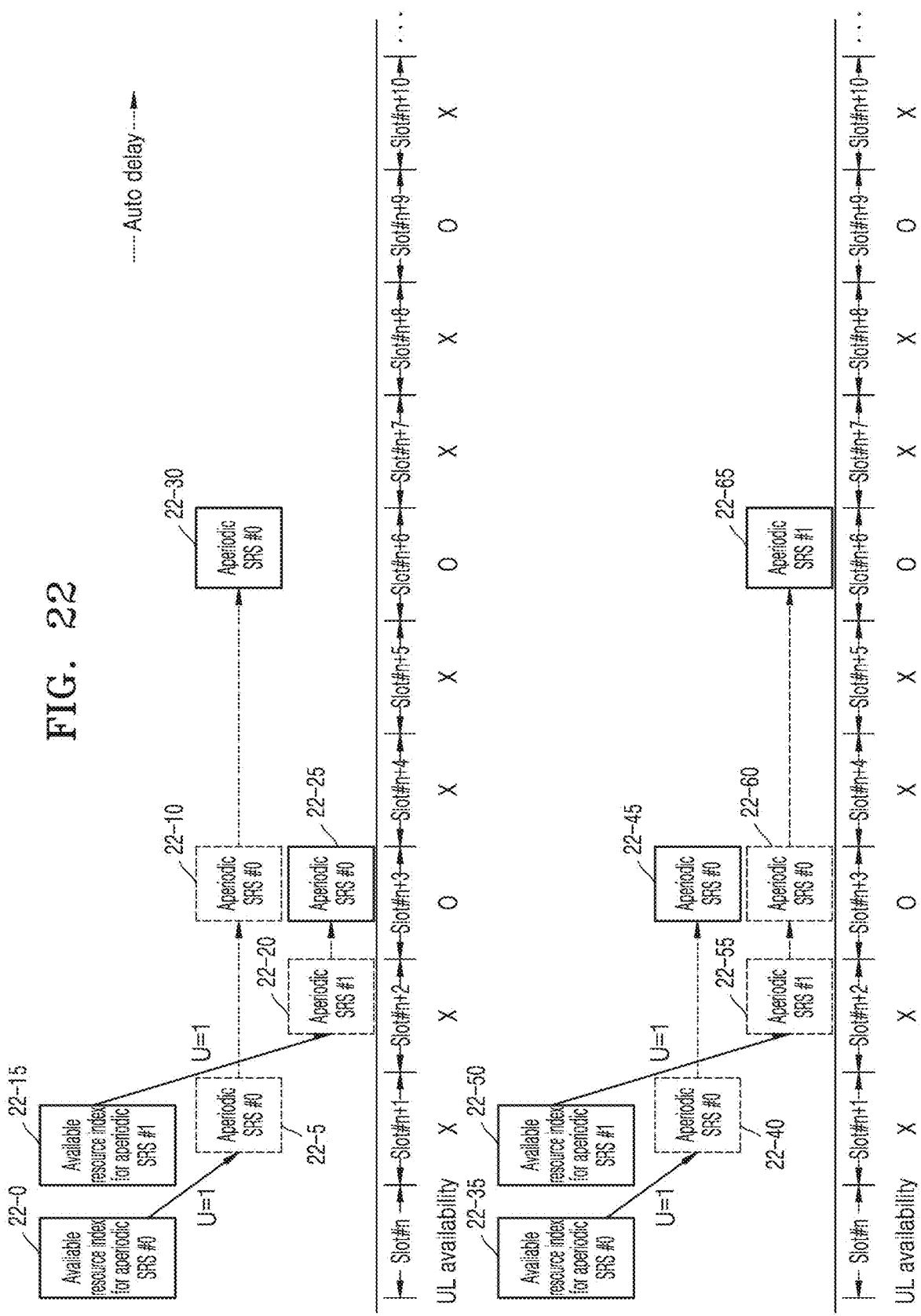
FIG. 22 illustrates rules under which a UE selects an AP SRS resource set that is preferentially transmitted when transmission timings of two AP SRS resource sets that are triggered based on an available index are the same and the AP SRS resource sets are unable to be simultaneously transmitted, according to an embodiment.

FIG. 22 illustrates rules under which a UE selects an AP SRS resource set that is preferentially transmitted when transmission timings of two AP SRS resource sets that are triggered based on an available index are the same and the AP SRS resource sets are unable to be simultaneously transmitted, according to an embodiment.

Figure 21:
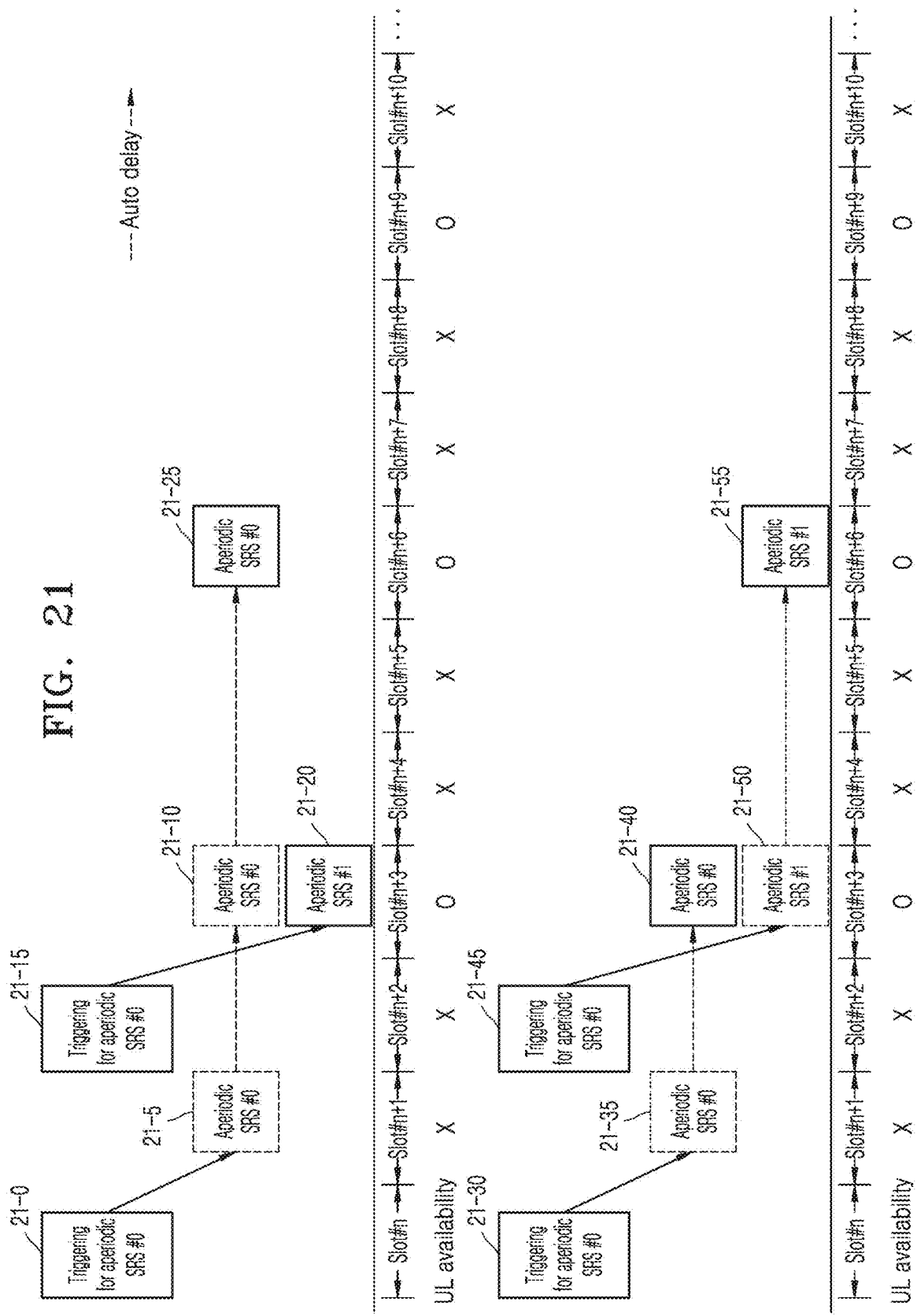
FIG. 21 illustrates rules under which a UE selects an AP SRS resource set that is preferentially transmitted when transmission timings of an AP SRS resource set that is automatically delayed and an AP SRS resource set that is newly triggered are the same and the AP SRS resource sets are unable to be simultaneously transmitted, according to an embodiment.

Referring to FIGS. 21 and 22, a method of selecting an AP SRS resource set to be preferentially transmitted when two or more AP SRS resource sets are unable to be transmitted at the same transmission timing will be described.

Referring to FIG. 21, available resources of an AP SRS resource set 21-10 that is automatically delayed and another AP SRS resource set 21-20 may overlap each other. When a BS and a UE operate as in a method of Embodiment 3-1, as illustrated in FIG. 21, AP SRS resource sets 0 21-5 and 21-35 triggered in a slot n+1 may be automatically delayed (21-10 and 21-40) to a slot n+3. Also, AP SRS resource sets 1 may be triggered in the slot n+3 that is an available resource timing (21-20 and 21-50). In this case, the two different AP SRS resource sets 0 and 1 may overlap each other at the same transmission timing (i.e., the slot n+3). Alternatively, when the BS and the UE operate as in a method of Embodiment 3-2, as shown in FIG. 22, when an index u is set to 1 for AP SRS resource sets 0 and 1 (22-0, 22-15, 22-35, and 22-50), the two different AP SRS resource sets 0 and 1 may overlap each other at the same transmission timing $u_1$ (=a slot n+3) (22-10, 22-25, 22-45, and 22-60). When the overlapping AP SRS resource sets 0 and 1 are unable to be transmitted at the same transmission timing, an AP SRS resource set transmitted in the slot $u_1$ may be selected under the following rules.

1) The UE preferentially transmits an AP SRS resource set that is triggered earlier from among a plurality of overlapping AP SRS resource sets (21-40 and 22-45), and automatically delays an AP SRS resource set that is triggered later (21-55 and 22-65) and transmits the AP SRS resource set on a next available resource or cancels the AP SRS resource set.
2) The UE preferentially transmits an AP SRS resource set that is triggered later from among a plurality of overlapping AP SRS resource sets (21-20 and 22-25), and automatically delays an AP SRS resource set that is triggered earlier (21-25 and 22-30) and transmits the AP SRS resource set on a next available resource or cancels the AP SRS resource set.

When an AP SRS resource set is automatically delayed and continuously delayed till an $X^{th}$ slot that is set to a threshold value, the UE may cancel the AP SRS resource set.

Embodiment 4: Transmission Information Configuration Method for Dynamically Triggering AP SRS In Embodiment 4, a method of configuring a new offset field in DCI to indicate a new offset for dynamically determining a transmission timing of an AP SRS will be described. According to the above embodiments of the disclosure, a BS may indicate a new offset based on DCI to determine a transmission timing of an AP SRS. In this case, a field for the new offset in the DCI may be differently configured according to a method of dynamically determining a transmission timing of an AP SRS and RRC information configured based on a UE capability reported by a UE. When the UE may support an operation according to at least one of the above embodiments of the disclosure and receives the RRC configuration from the BS to support the operation, the BS may indicate an operation to be performed with the new offset indicated by the DCI.

When the BS should indicate an AP SRS resource set for dynamically determining a transmission timing by applying the offset indicated by the DCI, a field for indicating an AP SRS resource set ID for dynamically determining the transmission timing should be added to the DCI. When all of the following conditions are satisfied, the BS may determine that an ID of an AP SRS resource set for dynamically determining a transmission timing should be indicated by using an additional DCI field:

1) when a transmission timing of a triggered AP SRS is determined by additional DCI separate from DCI including an SRS request field for triggering an AP SRS
2) when a plurality of AP SRS resource sets are triggered
3) when a transmission timing of an AP SRS is determined through 'registration', 'adjustment' or 'automatic delay considering an available resource index' from among operations described in the above embodiments of the disclosure, or when a specific triggered AP SRS resource set is cancelled through an operation for cancelling a single AP SRS resource set When a new offset is indicated by the same DCI as an SRS request field, transmission timings may be determined by applying the new offset to AP SRS resource sets that are triggered by the DCI. In 'reordering' from among the operations described in the above embodiments of the disclosure, because an AP SRS resource set ID pair (three or more IDs) for exchanging transmission timings is transmitted by using a new offset, a field for indicating a separate AP SRS resource set ID is not required. In 'cancellation' operations excluding an operation for cancelling a single AP SRS resource set, because a position of a slot for cancelling transmission is indicated, a field for indicating a separate AP SRS resource set ID is not required.

Accordingly, when the BS indicates a new offset for dynamically determining a transmission timing of an AP SRS through DCI, the DCI for indicating the new offset may include 1) a main operation field, 2) a detailed operation field, 3) an AP SRS resource set ID field for performing an operation, and 4) a new offset field according to an RRC configuration according to a UE capability of the UE and a transmission timing change operation to be indicated. In this case, some fields may be omitted according to the RRC configuration and the transmission timing change operation to be indicated.

Figure 23A:
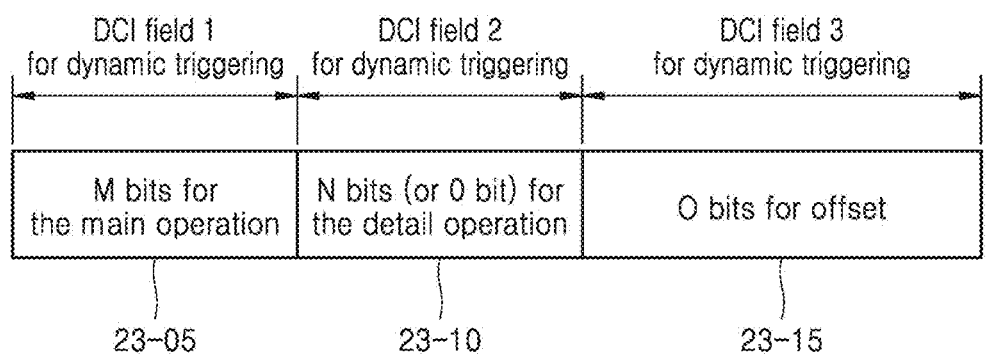
FIG. 23A illustrates a method by which a BS configures DCI for dynamically triggering an AP SRS, according to an embodiment.

FIG. 23A illustrates a method by which a BS configures DCI for dynamically triggering an AP SRS, according to an embodiment. Specifically, FIG. 23A illustrates a method of configuring DCI when an ID field of an AP SRS resource set for dynamically determining a transmission timing is not added.

In order to dynamically trigger an AP SRS, new triggering may be performed by using DCI or information of a triggered AP SRS resource set may be updated as described above. In this case, an operation for determining an AP SRS transmission timing and an offset required for each operation may be transmitted through DCI. DCI according to an embodiment may be divided into three fields as shown in FIG. 23A.

Referring to FIG. 23A, a first DCI field 23-05 may indicate a main operation method for determining a timing of an AP SRS such as 'registration', 'adjustment', 'cancellation', and 'automatic delay' as in the above embodiments of the disclosure. When a BS selects only one of operations such as 'registration', 'adjustment', 'cancellation', and 'automatic delay' and supports AP SRS triggering, the first DCI field may be omitted, and when only one of detailed operations thereof is used, a second DCI field 23-10 may be omitted to form the DCI.

The second DCI field 23-10 may indicate a detailed operation method for an operation method selected in the first DCI field, or may be omitted when the selected operation method is defined by only one detailed operation and a transmission timing of an AP SRS is determined. For example, when a new offset is received, whether to apply only the received offset or to apply the new offset and an offset determined based on a higher layer together may be indicated by the second DCI field 23-10. When a new offset is received and it is agreed to apply only the new offset, because an indication of a detailed operation is not required, the second DCI field 23-10 may be omitted. Whether to omit the first DCI field and the second DCI field may be determined according to RRC information configured by the BS by considering a UE capability as in a DCI field configuration method described above.

In a third DCI field 23-15, an offset required to determine a transmission timing of an AP SRS according to a dynamic AP SRS triggering operation that is previously determined between the BS and the UE or determined by the first DCI field 23-05 and the second DCI field 23-10 may be indicated, and may be omitted for an operation not requiring an additional offset. The offset included in the third DCI field 23-15 may be set to a value (relative slot offset) for relatively indicating an SRS transmission timing according to a dynamic AP SRS triggering operation, a value (absolute slot offset) for directly indicating an SRS transmission timing, or an AP SRS transmittable resource index (available resource index). Examples of the offset included in the third DCI field 23-15 may be shown in Tables 17, 18, and 19, and are respectively a value for relatively indicating an SRS transmission timing, a value for directly indicating an SRS transmission timing, and an available resource index.

TABLE 17

| DCI value | 0 | 1 | ... | $2^A - 2$ | $2^A - 1$ |
|---|---|---|---|---|---|
| Indication value | $-2^A/2 + 1$ | $-2^A/2 + 2$ | ... | $2^A/2 - 1$ | $2^A/2$ |

TABLE 18

| DCI value | 0 | 1 | ... | $2^B - 2$ | $2^B - 1$ |
|---|---|---|---|---|---|
| Indication value | 1 | 2 | ... | $2^B - 1$ | $2^B$ |

TABLE 19

| DCI value | 0 | 1 | ... | $2^C - 2$ | $2^C - 1$ |
|---|---|---|---|---|---|
| Indication value | 1 | 2 | ... | $2^C - 1$ | $2^C$ |

The BS may configure and indicate AP SRS resource set IDs for performing 'reordering' by using a new offset in the third DCI field. According to a reordering method, {an SRS resource set ID pair}, {an SRS resource set ID pair and a timing delay offset}, or {three or more SRS resource set IDs} may be indicated by using a new offset for performing reordering.

Figure 23B:
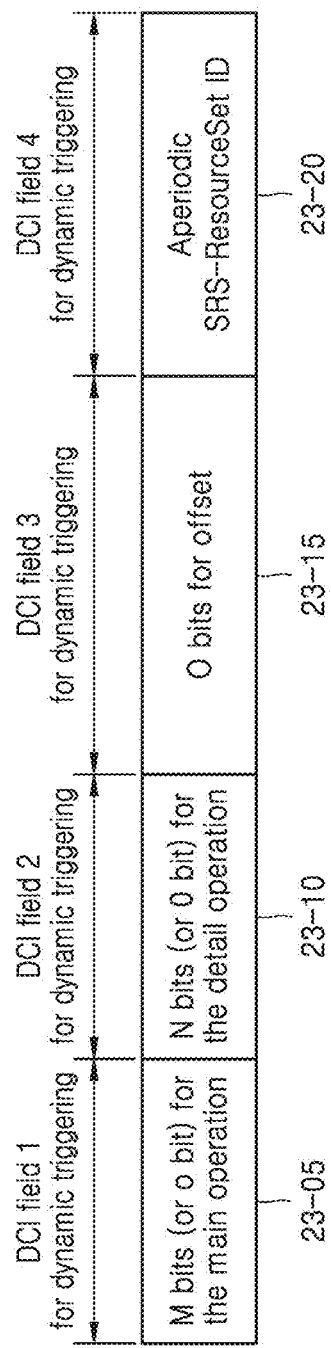
FIG. 23B illustrates a method by which a BS configures DCI for dynamically triggering an AP SRS, according to an embodiment.

FIG. 23B illustrates a method by which a BS configures DCI for dynamically triggering an AP SRS, according to an embodiment.

In FIG. 23B, an ID of an AP SRS resource set for dynamically determining a transmission timing may be indicated by adding a field 23-20 for indicating an AP SRS resource set ID to a DCI configuration described with reference to FIG. 23A. Information indicated by the first through third DCI fields 23-05 through 23-15 of FIG. 23B may be the same as that of the first through third DCI fields 23-05 through 23-15 of FIG. 23A.

Embodiment 5: Group DCI-Based AP SRS Triggering Method

A BS may trigger an AP SRS through UE-specific DCI such as a DCI format 0_1 or 1_1 to a UE, or may simultaneously trigger AP SRSs for one or more UEs through group-common DCI. When AP SRSs are triggered through group-common DCI, DCI overhead required to trigger an AP SRS of each UE may be reduced. Group-common DCI for triggering AP SRSs may use a format for an existing UE group such as a DCI format 2_3. When the BS dynamically triggers AP SRSs for a single group by using the DCI format 2_3, a higher layer parameter srs-TPC-PDCCH-Group may be set to typeA or typeB and a configuration method of the DCI format 2_3 may vary according to the type. When the higher layer parameter srs-TPC-PDCCH-Group is set to typeA, one block may be configured to include the following fields.

SRS request
TPC command number 1, TPC command number 2, . . . , TPC command number N
AP SRS triggering information The AP SRS triggering information refers to a new offset field for dynamically determining a transmission timing of an AP SRS, and the new offset field may be the same as a DCI configuration method of Embodiment 4.

When the higher layer parameter srs-TPC-PDCCH-Group is set to typeB, each block corresponding to block number 1, block number 2, . . . , block number B may be configured to include the following fields.

SRS request
TPC command
AP SRS triggering information

The AP SRS triggering information refers to a new offset field for dynamically determining a transmission timing of an AP SRS, and the new offset field may be the same as a DCI configuration method of Embodiment 4.

Alternatively, when the higher layer parameter srs-TPC-PDCCH-Group is set to typeB, the DCI format 23 may be configured to include number 1, block number 2, . . . , block number B, SRS offset block 1, . . . , SRS offset block C by adding a block including AP SRS triggering information. Each SRS offset block may include AP SRS triggering information, and the number C of SRS offset blocks may not be the same as B. AP SRS triggering information defined in the present embodiment of the disclosure may constitute DCI as described in Embodiment 4.

Figure 24:
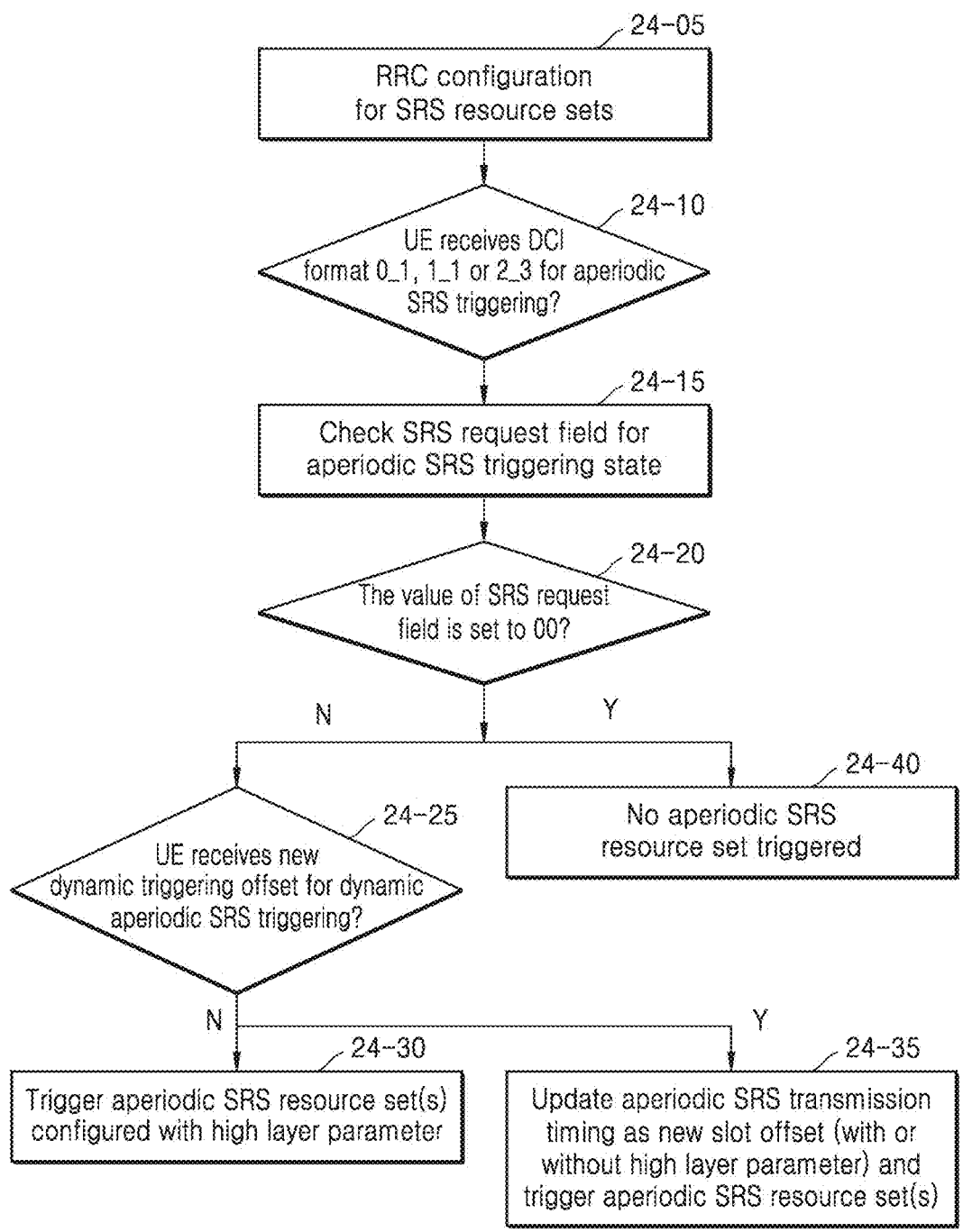
FIG. 24 is a flowchart illustrating a process by which a UE triggers an AP SRS by considering a higher layer parameter and a DCI-based dynamic AP SRS triggering offset, according to an embodiment.

FIG. 24 is a flowchart of a process by which a UE triggers an AP SRS by considering a higher layer parameter and a DCI-based dynamic AP SRS triggering offset, according to an embodiment.

Referring to FIG. 24, a UE may perform DCI-based dynamic AP SRS triggering as in the above embodiments.

Before step 24-05 is performed, the UE may transmit a UE capability to a BS to report whether an AP SRS transmission timing is dynamically changeable.

In steps 24-05 and 24-10, the UE receives a DCI format 0_1, 1_1, or 2_3 for triggering an AP SRS, based on RRC configuration information of an SRS resource set. This DCI format is merely an example, and information for dynamically triggering an AP SRS may be transmitted in another DCI format 0_2 or 1_2 or a new DCI format. An RRC configuration received in step 24-05 may include a higher layer parameter SRS-ResourceSet including Rel-15/16 aperiodicSRS-ResourceTrigger (when present, aperiodicSRS-ResourceTriggerList) and slotOffset and a higher layer parameter for supporting a dynamic timing change of an AP SRS according to the reported UE capability.

In step 24-15, the UE checks an SRS request field for an AP SRS triggering state.

In step 24-20, the UE determines whether the SRS request field is set to 00 from among 00, 01, 10, and 11. When the SRS request field is set to 00, in operation 24-40, the UE determines that an AP SRS resource set is not triggered.

In step 24-25, the UE determines whether a new offset for dynamically triggering an AP SRS is received.

In step 24-30, when the new offset is not received, the UE may trigger an AP SRS resource set configured by the higher layer parameter. When the new offset is received, in step 24-35, the UE may update an AP SRS transmission timing to the new offset by considering the new offset, and may trigger the AP SRS. In this case, the higher layer parameter may be considered or may not be considered. The UE may perform an operation for dynamically determining a transmission timing such as timing adjustment, reordering, cancellation, or automatic delay according to an available resource index for the triggered AP SRS.

Figure 25:
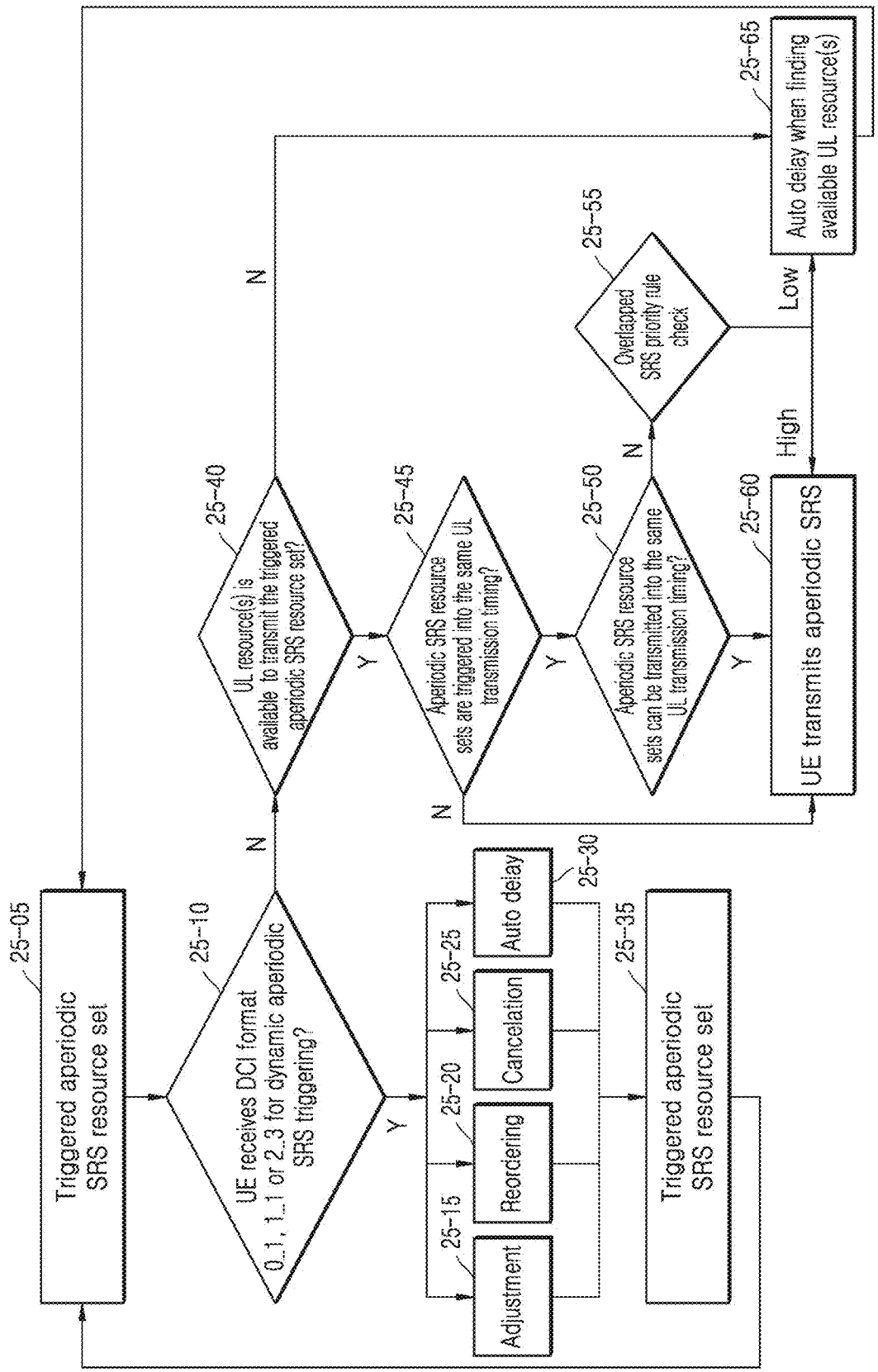
FIG. 25 is a flowchart illustrating a process by which a UE transmits an AP SRS by considering DCI for dynamically determining a transmission timing of an AP SRS resource set, according to an embodiment.

FIG. 25 is a flowchart illustrating a process by which a UE transmits an AP SRS by considering DCI for dynamically determining a transmission timing of an AP SRS resource set, according to an embodiment.

Referring to FIG. 25, before step 25-05 is performed, a UE may transmit a UE capability to a BS to report whether an AP SRS transmission timing is dynamically changeable.

When the UE is able to dynamically change an AP SRS transmission timing, in step 25-05, the UE reports whether adjustment, reordering, and cancellation described in Embodiments 2-2, 2-3, and 2-4 and automatic delay described in Embodiment 3 are supported to the BS.

In step 25-05, an AP SRS resource set is triggered.

In step 25-10, the UE determines whether a DCI format 0_1, 1_1, or 2_3 is received for dynamically triggering an AP SRS. The DCI format is merely an example, and information for dynamically triggering an AP SRS may be transmitted in another DCI format. Examples of the other DCI format may include 0_2, 1_2, and a new DCI format.

When the UE receives the DCI format for dynamically triggering an AP SRS, the UE performs adjustment, reordering, cancellation, or automatic delay on the AP SRS in one of steps 25-15 through 25-30. These operations may be performed in parallel for different AP SRSs, and a certain operation (e.g., adjustment) may be performed for one AP SRS and then another operation (cancellation) may be performed.

In step 25-35, the UE updates the triggered SRS resource set based on at least one of steps 25-15 through 25-30.

In step 25-40, when the UE does not receive the DCI for dynamically triggering an AP SRS, the UE may determine whether an UL resource for transmitting the triggered AP SRS resource set is available.

When the UL resource is available to transmit an AP SRS, in step 25-45, the UE determines whether a plurality of AP SRS resource sets are triggered to be transmitted at an UL transmission timing.

When the plurality of AP SRS resource sets are triggered to be transmitted at the same UL transmission timing, in step 25-50, the UE determines whether the plurality of AP SRS resource sets are able to be transmitted at the same UL transmission timing.

When the plurality of AP SRS resource sets are unable to be simultaneously transmitted at the same UL transmission timing, in step 25-55, the UE determines a priority rule of each AP SRS resource set.

When a single AP SRS resource set is triggered at an UL transmission timing in step 25-45, triggered AP SRS resource sets are able to be simultaneously transmitted at an UL transmission timing in step 25-50, or a priority of an AP SRS resource set is high in step 25-55, the UE transmits the AP SRS in step 25-60.

When the UE is unable to transmit the triggered AP SRS resource set through the UL resource in step 25-40 or a priority of an AP SRS resource set is low in step 25-55, the UE may perform automatic delay until an available UL resource is found in step 25-65.

Figure 26:
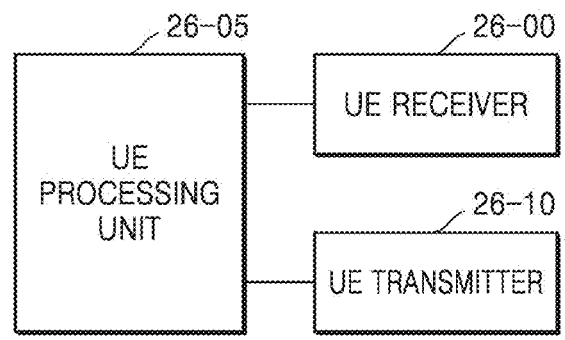
FIG. 26 illustrates a terminal, according to an embodiment.

FIG. 26 illustrates a terminal, according to an embodiment.

Referring to FIG. 26, the terminal includes a transmitter 26-10, a receiver 26-00, and a processing unit 26-05 including a memory and a processor. According to a communication method of the terminal described above, the transmitter 26-10, the receiver 26-00, and the processing unit 26-05 of the terminal may operate. However, elements of the terminal are not limited thereto. For example, the terminal may include more or fewer elements than those illustrated in FIG. 26. The transmitter 26-10, the receiver 26-00, and the processing unit 26-05 may be implemented as one chip.

The transmitter 26-10 and the receiver 26-00 may transmit and receive a signal to and from a BS. The signal may include control information and data. To this end, the transmitter 26-10 and the receiver 26-00 may include a radio frequency (RF) transmitter that up-converts and amplifies a frequency of a transmitted signal and an RF receiver that low nose amplifies a received signal and down-converts a frequency. However, they are merely examples, and elements of the transmitter 26-10 and the receiver 26-00 are not limited to the RF transmitter and the RF receiver.

The transmitter 26-10 and the receiver 26-00 may receive a signal through a wireless channel and may output a signal to the processing unit 26-05, and may transmit a signal output from the processing unit 26-05 through the wireless channel.

The processing unit 26-05 may store a program and data required for an operation of the terminal. The processing unit 26-05 may store control information or data included in a signal obtained from the terminal. The processing unit 26-05 may include a memory including a storage medium such as a read-only memory (ROM), a random-access memory (RAM), a hard disk, a compact disc-ROM (CD-ROM), or a digital versatile disc (DVD), or a combination thereof.

The processing unit 26-05 may control a series of processes so that the terminal operates according to the above-described embodiments. The processing unit 26-05 may control elements of the terminal to simultaneously receive a plurality of PDSCHs by receiving DCI including two layers.

Figure 27:
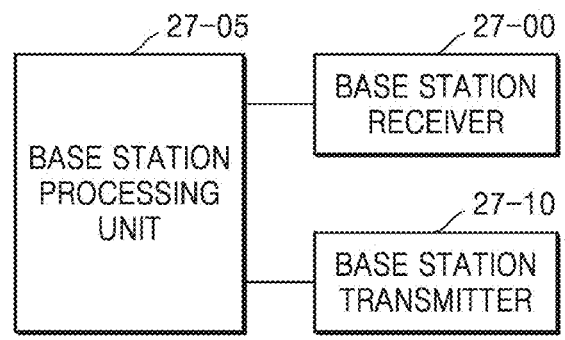
FIG. 27 illustrates a BS, according to an embodiment.

FIG. 27 illustrates a BS, according to an embodiment.

Referring to FIG. 27, the BS includes a transmitter 27-10, a receiver 27-00, and a processing unit 27-05 including a memory and a processor. According to a communication method of the BS described above, the transmitter 27-10, the receiver 27-00, and the processing unit 27-05 may operate. However, elements of the BS are not limited thereto. For example, the BS may include more or fewer elements than those illustrated in FIG. 27. The transmitter 27-10, the receiver 27-00, and the processing unit 27-05 may be implemented as one chip.

The transmitter 27-10 and the receiver 27-00 may transmit and receive a signal to and from a terminal. The signal may include control information and data. To this end, the transmitter 27-10 and the receiver 27-00 may include an RF transmitter that up-converts and amplifies a frequency of a transmitted signal, and an RF receiver that low noise amplifies a received signal and down-converts a frequency. However, they are merely examples, and elements of the transmitter 27-10 and the receiver 27-00 are not limited to the RF transmitter and the RF receiver.

The transmitter 27-10 and the receiver 27-00 may receive a signal through a wireless channel and may output a signal to the processing unit 27-05, and may transmit a signal output from the processing unit 27-05 through the wireless channel.

The processing unit 27-05 may store a program and data required for an operation of the BS. The processing unit 27-05 may store control information or data included in a signal obtained from the BS. The processing unit 27-05 may include a memory including a storage medium such as a ROM, a RAM, a hard disk, a CD-ROM, or a DVD, or a combination thereof.

The processing unit 27-05 may control a series of processes so that the BS operates according to the above-described embodiments. The processing unit 27-05 may configure DCI including allocation information for a PDSCH, and may control each element of the BS to transmit the DCI.

Figure 28:
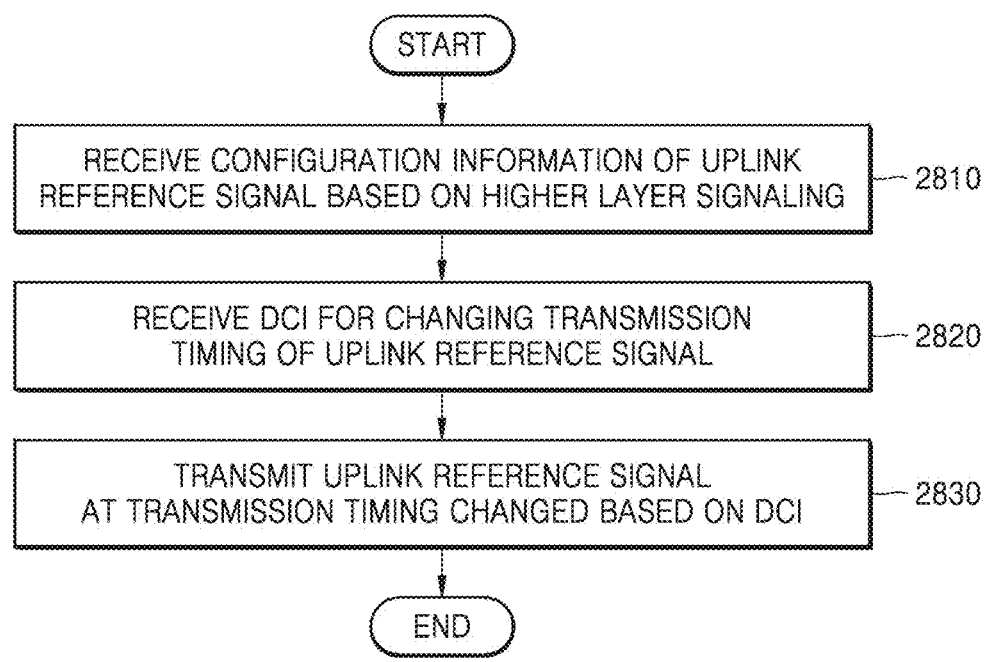
FIG. 28 is a flowchart illustrating a method of a UE, according to an embodiment.

FIG. 28 is a flowchart illustrating an operating method of a UE, according to an embodiment.

Referring to FIG. 28, in step 2810, a UE receives configuration information of a UL reference signal based on higher layer signaling. Specifically, the UE may receive, from a BS, DCI including the configuration information of the UL reference signal. The configuration information of the UL reference signal may be determined by RRC configuration information through higher layer signaling.

In step 2820, the UE receives DCI for changing a transmission timing of the UL reference signal. The UE may determine the transmission timing of the UL reference signal, based on the configuration information of the UL reference signal. When the UE receives the DCI for changing the transmission timing of the UL reference signal, the UE may change the transmission timing of the UL reference signal based on the received DCI.

The DCI may be in a DCI format 0_1, 1_1, or 2_3 and may include information for adjusting, cancelling, reordering, and automatically delaying the transmission timing. The DCI may be configured to be applied to a UE group. In this case, transmission timings of UL reference signals of the UE group may be collectively changed.

In step 2830, the UE may transmit the UL reference signal at the transmission timing changed based on the DCI. When the DCI is information indicating cancellation of the UL reference signal, the UE may determine not to transmit the UL reference signal.

Figure 29:
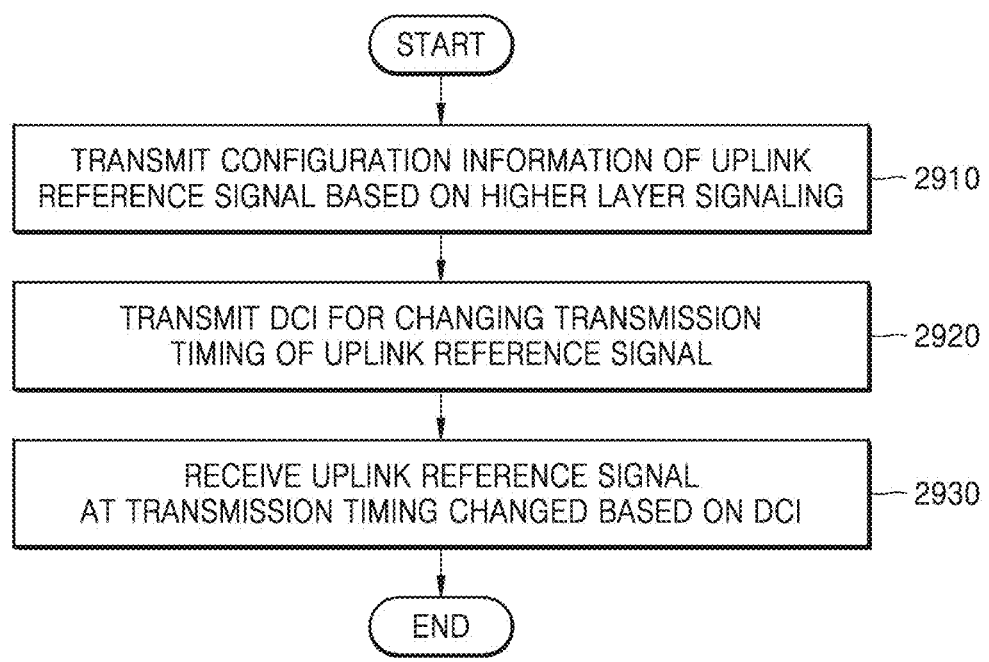
FIG. 29 is a flowchart illustrating a method of a BS, according to an embodiment.

FIG. 29 is a flowchart illustrating an operating method of a BS, according to an embodiment.

Referring to FIG. 29, in step 2910, a BS may transmit configuration information of an UL reference signal based on higher layer signaling. The BS may transmit DCI including the configuration information of the UL reference signal to a UE. The configuration information of the UL reference signal may be determined by RRC configuration information through higher layer signaling.

In step 2920, the BS transmits DCI for changing a transmission timing of the UL reference signal to the UE. Accordingly, the UE may determine the transmission timing of the UL reference signal, based on the configuration information of the UL reference signal. When the UE receives the DCI for changing the transmission timing of the UL reference signal, the UE may change the transmission timing of the UL reference signal based on the received DCI.

In this case, the DCI may be transmitted in a DCI format 0_1, 1_1, or 2_3, and may include information for adjusting, cancelling, reordering, or automatically delaying the transmission timing. The DCI may be configured to be applied to a UE group. In this case, transmission timings of UL reference signals of the UE group may be collectively changed.

In step 2930, the BS receives the UL reference signal at the transmission timing changed based on the DCI. When the DCI is information for indicating cancellation of the UL reference signal, the UL reference signal may not be received.

Embodiment 6: Operating Method for Dynamically Triggering AP SRS Using MAC CE

An NR system performs AP SRS triggering based on a code point indicated by DCI and a higher layer configuration. In this case, because an AP SRS is triggered based on a pre-configured SRS resource set, it may be difficult to flexibly trigger an SRS resource set. More flexible AP SRS triggering may be performed by using a DCI-based new triggering offset or by sharing additional information required for AP SRS triggering between a BS and a UE based on a MAC CE and triggering through DCI. A flexible AP SRS triggering method using a MAC CE will be described in Embodiment 6-1, Embodiment 6-2, and Embodiment 6-3. In detail, a flexible AP SRS triggering method using a MAC CE may be at least one of a method of activating an AP SRS resource set configured in a MAC CE-based higher layer and triggering the AP SRS resource set through DCI, a method of determining an AP SRS transmission timing by using a MAC CE-based dynamic AP SRS trigging offset, or a MAC CE and group DCI-based AP SRS triggering method. In Embodiment 6-4, a method of flexibly allocating an SRS resource by activating an SRS resource in an AP SRS resource set through a MAC CE and triggering an AP SRS will be described.

Embodiment 6-1: Dynamic AP SRS Triggering Method Using MAC CE-Based AP SRS Resource Set Activation In a generation operation, a resource set of an AP SRS may be triggered by referring to a code point indicated by DCI and higher layer configuration information. More specifically, all AP SRS resource sets configured by aperiodicSRS-ResourceTrigger that is the same as a value indicated in an SRS request field in DCI or aperiodicSRS-Resource-TriggerList including the value may be triggered. In such a general operation, when an AP SRS is triggered and only some of AP SRS resource sets configured by aperiodicSRS-ResourceTrigger that is the same value as a code point indicated in an SRS request field in DCI or aperiodicSRS-ResourceTriggerList including the same value are required at a triggering time of the AP SRS, all AP SRS resource sets indicated by the DCI, instead of only some AP SRS resource sets required for UL channel measurement, should be triggered and supported. When activation information of SRS resource sets are able to be indicated in advance by using a MAC CE, activated AP SRS resource sets may be triggered.

When the activation information of the MAC CE is configured so that the activated AP SRS resource sets include only AP SRS resources required at an AP SRS triggering time, more flexible SRS triggering may be performed than a method of transmitting all AP SRS resources configured by DCI. A BS may notify, to a UE, activation information of AP SRS resource sets in an SRS resource set list of a higher layer parameter SRS-config through a MAC CE. At a point of time when AP SRS triggering is performed, the UE may expect that a code point for AP SRS triggering is indicated by DCI including an SRS request field. When the code point for AP SRS triggering is indicated by the DCI, the UE may trigger SRS resource sets whose aperiodicSRS-ResourceTrigger is the same as the code point (SRS request field) indicated by the DCI or including the same value as the code point indicated by the DCI in aperiodicSRS-ResourceTriggerList from among AP SRS resource set(s) activated by the MAC CE.

Embodiment 6-1 may be combined with other embodiments of the disclosure. For example, the BS may combine Embodiment 6-1 with a method of increasing the number of SRS resource sets configured in a higher layer as described in Embodiment 1, to indicate activation information of SRS resource sets of various configurations through a MAC CE and support more various trigging combinations for the UE. However, the disclosure is not limited thereto, and Embodiment 6-1 may be combined with other embodiments to dynamically trigger an AP SRS.

Figure 30:
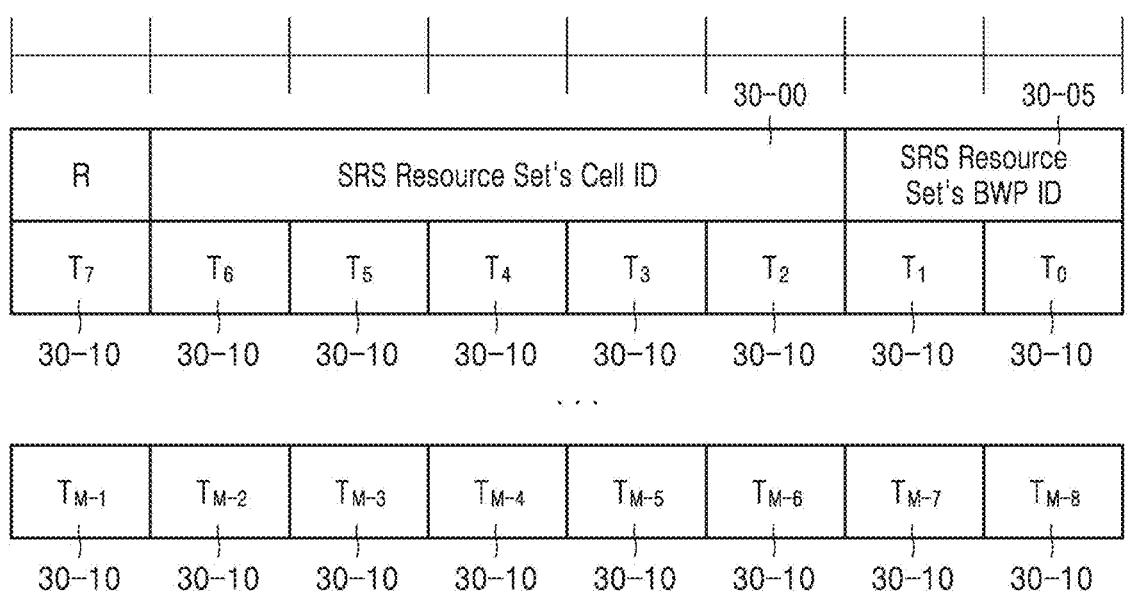
FIG. 30 illustrates a MAC CE for indicating activation of an AP SRS resource set, according to an embodiment.

FIG. 30 illustrates a MAC CE for indicating activation of an AP SRS resource set, according to an embodiment.

Referring to FIG. 30, a MAC CE for indicating activation of an AP SRS resource set may include the following fields.

SRS Resource Set's Cell ID 30-00: This field indicates an identity of a serving cell including an indicated AP SRS resource set.

SRS Resource Set's BWP ID 30-05: This field indicates a UL BWP including an AP SRS resource set indicated by a code point of a DCI bandwidth part indicator field.

$T_i$ 30-10: This field indicates an activation/deactivation state of an AP SRS resource set i SRS Resource Set$_i$ $T_i$ indicates whether an AP SRS resource set is activated, and only SRS resource sets of AP SRs from among all SRS resource sets configured in a higher layer may be mapped to $T_i$. For example, when a total of 16 SRS resource sets are configured in a higher layer and an SRS resource set whose srs-ResourceSetId is 1, 3, 5, or 11 is configured as an AP SRS resource set, $T_0$ indicates an activation state of an SRS resource set whose srs-ResourceSetId is 1, $T_1$ indicates an activation state of an SRS resource set whose srs-ResourceSetId is 3, $T_2$ indicates an activation state of an SRS resource set whose srs-ResourceSetId is 5, and $T_3$ indicates an activation state of an SRS resource set whose srs-ResourceSetId is 11. Alternatively, all SRS resource sets, instead of only SRS resource sets of AP SRSs, may be mapped and an activation state of an SRS resource set whose srs-ResourceSetId is i may be indicated by $T_i$. In order to indicate activation of an AP SRS resource set associated with $T_i$, a $T_i$ field may be set to 1. In order to indicate deactivation of an AP SRS resource set associated with $T_i$, a $T_i$ field may be set to 0.

Embodiment 6-2: MAC CE-Based Flexible Offset Configuration Method and Dynamic AP SRS Triggering Method For dynamic AP SRS triggering, a BS may configure a flexible offset for dynamic AP SRS triggering through a MAC CE in a UE. The flexible offset for dynamic AP SRS triggering through the MAC CE and a code point may be mapped. The flexible offset may be determined according to the code point indicated by DCI, and a transmission timing of an AP SRS may be determined along with AP SRS triggering information configured in a higher layer. In this case, additional DCI for determining the flexible offset may be required in addition to an existing SRS request field for triggering an AP SRS. The BS may notify the MAC CE including flexible offset information to the UE, and may transmit the code point for indicating the flexible offset and the SRS request field to the UE through the DCI at an AP SRS triggering time. The UE may select an AP SRS resource set according to the SRS request field indicated by the DCI and may determine the flexible offset in the MAC CE by referring to the code point of the flexible offset. The UE may determine a transmission timing of a triggered AP SRS by using the flexible offset configured through the MAC CE and configuration information of the selected AP SRS resource set.

FIG. 31 illustrates a MAC CE for indicating a flexible offset of an AP SRS resource set, according to an embodiment.

Referring to FIG. 31, a MAC CE for indicating a flexible offset of an AP SRS resource set may be configured to include the following fields.

SRS Resource Set's Cell ID 31-00: This field indicates an identity of a serving cell including an indicated AP SRS resource set.

SRS Resource Set's BWP ID 31-05: This field indicates a UL BWP including an AP SRS resource set indicated by a code point of a DCI bandwidth part indicator field.

$T_i$ 31-10: This field indicates an activation/deactivation state of a flexible offset. A flexible offset and an operation previously defined between a BS and a UE may be defined as in 31-15, and when the UE receives DCI corresponding to $T_i$, the UE may perform a defined operation according to the code point. A code point $T_0$ indicates cancellation 31-20, $T_1 \sim T_{M-1}$ indicate new triggering 31-25, $T_M \sim T_{2M-2}$ indicate adjustment 31-30, and $T_{2M-1}$ indicates AP SRS triggering in a higher layer configuration 31-35. In order to indicate activation of a flexible offset associated with $T_i$, $T_i$ may be set to 1. In order to indicate deactivation of a flexible offset associated with $T_i$, $T_i$ may be set to 0.

A code point of FIG. 31 is merely an example, and the number of code points constituting the operations 31-20 through 31-35 for dynamic AP SRS triggering may be defined in any of various combinations. When the number of flexible offsets activated through a MAC CE is N, additional DCI bits for indicating a flexible offset may be set to $\lceil \log_2 N \rceil$.

Alternatively, in FIG. 31, instead of defining a flexible offset and an operation previously defined between a BS and a UE, a flexible offset value and an operation for an offset may be indicated through a MAC CE.

FIG. 32 illustrates a MAC CE for indicating a flexible offset value and an operation for an offset.

Referring to FIG. 32, a MAC CE indicating a field $T_i$ 32-10 for indicating activation/deactivation of a flexible offset and a flexible offset value 32-15 associated with the field $T_i$ may be used to determine a transmission timing of a triggered AP SRS. When a BS activates all 2M code points indicated by the MAC CE, the field $T_i$ 32-10 may be set to Reserve (R), or may be omitted by being included in a flexible offset i field (32-15). A code point of FIG. 32 is merely an example, and the number of code points constituting operations 32-25 through 32-40 for dynamic AP SRS triggering may be defined in any of various combinations. When the number of activated flexible offsets is N like in FIG. 31, additional DCI bits for indicating a flexible offset may be set to $\lceil \log_2 N \rceil$, and when 2M code points are all activated and supported, additional DCI bits may be set to $\lceil \log_2 2M \rceil$.

Embodiment 6-3: Group-Based Dynamic AP SRS Triggering Method Using MAC CE

As in a method defined in Embodiment 5, when group DCI-based AP SRS triggering using a DCI format 2_3 is performed, a MAC CE may be used. In this case, a group-based dynamic AP SRS triggering method using the DCI format 23 may be defined according to the MAC CE indicated to trigger an AP SRS.

As in a method defined in Embodiment 6-1, a UE may receive a MAC CE from a BS and may activate AP SRS resource sets configured in a higher layer. The UE may receive a DCI format 2_3 from the BS, and may compare an SRS request field included in one or more blocks configured for the UE from among blocks of the DCI format 2_3 with aperiodicSRS-ResourceTrigger or aperiodicSRS-ResourceTriggerList of aperiodic SRS resource sets activated by a MAC CE to trigger an AP SRS. The activated AP SRS resource sets whose aperiodicSRS-ResourceTrigger is set to the same value as the SRS request field of the blocks of the DCI format 2_3 configured for the UE or including the same value as the SRS request field in aperiodicSRS-ResourceTriggerList may be triggered. In this case, the BS may configure and support the same MAC CE for a plurality of UEs or a different MAC CE for each UE.

As in a method defined in Embodiment 6-2, when a flexible offset is configured through a MAC CE, a value indicating the flexible offset for a block of a DCI format 2_3 may be additionally configured. The UE may receive a MAC CE from the BS and may activate the flexible offset, or may obtain flexible offset information. The UE may receive a DCI format 2_3 from the BS, and may compare an SRS request field included in one or more blocks configured for the UE from among blocks of the DCI format 2_3 with aperiodicSRS-ResourceTriger or aperiodicSRS-ResourceTriggerList to trigger an AP SRS. AP SRS resource sets whose aperiodicSRS-ResourceTrigger is set to the same value as the SRS request field of the blocks of the DCI format 2_3 configured for the UE or including the same value as the SRS request field in aperiodicSRS-ResourceTriggerList may be triggered. A flexible offset may be determined according to a value indicating the flexible offset included in the blocks of the DCI format 2_3 and a MAC CE, and a transmission timing of a triggered AP SRS resource set may be determined by using the flexible offset. In this case, the BS may configure and support the same MAC CE for a plurality of UEs or a different MAC CE for each UE.

Embodiment 6-4: AP SRS Triggering Method Using MAC CE-Based AP SRS Resource Activation In Embodiment 6-1, dynamic AP SRS triggering is performed by indicating activation information of an AP SRS resource set through a MAC CE. In Embodiment 6-4, a method by which, when whether an SRS resource configured in an AP SRS resource set is activated is indicated through a MAC CE and the AP SRS resource set is triggered, activated SRS resources are transmitted will be described. When an SRS resource set and an SRS resource are configured in a higher layer, a UE may trigger all SRS resources in an SRS resource set configured according to an SRS request field indicated by DCI. In Rel-15/16, SRS-ResourceId included in 'srs-ResourceList' in a higher layer parameter SRS resource set determines an SRS resource in a corresponding SRS resource set. Even when only some of all SRS resources in an SRS resource set are required, all SRS resources in the SRS resource set may be triggered. According to an embodiment of the disclosure, by indicating activation states of SRS resources configured for each AP SRS resource set ID through a MAC CE, an SRS resource may be configured to be dynamically triggered in triggering an AP SRS.

FIG. 33 illustrates a MAC CE for indicating activation of an SRS resource in an AP SRS resource set, according to an embodiment.

Referring to FIG. 33, a MAC CE for indicating activation of an SRS resource in an AP SRS resource set may be configured to include the following fields.

SRS Resource Set's Cell ID 33-00: This field indicates an identity of a serving cell including an indicated AP SRS resource set.

SRS Resource Set's BWP ID 33-05: This field indicates a UL BWP including an AP SRS resource set indicated by a code point of a DCI bandwidth part indicator field.

AP SRS ResourceSet ID$_i$ 33-10: This field indicates an ID of an AP SRS resource set.

$T_{i,l}$ 33-15: This field indicates an activation/deactivation state of an SRS resource in an AP SRS resource set i SRS Resource Set$_i$. When up to L SRS resources may be configured in an AP SRS resource set, $T_{i,l}$ may be set to 1 to indicate an activation state of an lth SRS resource of the AP SRS resource set i. $T_{i,l}$ may be set to 0 to indicate a deactivation state of the $l^{th}$ SRS resource of the AP SRS resource set i.

Figure 34:
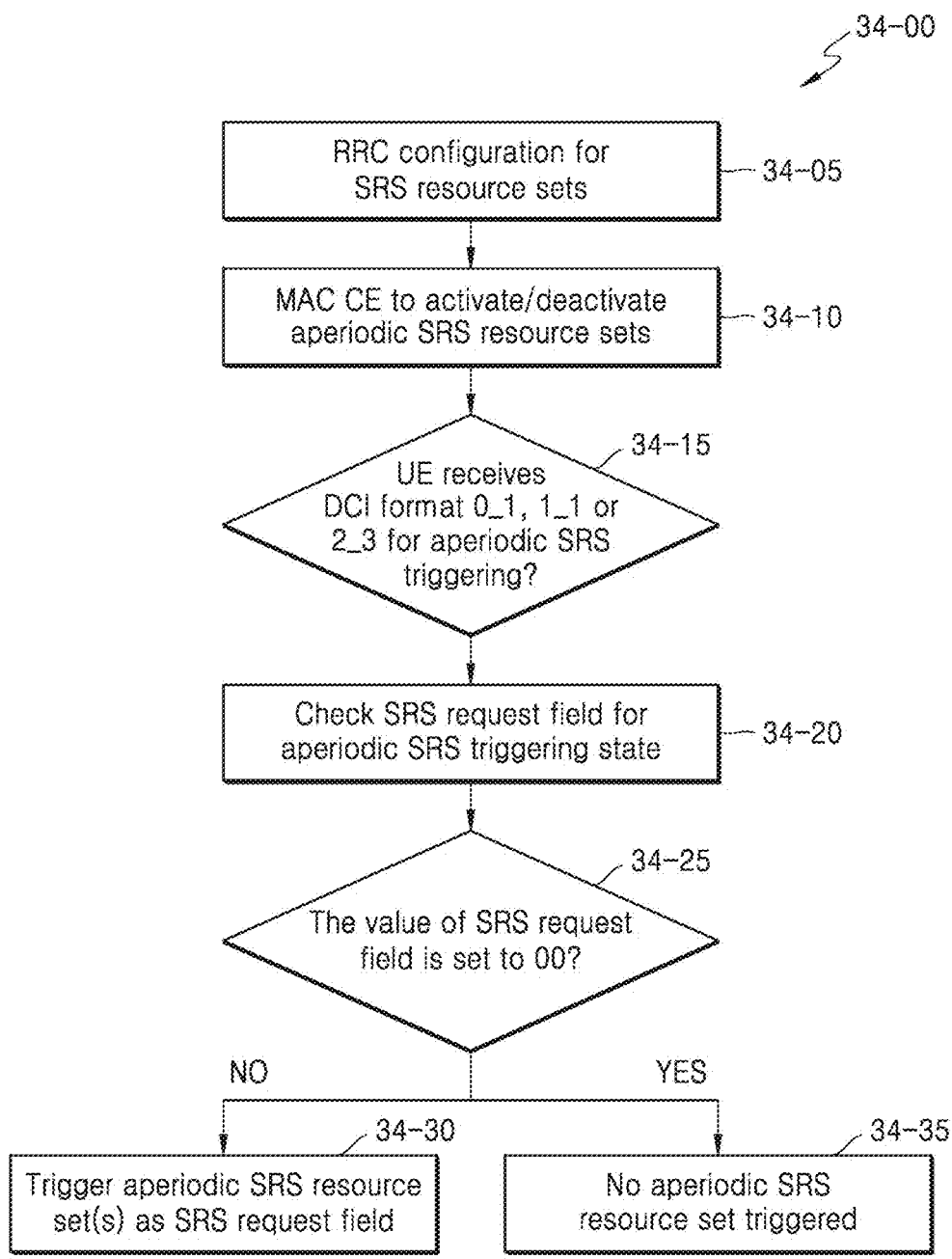
FIG. 34 is a flowchart illustrating an AP SRS triggering process, according to an embodiment.

FIG. 34 is a flowchart illustrating an AP SRS triggering process, according to an embodiment. Specifically, FIG. 34 is a flowchart illustrating a dynamic AP SRS triggering process based on a higher layer parameter, a MAC CE indicating an activation state of an AP SRS resource set, and DCI. A UE may perform dynamic AP SRS triggering based on a MAC CE and DCI as in the above embodiments.

Referring to FIG. 34, in steps 34-05, 34-10, and 34-15, the UE may receive a DCI format 0_1, 1_1, or 2_3 for triggering an AP SRS, based on RRC configuration information of an SRS resource set and MAC CE information indicating an activation state of an AP SRS resource set.

In step 34-20, the UE checks an SRS request field for an AP SRS triggering state.

In step 34-25, the UE determines whether the SRS request field is set to 00 from among 00, 01, 10, and 11. When the SRS request field is set to 00, in step 34-35, the UE may determine that an AP SRS resource set is not triggered.

In step 34-30, the UE may trigger AP SRS resource sets in which aperiodicSRS-ResourceTrigger is set to the same value as the SRS resource field, from among activated AP SRS resource sets indicated by the MAC CE.

Figure 35:
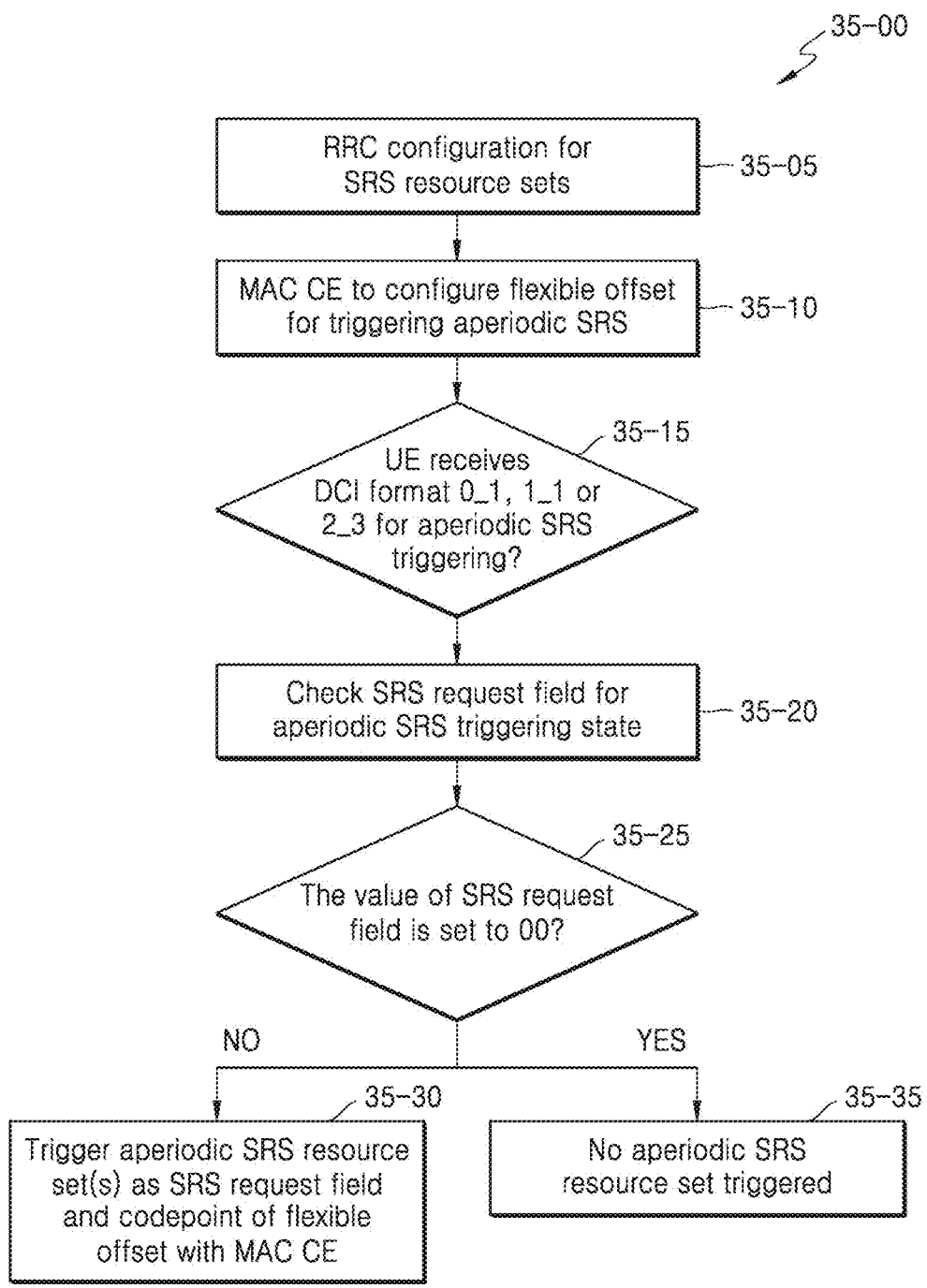
FIG. 35 is a flowchart illustrating an AP SRS triggering process, according to an embodiment.

FIG. 35 is a flowchart illustrating an AP SRS triggering process, according to an embodiment. Specifically, FIG. 35 is a flowchart illustrating a dynamic AP SRS triggering process based on a higher layer parameter, a MAC CE for configuring a flexible offset for AP SRS triggering, and DCI. A UE may perform dynamic AP SRS triggering based on a MAC CE and DCI as in the above-described embodiments.

Referring to FIG. 35, in steps 35-05, 35-10, and 35-15, the UE may receive a DCI format 0_1, 1_1, or 2_3 for AP SRS triggering, based on RRC configuration information of an SRS resource set and MAC CE information for configuring a flexible offset for AP SRS triggering.

In step 35-20, the UE checks an SRS request field for an AP SRS triggering state.

In step 35-25, the UE determines whether the SRS request field is set to 00 from among 00, 01, 10, and 11. When the SRS request field is set to 00, in step 35-35, the UE determines that an AP SRS resource set is not triggered.

In step 35-30, the UE selects AP SRS resource sets whose aperiodicSRS-ResourceTrigger is set to the same value as the SRS resource field or including the same value as the SRS request field in aperiodicSRS-ResourceTriggerList, from among AP SRS resource sets. The UE may determine a flexible offset based on the MAC CE, a code point of the flexible offset indicated by the DCI, and configuration information of the selected AP SRS resource sets, and may trigger the AP SRS resource sets by using the determined flexible offset.

Embodiment 7: Method of Changing slotOffset Value of AP SRS Resource Set Based on MAC CE A BS may change a slotOffset value configured in a UE through a higher layer by using a MAC CE. The BS may transmit the MAC CE for activating a slotOffset change to the UE. The UE may receive the MAC CE, may check a slotOffset value in the MAC CE, and may change the configured slotOffset value to the slotOffset value in the MAC CE. The UE may determine an AP SRS transmission time by using the slotOffset value in the MAC CE from 3 slots after a MAC CE reception time. The MAC CE may include SRS-ResourceSetId for changing the slotOffset value configured through the higher layer and the slotOffset value to which the configured slotOffset value is to be changed.

Figure 36:
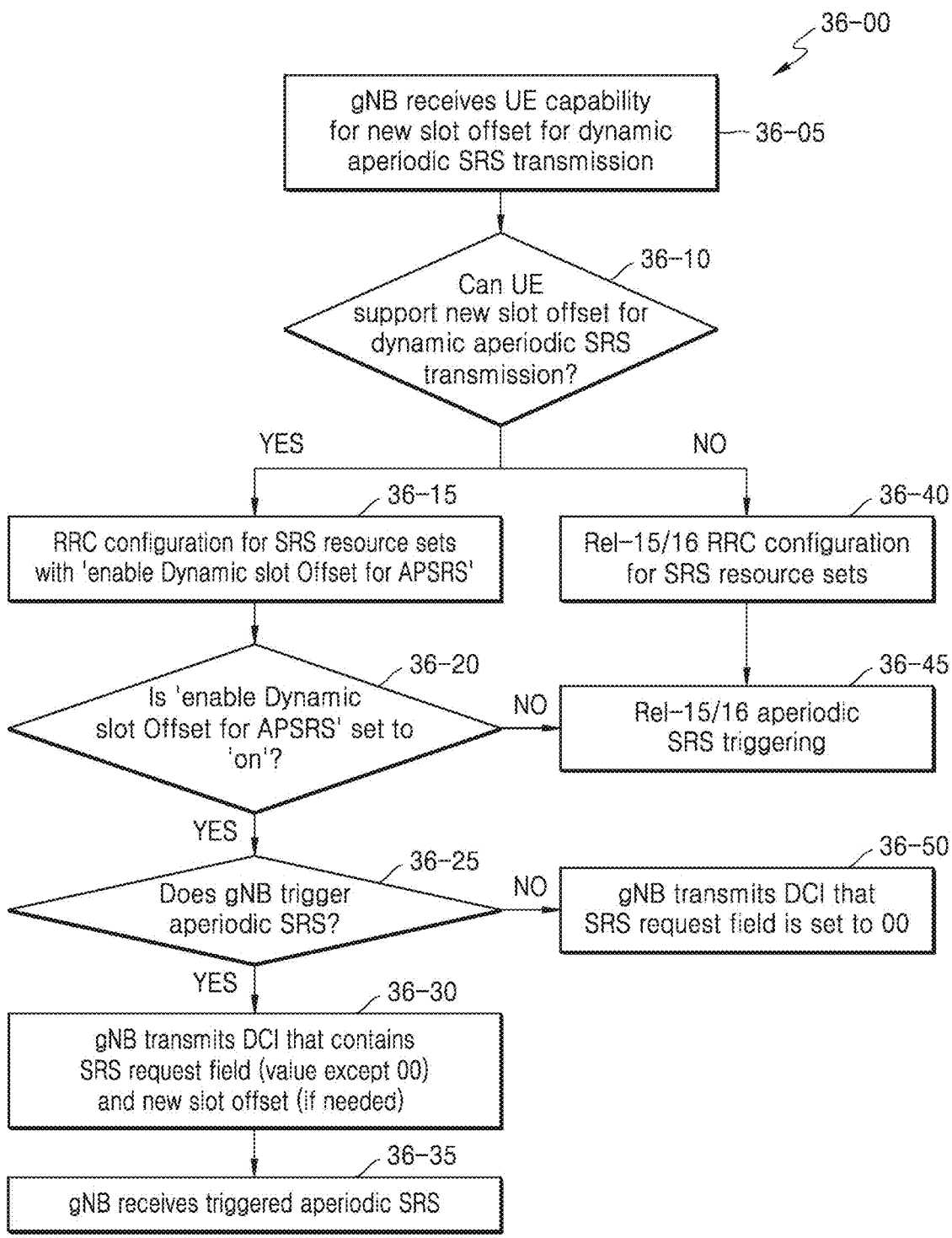
FIG. 36 is a flowchart illustrating a process by which a BS indicates to trigger an AP SRS and dynamically change a transmission timing by considering a new slot offset for dynamically determining a timing of an AP SRS based on a higher layer parameter and DCI, according to an embodiment.

FIG. 36 is a flowchart illustrating a process by which a BS indicates to trigger an AP SRS and dynamically changes a transmission timing by considering a new slot offset for dynamically determining a timing of an AP SRS based on a higher layer parameter and DCI, according to an embodiment.

As in the above-described embodiments, a BS may indicate through DCI an SRS request field for AP SRS triggering and a new slot offset for dynamically determining a transmission timing of an AP SRS to trigger an AP SRS and may receive a triggered AP SRS from a UE.

Referring to FIG. 36, in step 36-05, a BS may receive a UE capability for reporting whether a transmission timing of an AP SRS is dynamically changeable from a UE.

In step 36-10, the BS determines whether the UE is able to dynamically change the transmission timing of the AP SRS. When the UE is unable to dynamically change the transmission timing of the AP SRS, in steps 36-40 and 36-45, the BS configures a higher layer parameter for an SRS resource set in the UE as in Rel-15/16, and performs AP SRS triggering as in Rel-15/16.

In step 36-40, the higher layer parameter may include SRS-ResourceSet, and thus aperiodicSRS-ResourceTrigger (aperiodicSRS-ResourceTriggerList, when present) and slotOffset may be included in SRS-ResourceSet.

When the UE is able to dynamically change the transmission timing of the AP SRS, in step 36-15, a higher layer parameter may be configured. A higher layer parameter for an SRS resource set defined in Rel-15/16 (including higher layer parameter SRS-ResourceSet) and a higher layer parameter for dynamically changing a transmission timing of an AP SRS are configured. The BS may set the higher layer parameter for dynamically changing the transmission timing of the AP SRS, e.g., 'enbleDynamicslotOffsetforAPSRS', to 'on' or 'off', or may not configure the higher layer parameter for dynamically changing the transmission timing of the AP SRS.

In step 36-20, the BS determines an AP SRS triggering method by determining whether the higher layer parameter, for example, 'enbleDynamicslotOffsetforAPSRS', is set to 'on'.

When the higher layer parameter 'enbleDynamicslotOffsetforAPSRS' is not set to 'on', in step 36-45, the BS performs AP SRS triggering on the UE as in Rel-15/16.

When the higher layer parameter 'enbleDynamicslotOffsetforAPSRS' is set 'on', in step 36-25, the BS determines whether AP SRS triggering is performed.

When the BS does not trigger the AP SRS, in step 36-50, the BS transmits DCI including an SRS request field that is set to 00 to the UE.

When the BS triggers the AP SRS, in step 36-30, the BS transmits DCI including an SRS request field that is not set to 00 to the UE. When the BS dynamically determines a transmission timing of the AP SRS, the BS may add a new slot offset for dynamically determining the transmission timing of the AP SRS to the DCI and may transmit the DCI to the UE.

In step 36-35, the BS may receive an AP SRS transmitted by the UE at the determined AP SRS transmission timing.

Figure 37:
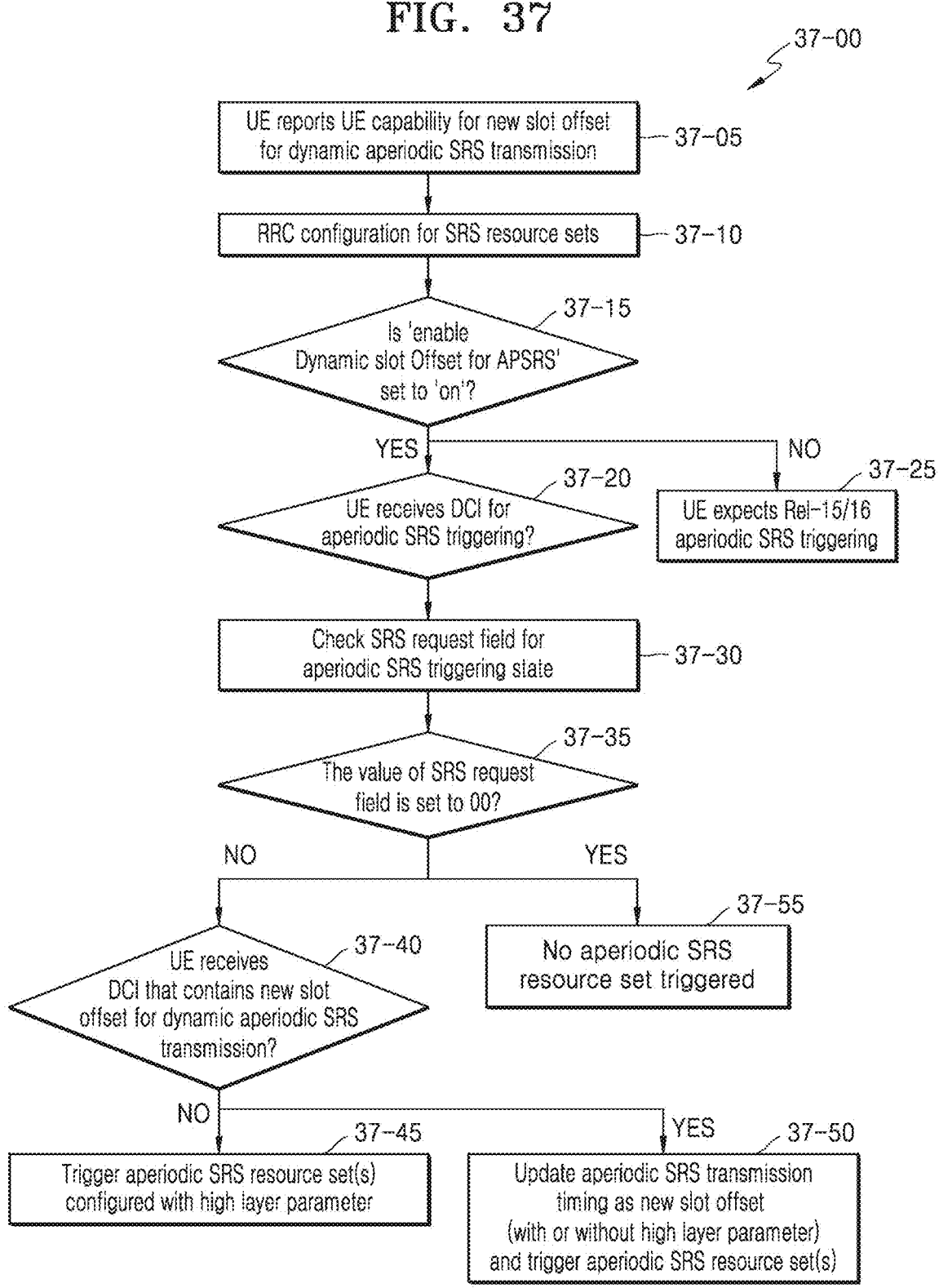
FIG. 37 is a flowchart illustrating a process by which a UE determines a transmission timing of an AP SRS to be transmitted by also considering together a slot offset configured by a higher layer parameter and a new slot offset for dynamically determining a timing of an AP SRS based on DCI, according to an embodiment.

FIG. 37 is a flowchart illustrating a process by which a UE determines a transmission timing of an AP SRS to be transmitted by considering together a slot offset configured by a higher layer parameter and a new slot offset for dynamically determining a timing of an AP SRS based on DCI, according to an embodiment.

As in the above-described embodiments, a UE may dynamically determine a transmission timing of a triggered AP SRS based on DCI.

Referring to FIG. 37, in step 37-05, a UE transmits a UE capability for reporting whether an AP SRS transmission timing is dynamically changeable to a BS.

In step 37-10, the UE receives an RRC configuration of an SRS resource set from the BS. A configured higher layer parameter may include SRS-ResourceSet, and aperiodicSRS-ResourceTrigger for performing DCI-based triggering (aperiodicSRS-ResourceTriggerList when present) and slotOffset for transmission timing determination may be included in SRS-ResourceSet. In addition, a higher layer parameter (e.g., 'enableDynamicslotOffsetforAPSRS' configuration information) for supporting a dynamic transmission timing change may be received according to whether the AP SRS transmission timing is dynamically changeable.

In step 37-15, when the higher layer parameter, e.g., 'enableDynamicslotOffsetforAPSRS', received from the BS is set to 'on', the UE dynamically receives an AP SRS transmission timing. When the higher layer parameter, for example, 'enableDynamicslotOffsetforAPSRS', is not configured or is set to 'off', in step 37-25, the UE expects that AP SRS triggering and transmission timing determination are performed in the same manner as in Rel-15/16, i.e., the transmission timing of the a periodic SRS is determined by using only a slot offset configured in a higher layer.

In step 37-20, the UE receives DCI for triggering the AP SRS.

In step 37-30, the UE checks an SRS request field for an AP SRS triggering state.

In step 37-35, the UE determines whether the SRS request field is set to 00 from among 00, 01, 10, and 11.

In step 37-55, when the SRS request field is set to 00, the UE determines that an AP SRS resource set is not triggered.

In step 37-40, the UE determines whether a new offset for dynamically determining the transmission timing of the AP SRS is received through DCI. When the new offset is not received through the DCI, in step 37-45, the UE triggers the AP SRS resource set by using only the slot offset configured in the higher layer parameter.

In step 37-50, when the new offset is received through the DCI, the UE triggers the AP SRS by changing the AP SRS transmission timing to the new offset indicated by the DCI. In this case, the slot offset configured in the higher layer parameter may be considered or may not be considered.

Figure 38:
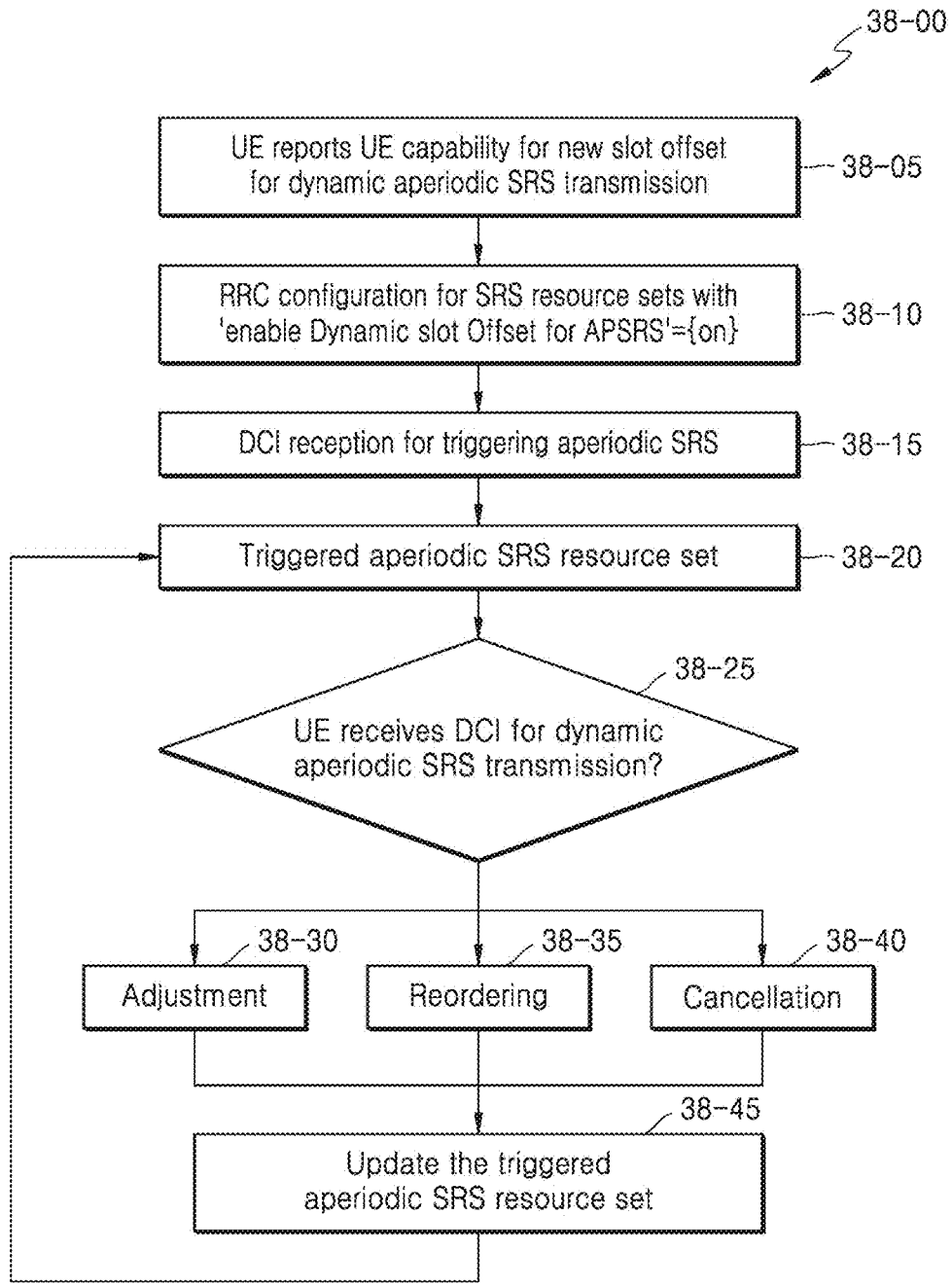
FIG. 38 is a flowchart illustrating a process by which a UE determines a transmission timing of a triggered AP SRS and transmits an AP SRS by considering DCI for dynamically determining a transmission timing of an AP SRS, according to an embodiment.

FIG. 38 is a flowchart illustrating a process by which a UE determines a transmission timing of a triggered AP SRS and transmits an AP SRS by considering DCI for dynamically determining a transmission timing of an AP SRS, according to an embodiment.

Referring to FIG. 38, in step 38-05, a UE transmits a UE capability for reporting whether an AP SRS transmission timing is dynamically changeable to a BS. When the AP SRS transmission timing is dynamically changeable, the UE may report whether adjustment, reordering, and cancellation described in Embodiments 2-2, 2-3, and 2-4 are supported to the BS.

In step 38-10, the UE receives an RRC configuration of an SRS resource set from the BS according to the UE capability for reporting whether the AP SRS transmission timing is dynamically changeable. In order to dynamically change and support the AP SRS transmission timing, a higher layer parameter, e.g., 'enableDynamicslotOffsetforAPSRS', may be set to 'on'.

In steps 38-15 and 38-20, the UE receives DCI including an SRS request field and may determine an AP SRS resource set to be transmitted. The UE may differently determine the AP SRS transmission timing according to whether a new slot offset for dynamically changing the AP SRS transmission timing is included in the DCI received in step 38-15. When the new slot offset for dynamically changing the AP SRS transmission timing is not included in the DCI received in step 38-15, a transmission timing of an AP SRS is determined according to a higher layer parameter slot offset (slotOffset) of a triggered AP SRS resource set. When the new slot offset for dynamically changing the AP SRS transmission timing is included in the DCI received in step 38-15, a transmission timing of a triggered AP SRS may be determined according to the new slot offset indicated through the DCI. A slot offset configured in a higher layer parameter may be considered or may not be considered.

In step 38-25, the UE determines whether a DCI including an offset for dynamically changing the transmission timing of the triggered AP SRS is received. A field for the new offset included in the DCI received in step 38-25 may be differently configured according to an operation (adjustment, reordering, or cancellation) indicated by the DCI to determine a transmission timing and RRC information configured in step 38-10. When the UE is RRC-configured to support adjustment and cancellation according to the reported UE capability and the BS transmits the DCI to cancel the triggered AP SRS, the field for the new offset in the DCI may include a main operation field (1 bit) for indicating cancellation from among adjustment and cancellation, a detailed operation field (2 bits) for indicating at least one cancellation operation from among three cancellation operations described in Embodiment 2-4, and an offset field (5 bits, when cancellation of up to 32 slots is possible) for indicating a slot to be cancelled. When the UE is able to support only cancellation from among adjustment, reordering, and cancellation, the main operation field may be set to 0 bit.

In steps 38-30 through 38-40, the UE may select and perform one of adjustment, reordering, and cancellation according to the RRC information configured in step 38-10 and the field for the new offset in the DCI received in operation 38-25.

In step 38-45, the UE may update a transmission timing of the triggered AP SRS based on at least one of steps 38-30 through 38-40.

Embodiment 8: Method of Transmitting or Cancelling Triggered AP SRS According to Slot Configuration In Embodiment 8, a method of transmitting or cancelling a triggered AP SRS according to a slot configuration will be described. A BS may transmit DCI for triggering an AP SRS in a slot capable of DL transmission according to a slot configuration. A UE may transmit an AP SRS in a slot capable of AP SRS transmission according to a slot configuration and an AP SRS transmission procedure described in the above embodiments of the disclosure. In this case, a transmittable slot may be defined through the following methods:

1) From among slots configured in a higher layer parameter tdd-UL-DL-ConfigurationCommon or tdd-UL-DL-ConfigurationCommon and tdd-UL-DL-ConfigurationDedicated, a slot that is configured as an UL or a slot in which some symbols having a length enough to transmit an AP SRS are configured as an UL may be defined as a transmittable slot. The AP SRS may be transmitted through the slot configured as the UL or the symbols configured as the UL in the slot.

2) From among slots configured in a higher layer parameter tdd-UL-DL-ConfigurationCommon or tdd-UL-DL-ConfigurationCommon and tdd-UL-DL-ConfigurationDedicated, a slot that is configured as an UL or 'flexible' or a slot in which some symbols having a length enough to transmit an AP SRS are configured as an UL or 'flexible' may be defined as a transmittable slot. The AP SRS may be transmitted through the slot configured as the UL or 'flexible' or the symbols configured as the UL or 'flexible' in the slot.

In NR Release 15/16, when a higher layer parameter SlotFormatIndicator is configured, a UE may change a slot configuration of slot(s) configured as 'flexible' by receiving a DCI format 2_0. However, the UE does not expect to receive a DCI format 2_0 for changing a symbol set in a slot to a DL and to receive a DCI format for indicating SRS transmission in a symbol set in a slot. That is, in NR Release 15/16, when the UE receives DCI for triggering an AP SRS for a symbol of a slot, the UE does not expect to receive a DCI format 2_0 for changing the symbol of the slot to a DL. When a UE supports flexible AP SRS triggering, a BS may use a DCI format 2_0 to cancel a pre-triggered AP SRS for the purpose of efficient resource management and UE power consumption management by easing a restriction on a slot change using the DCI format 2_0. In more detail, a method of cancelling a triggered SRS through a slot configuration change may be performed according to the following procedure.

A BS may receive, from a UE, a UE capability for reporting that an AP SRS transmission timing is dynamically changeable. The BS may set a higher layer parameter (e.g., 'enableDynamicslotOffsetforAPSRS' configuration information) for supporting a dynamic transmission timing change to 'enable' according to the UE capability reported by the UE, and may configure a higher layer parameter for SRS transmission in the UE. The BS transmits DCI for triggering an AP SRS to the UE, and the UE determines a transmission timing of the AP SRS based on the received DCI and an AP SRS triggering method. After AP SRS triggering, when the UE receives a DCI format 2_0 through another DL slot or a 'flexible' slot, the UE determines whether a slot a corresponding to a transmission timing of a triggered AP SRS is changed to a DL. When all triggered AP SRSs are transmitted through a slot configured as an UL or symbols configured as an UL in a slot, although the UE receives the DCI format 2_0 and changes a slot that is 'flexible' to a DL, the UE may transmit the AP SRS according to the determined timing. When the AP SRS is triggered to be transmitted in a slot configured as 'flexible' or symbols configured as 'flexible' in a slot and a slot configuration of the slot or the symbols in the slot is changed to a DL due to the DCI format 2_0, the UE may cancel the triggered AP SRS through the following methods:

1) All triggered AP SRS to be transmitted after the DCI format 2_0 is received are cancelled.

2) Only a triggered AP SRS that is unable to be transmitted because the slot configuration is changed to the DL after the DCI format 2_0 is received is cancelled.

Figure 39:
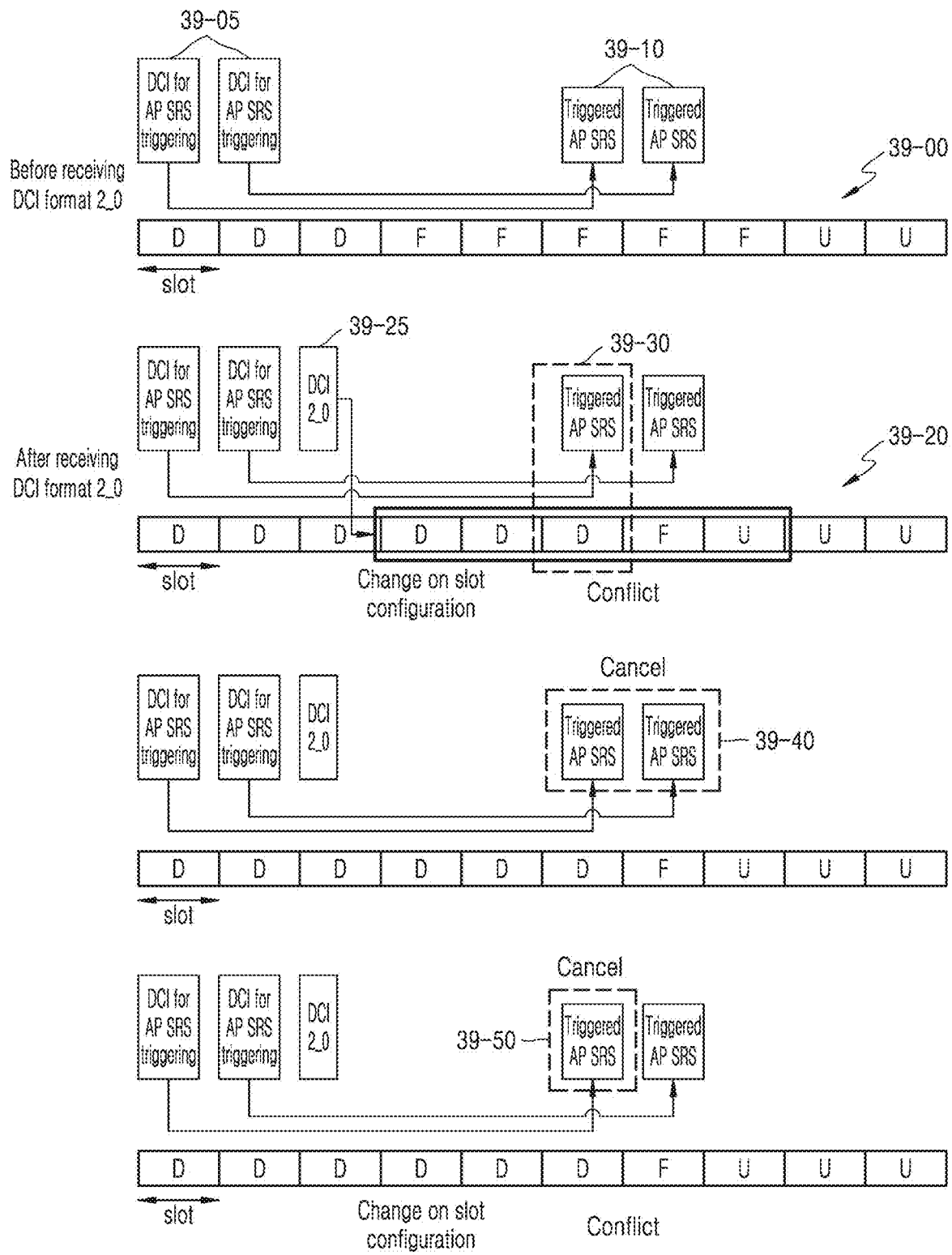
FIG. 39 illustrates a method of triggering an AP SRS based on a slot configuration and cancelling triggering, according to an embodiment.

FIG. 39 illustrates a method of triggering an AP SRS according to a slot configuration and cancelling triggering, according to an embodiment.

Referring to FIG. 39, at 39-00, a UE may provide a slot configuration according to higher layer parameters ConfigurationCommon and tdd-UL-DL-ConfigurationDedicated.

In 39-05, the UE may receive DCI including an SRS request for triggering an AP SRS from a BS, and, in 39-10, may determine a transmission timing of the AP SRS.

In 39-25, the UE may receive a DCI format 2_0 including an SFI of a slot configured as 'flexible' through a third DL slot. The UE may change a slot configuration according to the received DCI format 2_0 in 39-20.

In 39-30, the UE may know that a 'flexible' slot in a sixth slot is changed to a DL slot and conflict occurs between AP SRS transmission and a slot format. Upon receiving the DCI format 2_0, the UE may perform a method of cancelling the AP SRS in 39-40 or 39-50.

At 39-40, when the UE receives the DCI format 2_0 and conflict occurs between the AP SRS transmission and the slot format as in 39-30 due to the changed slot format, transmission of all triggered AP SRSs may be cancelled.

Alternatively, at 39-50, the UE may cancel transmission only for the AP SRS with the conflict, and may transmit other triggered AP SRSs.

The above-described embodiments of the disclosure and the drawings have been provided to easily describe the disclosure and to help with the understanding of the disclosure, and are not intended to limit the scope of the disclosure. One of ordinary skill in the art understands that various modifications may be made based on the technical spirit of the disclosure. The embodiments of the disclosure may be used in combination when necessary. For example, parts of Embodiment 1 and Embodiment 2 of the disclosure may be combined with each other.

The one or more embodiments of the disclosure provide a method of transmitting and receiving an UL reference signal for efficient UL or DL transmission and reception in a mobile communication system.

In detailed embodiments of the disclosure, components included in the disclosure have been expressed as singular or plural according to the detailed embodiments of the disclosure. However, singular or plural expressions have been selected properly for a condition provided for convenience of description, and the disclosure is not limited to singular or plural components. Components expressed as plural may be configured as a single component, or a component expressed as singular may be configured as plural components.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method performed by a terminal in a wireless communication system, the method comprising:
   receiving configuration information associated with a sounding reference signal (SRS) through higher layer signaling;
   receiving, in a slot n, downlink control information (DCI) for triggering the SRS; and
   transmitting, based on the configuration information and the DCI, the SRS in a slot,
   wherein the configuration information includes a slot offset (X) and at least one candidate value from a reference slot n+X to the slot in which the SRS is transmitted.

2. The method of claim 1, wherein the slot in which the SRS is transmitted is determined based on the at least one candidate value, as a u-th available slot.

3. The method of claim 1, wherein the DCI includes an offset indicator to indicate one of the at least one candidate value.

4. The method of claim 3, wherein a bit number of the offset indicator is determined based on a number of the at least one candidate value.

5. A terminal in a wireless communication system, the terminal comprising:
   a transceiver; and
   at least one processor coupled with the transceiver and configured to:
      receive configuration information associated with a sounding reference signal (SRS) through higher layer signaling,
      receive, in a slot n, downlink control information (DCI) for triggering the SRS, and
      transmit, based on the configuration information and the DCI, the SRS in a slot,
   wherein the configuration information includes a slot offset (X) and at least one candidate value from a reference slot n+X to the slot in which the SRS is transmitted.

6. The terminal of claim 5, wherein the slot in which the SRS is transmitted is determined based on the at least one candidate value, as a u-th available slot.

7. The terminal of claim 5, wherein the DCI includes an offset indicator to indicate one of the at least one candidate value.

8. The method of claim 7, wherein a bit number of the offset indicator is determined based on a number of the at least one candidate value.

9. A method performed by a base station (BS) in a wireless communication system, the method comprising:
   transmitting, to a terminal, configuration information associated with a sounding reference signal (SRS) through higher layer signaling;
   transmitting, in a slot n, downlink control information (DCI) for triggering the SRS; and
   receiving, based on the configuration information and the DCI, the SRS in a slot,
   wherein the configuration information includes a slot offset (X) and at least one candidate value from a reference slot n+X to the slot in which the SRS is received.

10. The method of claim 9, wherein the slot in which the SRS is received is determined based on the at least one candidate value, as a u-th available slot.

11. The method of claim 9, wherein the DCI includes an offset indicator to indicate one of the at least one candidate value.

12. The method of claim 11, wherein a bit number of the offset indicator is determined based on a number of the at least one candidate value.

13. A base station (BS), in a wireless communication system, the BS comprising:
   a transceiver; and
   at least one processor coupled with the transceiver and configured to:
      transmit, to a terminal, configuration information associated with a sounding reference signal (SRS) through higher layer signaling,
      transmit, in a slot, downlink control information (DCI) for triggering the SRS, and
      receive, based on the configuration information and the DCI, the SRS in a slot,
   wherein the configuration information includes a slot offset (X) and at least one candidate value from a reference slot n+X to the slot in which the SRS is received.

14. The BS of claim 13, wherein the slot in which the SRS is received is determined based on the at least one candidate value, as a u-th available slot.

15. The BS of claim 13, wherein the DCI includes an offset indicator to indicate one of the at least one candidate value.

16. The BS of claim 15, wherein a bit number of the offset indicator is determined based on a number of the at least one candidate value.

* * * * *